United States Patent [19]
Sojoodi et al.

[11] Patent Number: 5,920,479
[45] Date of Patent: Jul. 6, 1999

[54] SYSTEM AND METHOD FOR PERFORMING INTERFACE INDEPENDENT VIRTUAL INSTRUMENTATION FUNCTIONS IN A GRAPHICAL DATA FLOW PROGRAM

[75] Inventors: Omid Sojoodi; Scott A. Rust, both of Austin, Tex.

[73] Assignee: National Instruments Corporation, Austin, Tex.

[21] Appl. No.: 09/092,673

[22] Filed: Jun. 5, 1998

Related U.S. Application Data

[63] Continuation of application No. 08/716,725, Sep. 23, 1996, Pat. No. 5,784,275.

[51] Int. Cl.[6] .................................................. G05B 19/42
[52] U.S. Cl. ......................... 364/191; 364/188; 364/189; 364/146
[58] Field of Search .................................... 364/146–152, 364/188–191, 579, 474.22, 474.24, 551.61, 474.01, 474.11, 474.12; 395/140, 161, 159, 700, 800

[56] References Cited

U.S. PATENT DOCUMENTS

| | | | |
|---|---|---|---|
| 5,481,741 | 1/1996 | McKaskle et al. | 395/800 |
| 5,576,946 | 11/1996 | Bender et al. | 364/146 |
| 5,640,572 | 6/1997 | Mondrik et al. | 395/735 |

*Primary Examiner*—William Grant
*Assistant Examiner*—Ramesh Patel
*Attorney, Agent, or Firm*—Conley, Rose & Tayon; Jeffrey C. Hood

[57] ABSTRACT

A system and method for creating a program for controlling an instrument independent of the interface type of the instrument, in a graphical programming environment. The system comprises a computer system including a display screen and input device, an instrument coupled to the computer system, and a graphical programming environment for creating and executing programs to control the instrument. The programming environment comprises a session control, function nodes and attribute nodes, an object manager and block diagram and front panel editors used to create a virtual instrument. The method for controlling the instrument comprises displaying on the screen session icons, function nodes, and attributes nodes and wiring them together to create the virtual instrument. Virtual instruments, or graphical programs, may be created which are portable across different possible I/O interface types, such as GPIB, VXI, and asynchronous serial interfaces, for coupling the instrument to the computer system. The object manager parses a class definition file to determine possible classes associated with the instrument and the attributes and functions which are valid for a each class. The environment performs type propagation checking to insure that program elements are not wired together in an invalid manner by the user in order to avoid program errors. In particular, the environment checks to see that attributes to be set on and functions to be performed with the instrument are valid for the class of the session associated with the instrument. The environment further performs class propagation between objects in the program to avoid programming errors.

54 Claims, 56 Drawing Sheets

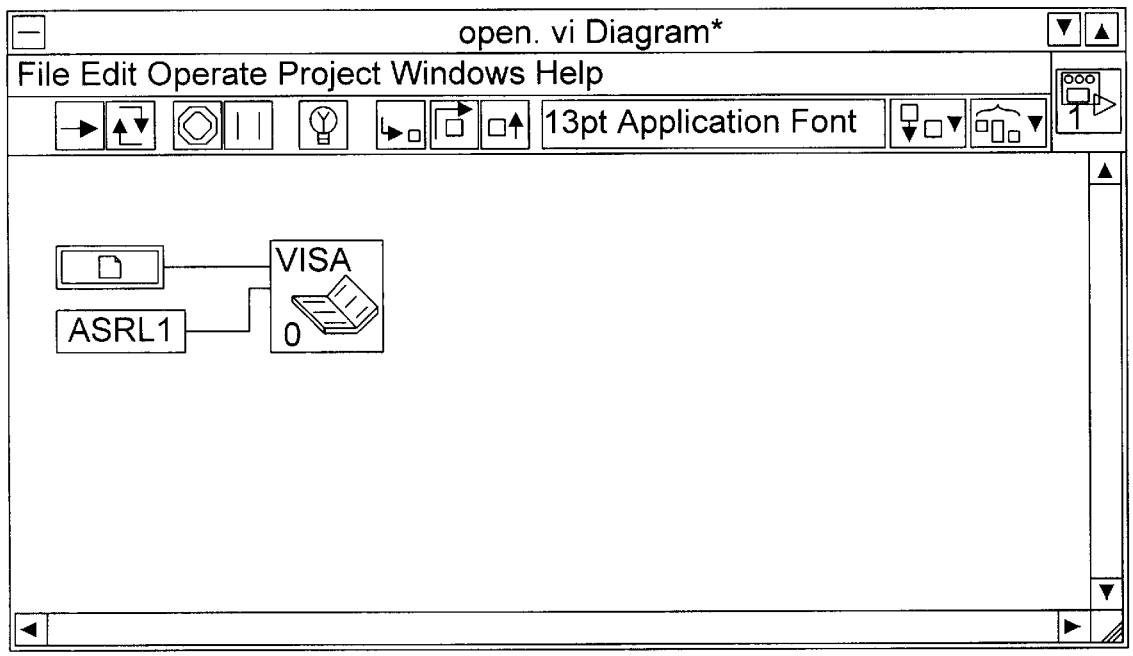
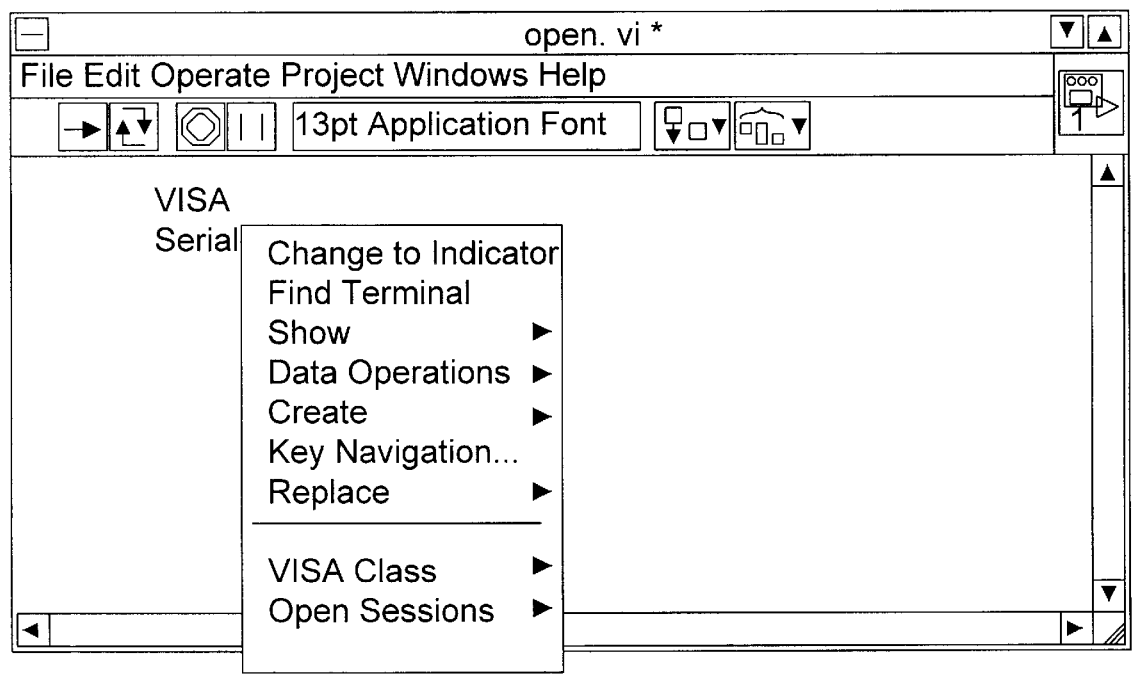
FIG. 4

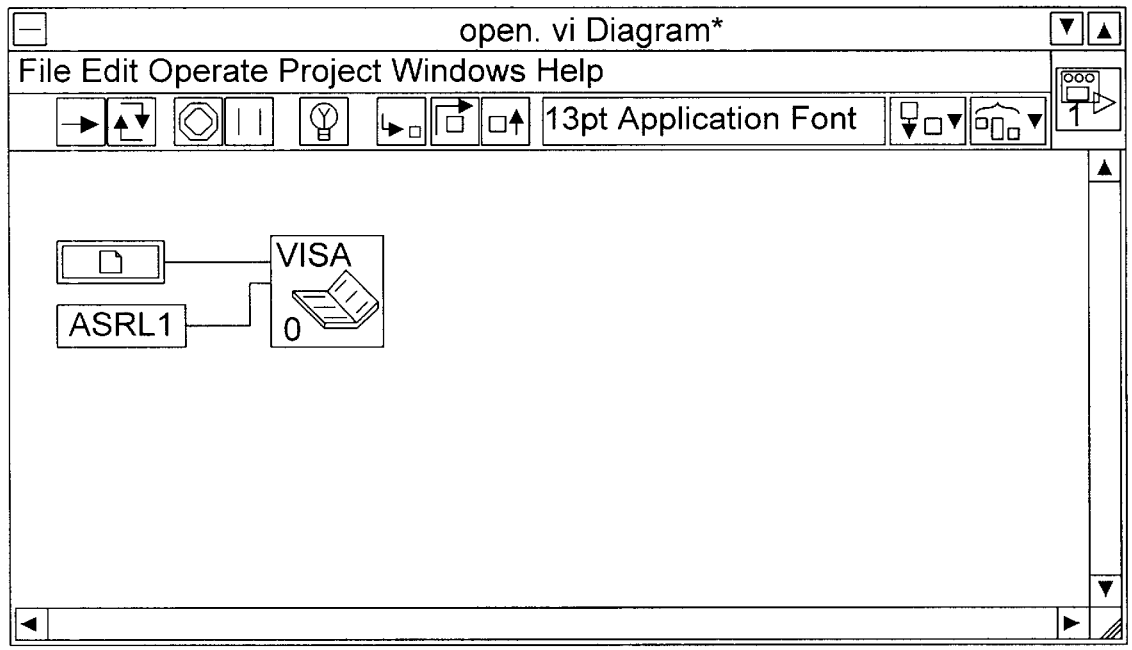
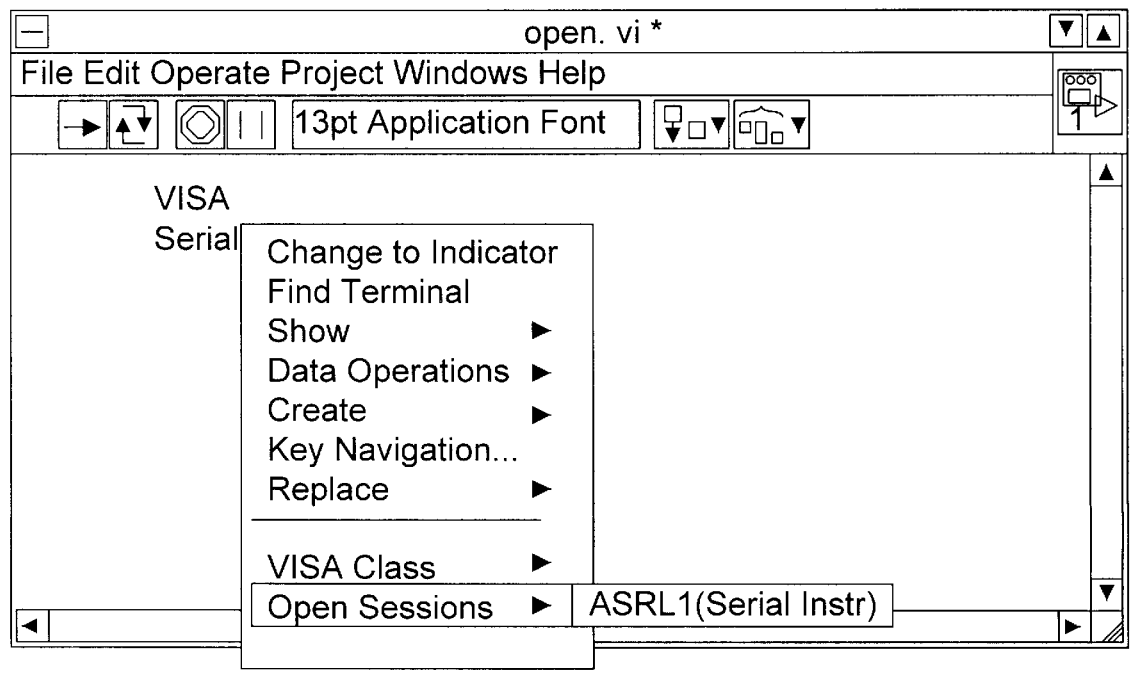
FIG. 5

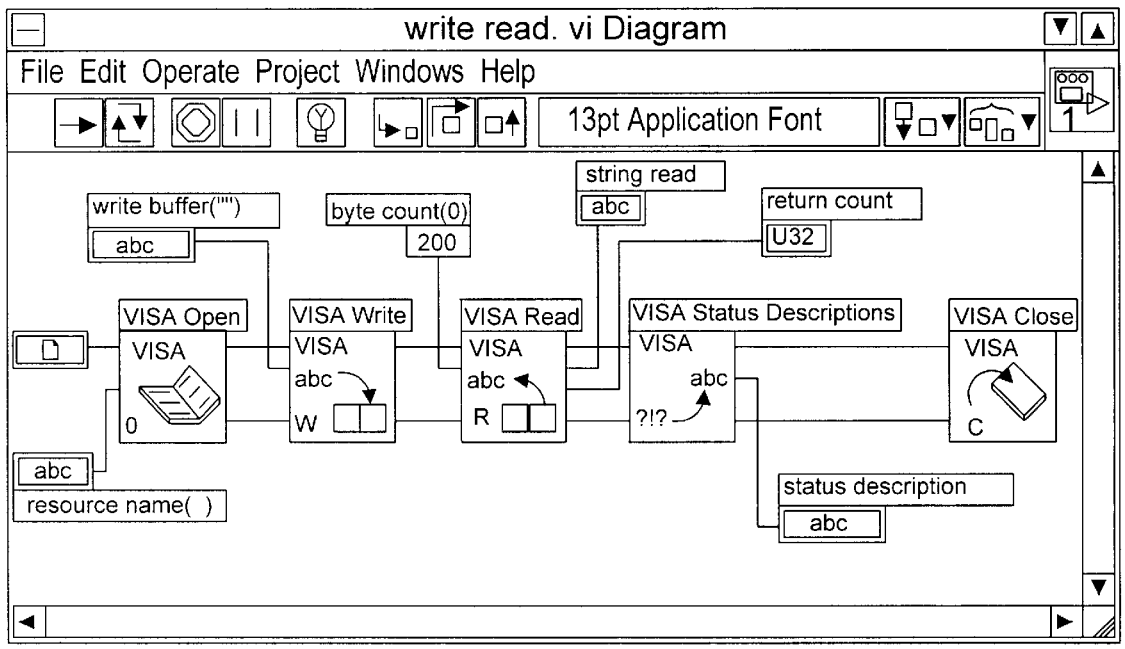
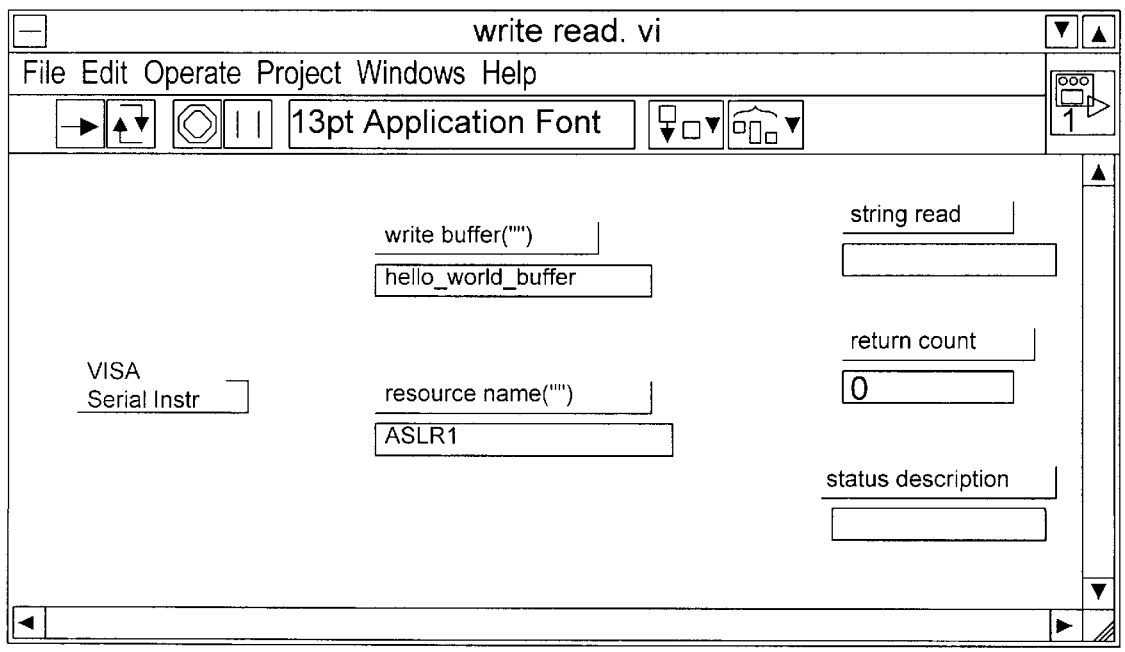
FIG. 6

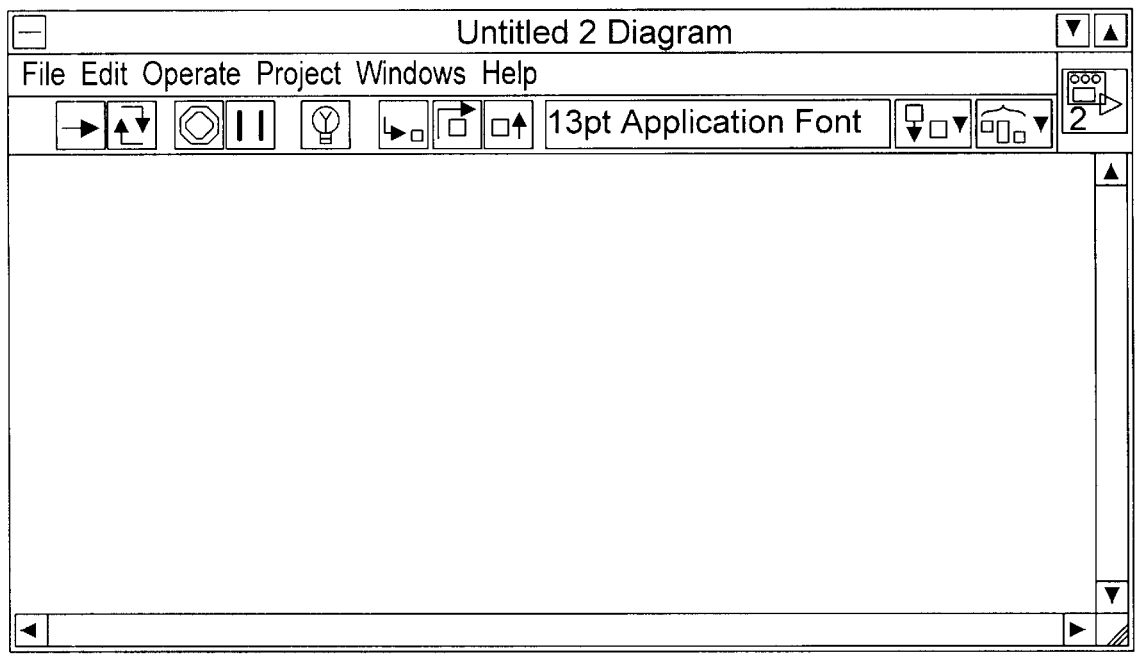
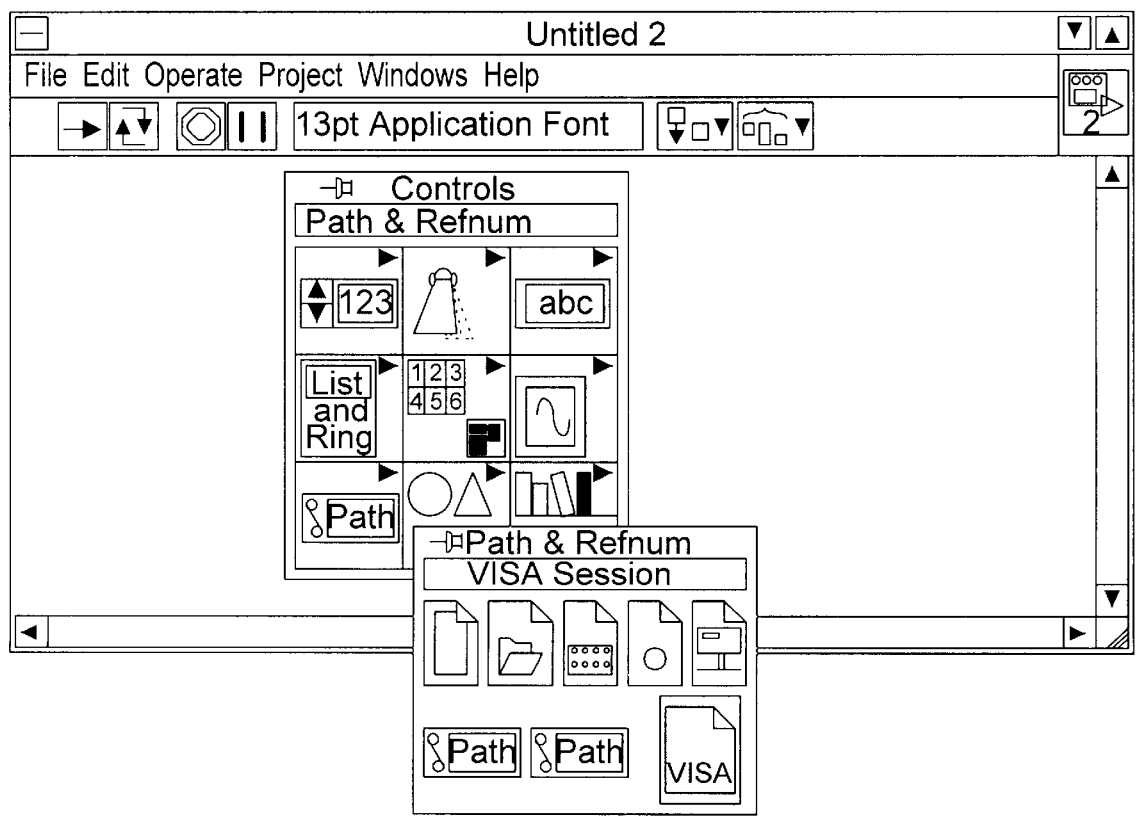
FIG. 9a

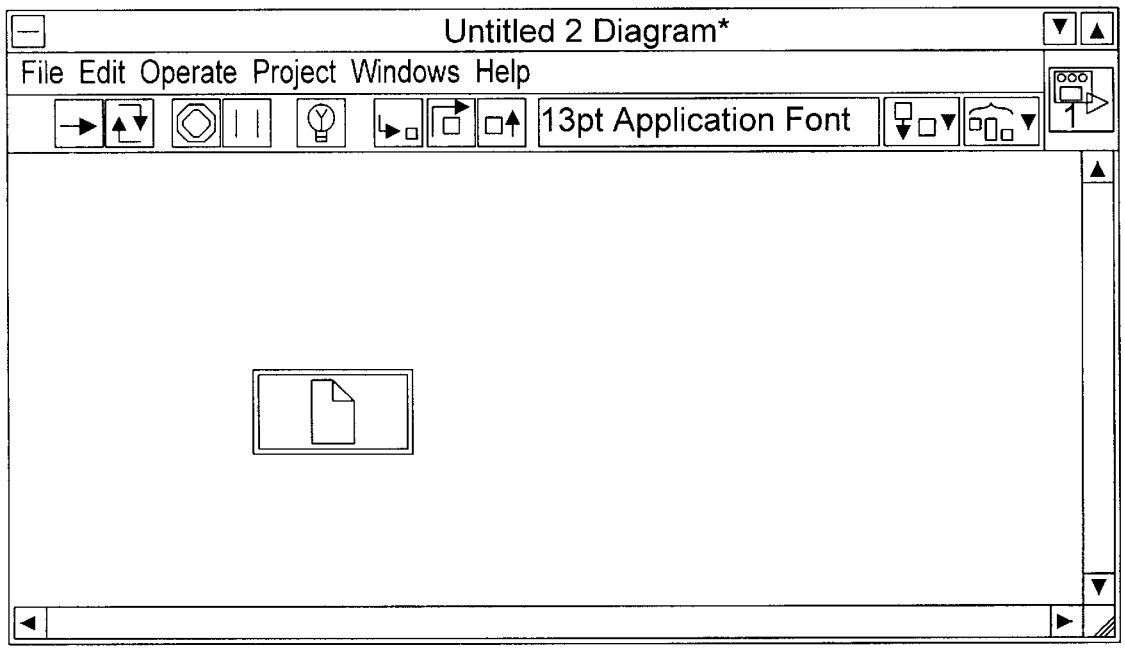
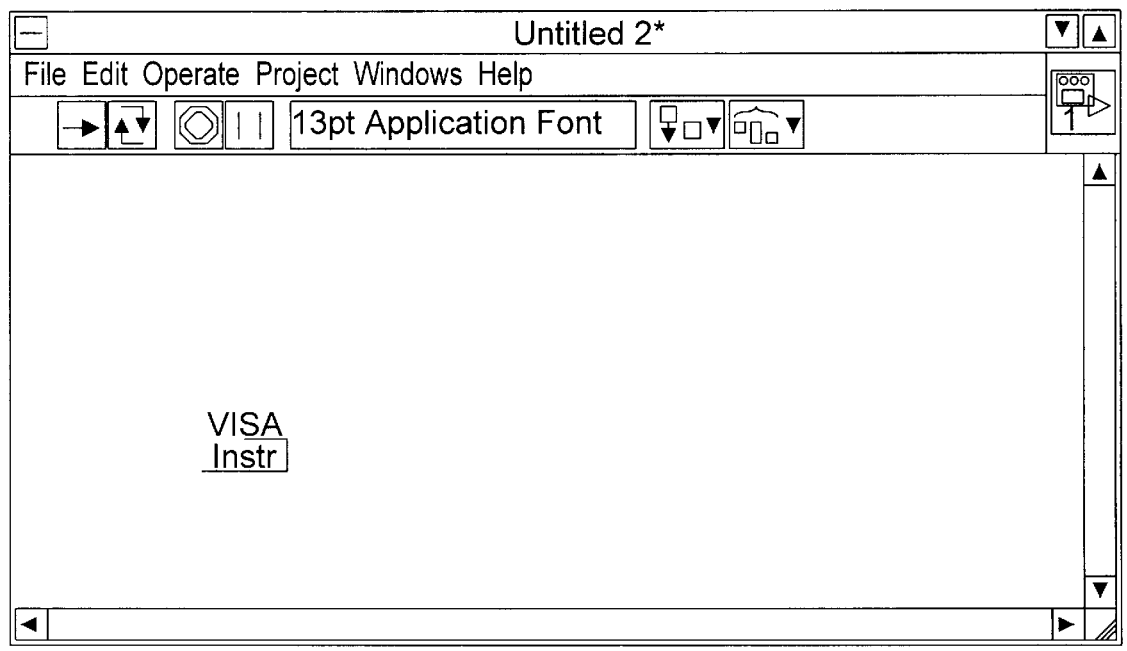
FIG. 9B

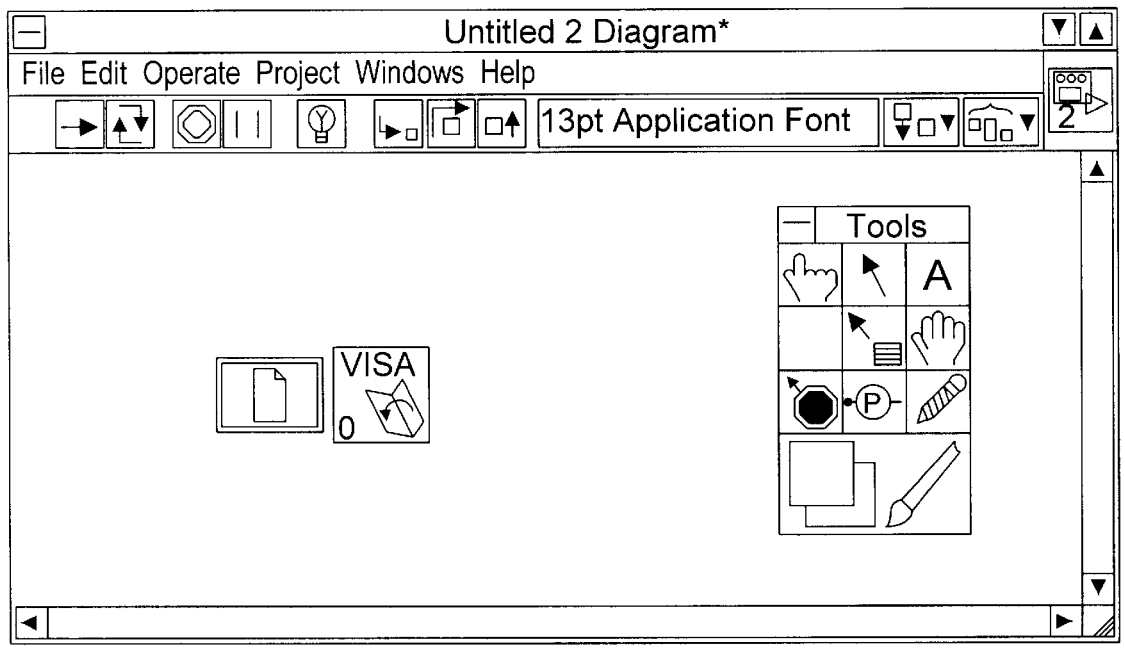
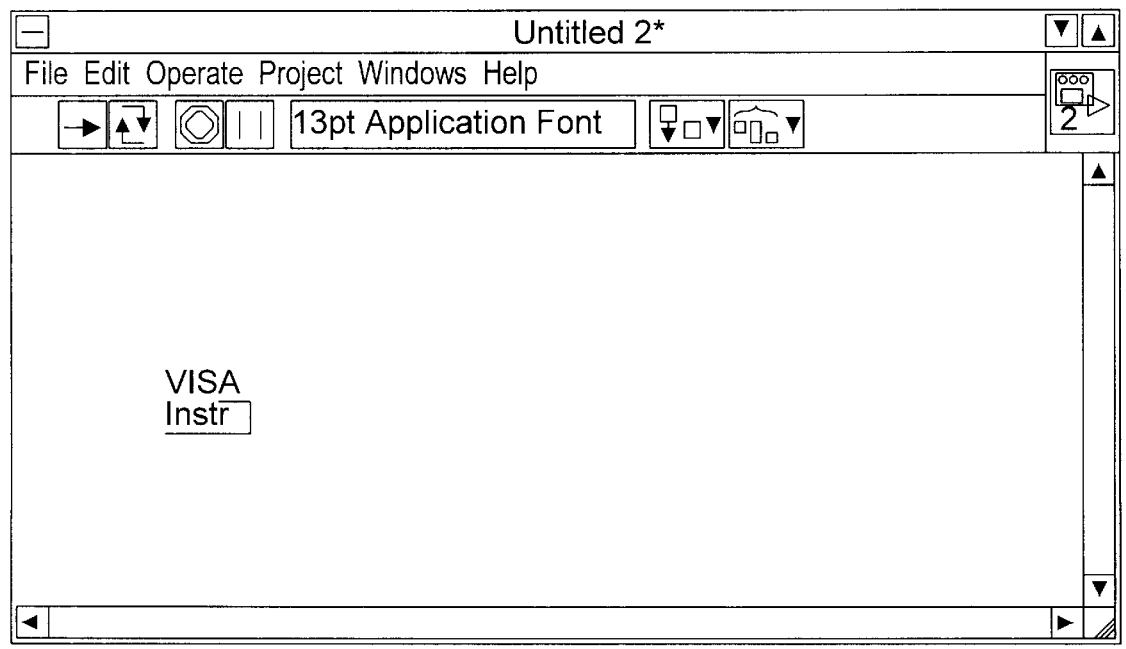
FIG. 9E

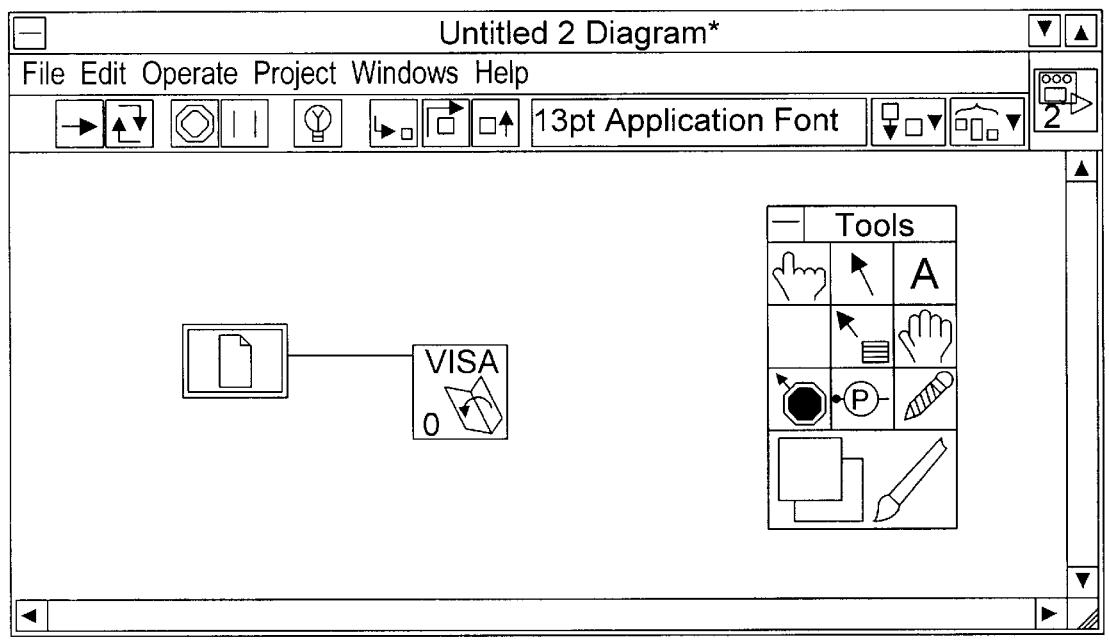
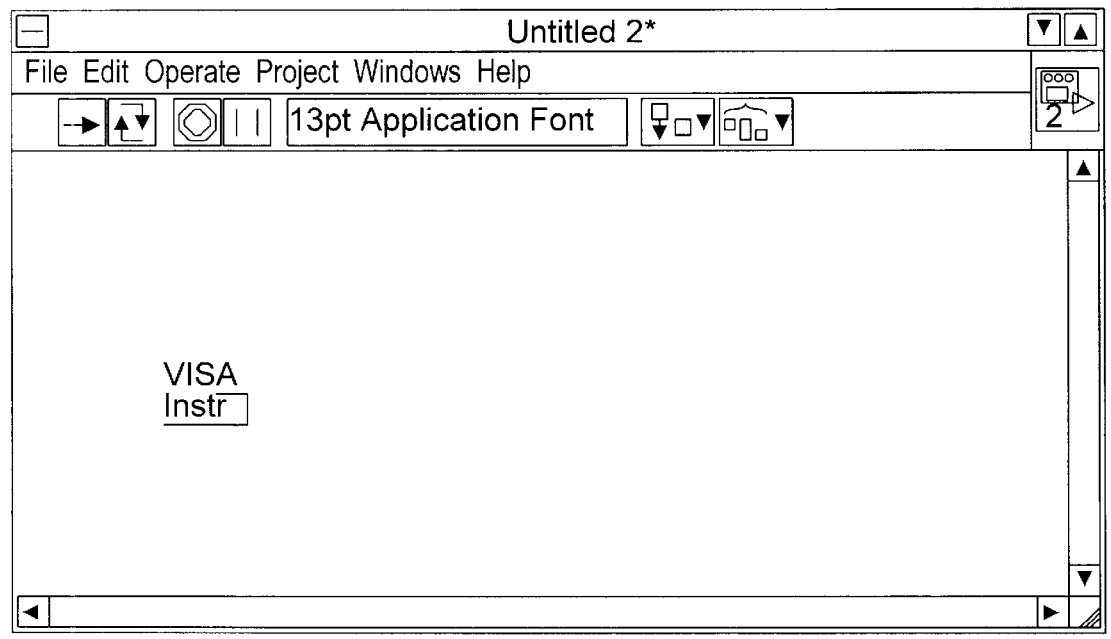
FIG. 9F

Generic
Resources:

Status Description
Open
Close
Lock
Unlock
Enable Event
Disable Event
Wait on Event
Discard Events
Find Resource

320

GPIB and VXI/GPIB-VXI
MBD specific resources:

Clear
Read STB

322

Serial, GPIB, and
VXI/GPIB-VXI MBD
specific resources:

Read
Write

324

VXI/GPIB-VXI MBD and VXI/
GPIB-VXI RBD specific
resources:

In 32
In 16
In 8
Out 32
Out 16
Out 8
Map Address
Unmap Address
Peek 32
Peek 16
Peek 8
Poke 32
Poke 16
Poke 8
Move In 8
Move In 16
Move In 32
Move Out 8
Move Out 16
Move Out 32
Mem Alloc
Mem Free

326

GPIB, VXI/GPIB-VXI MBD,
and VXI/GPIB-VXI RBD
specific resources:

Assert Trigger

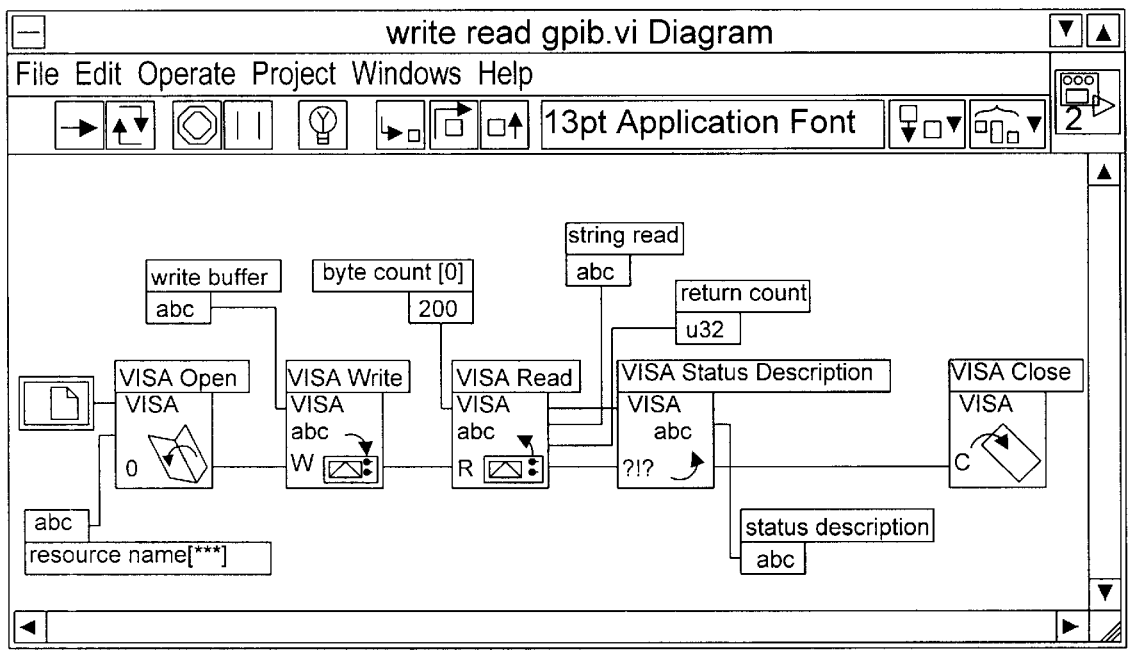
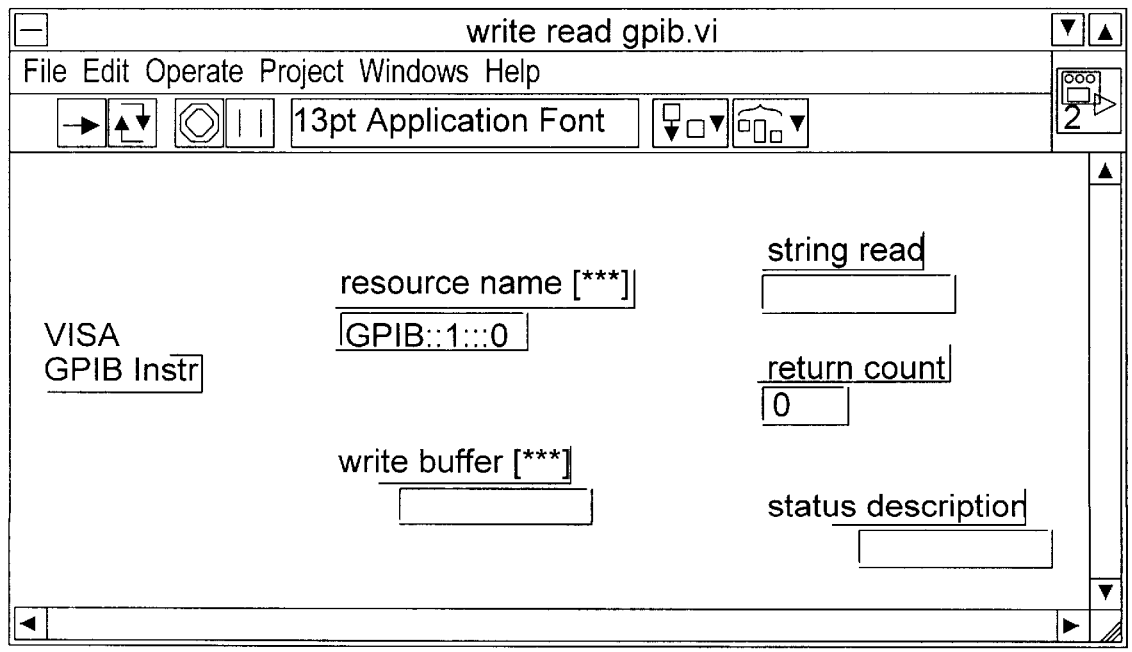
FIG. 12

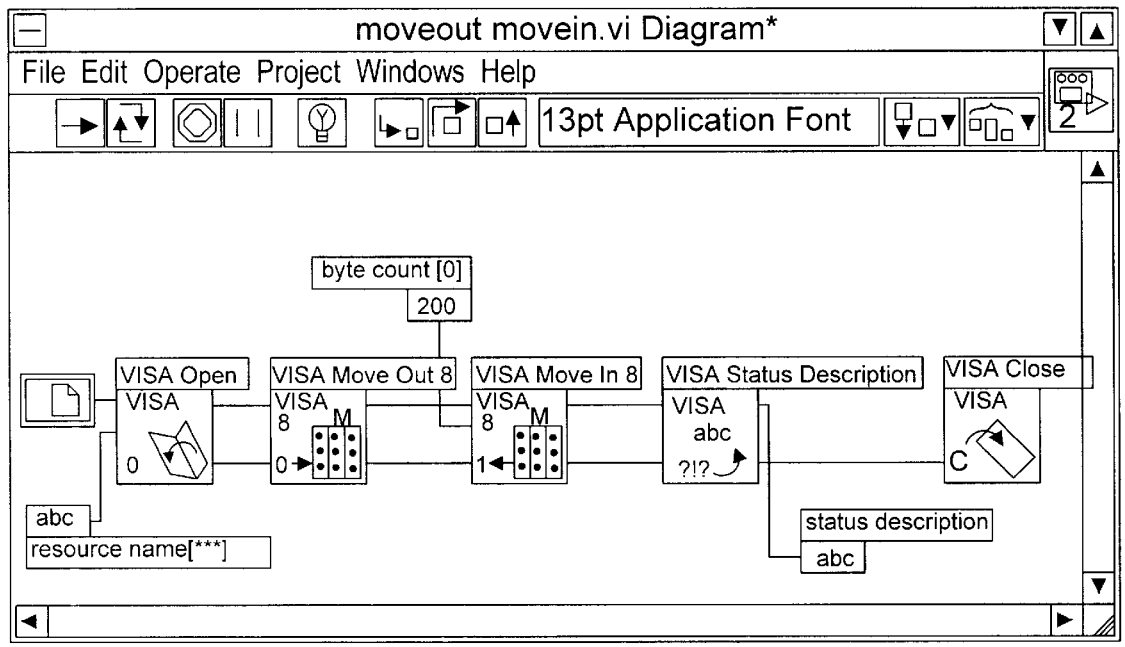
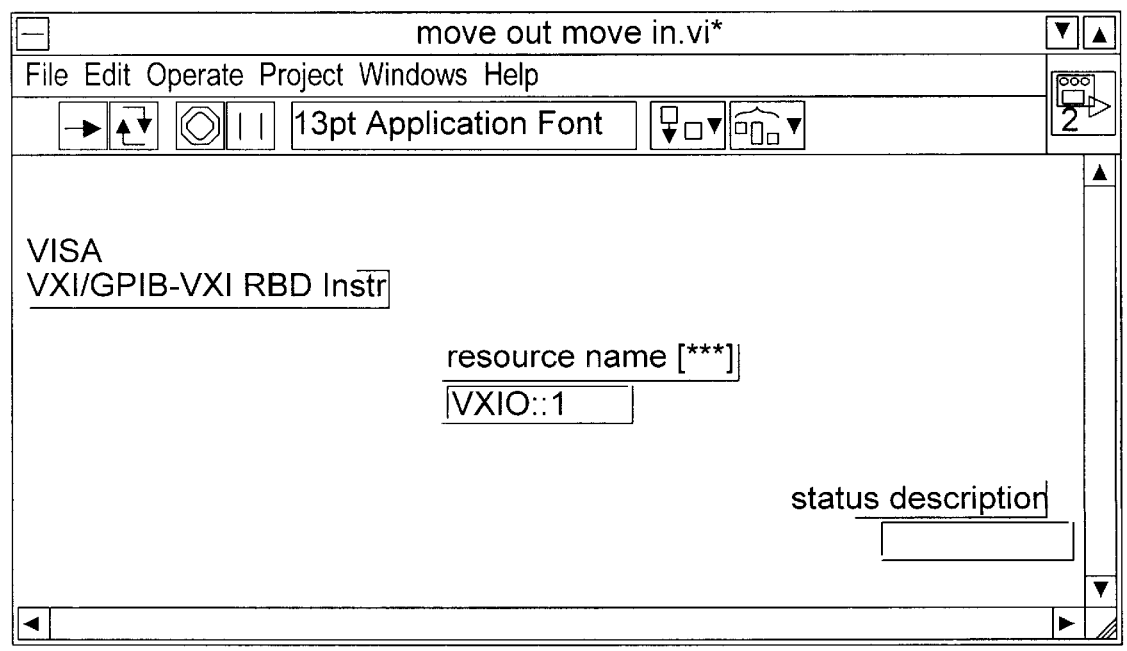
FIG. 14

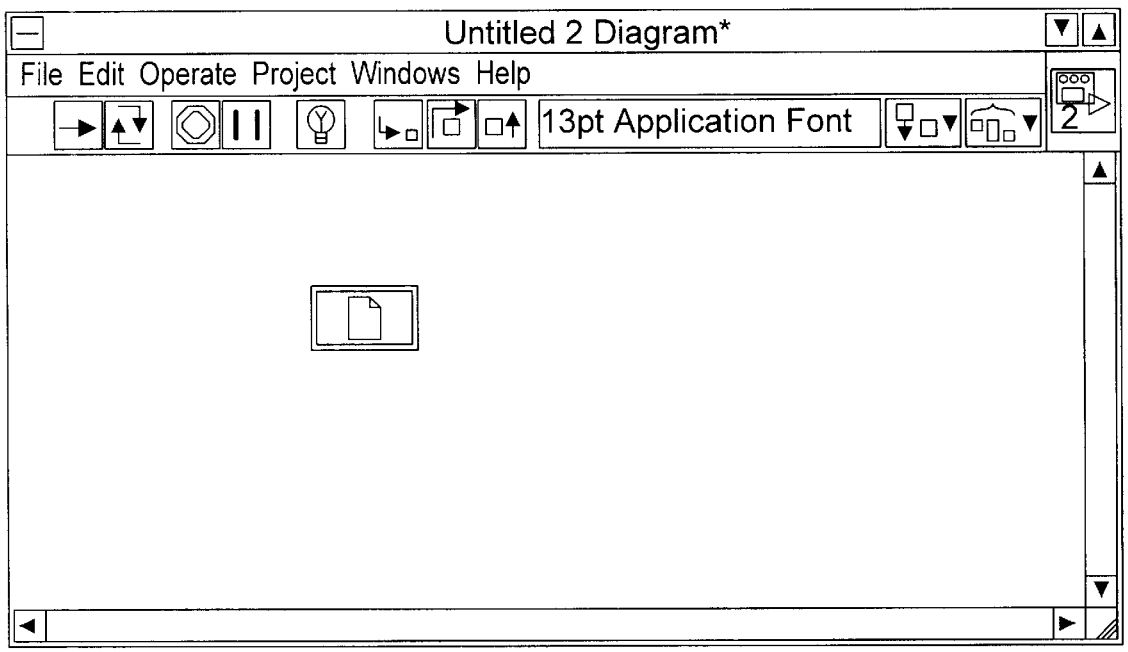
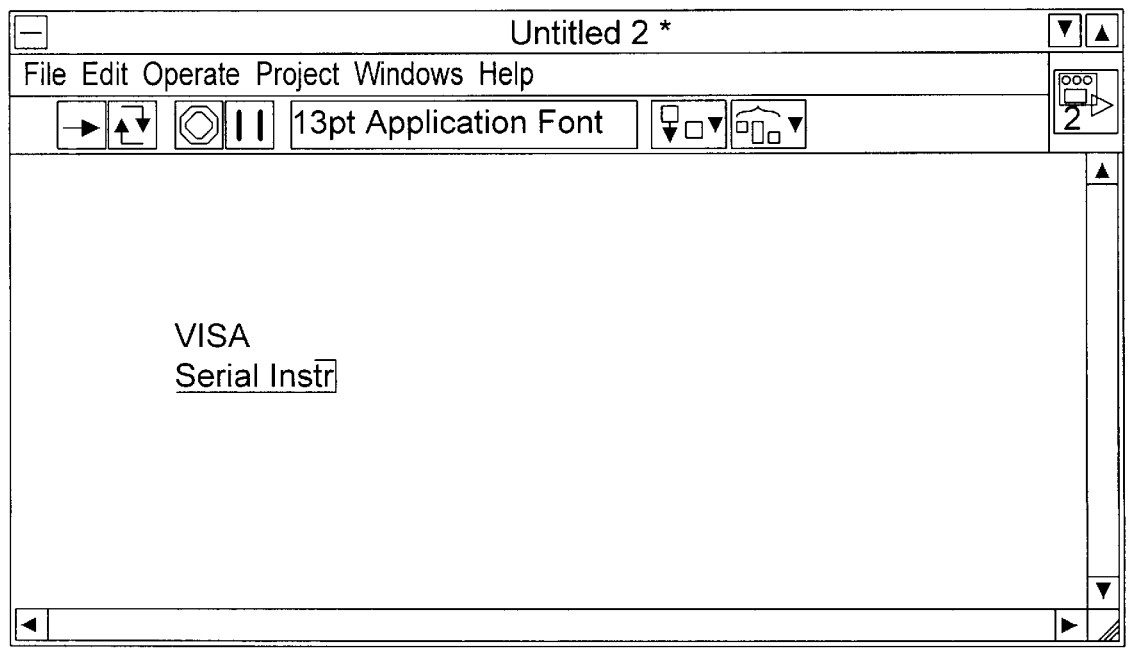
FIG. 17

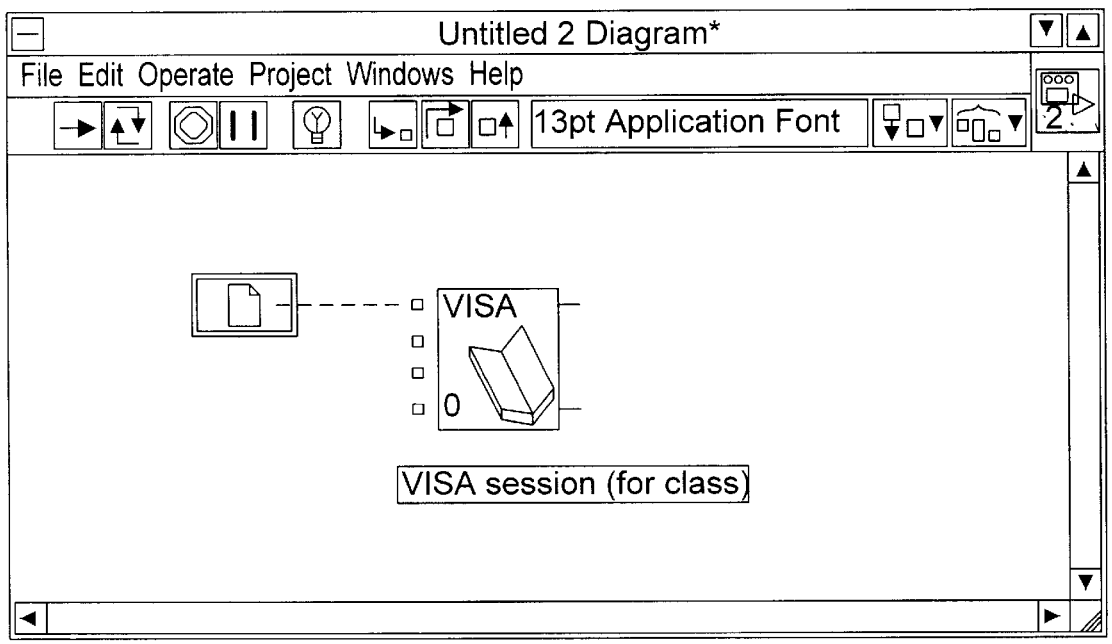
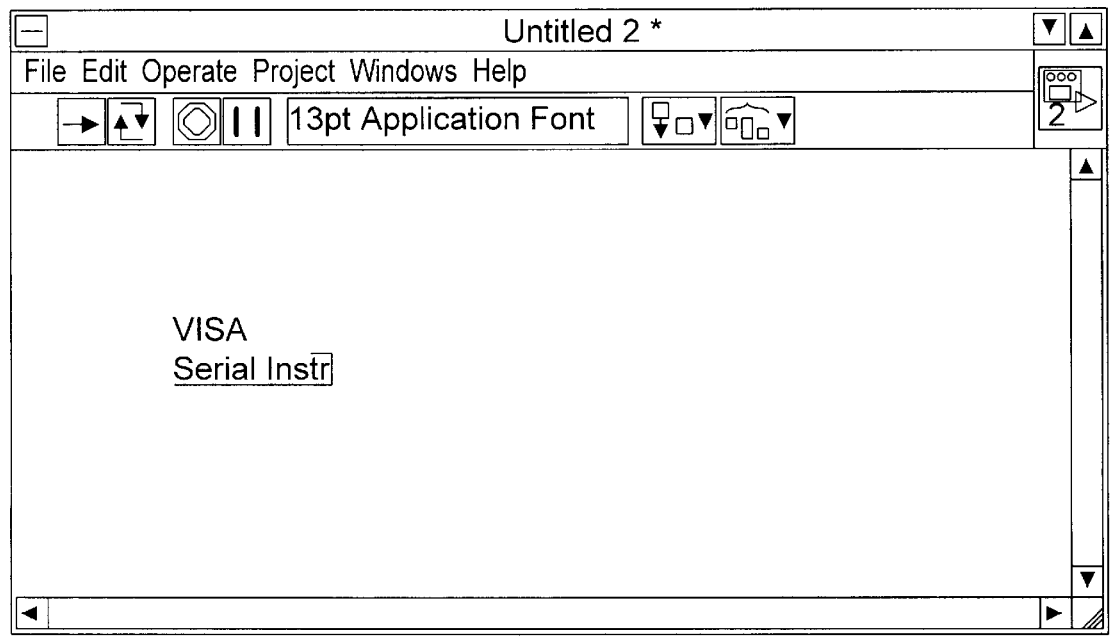
FIG. 18

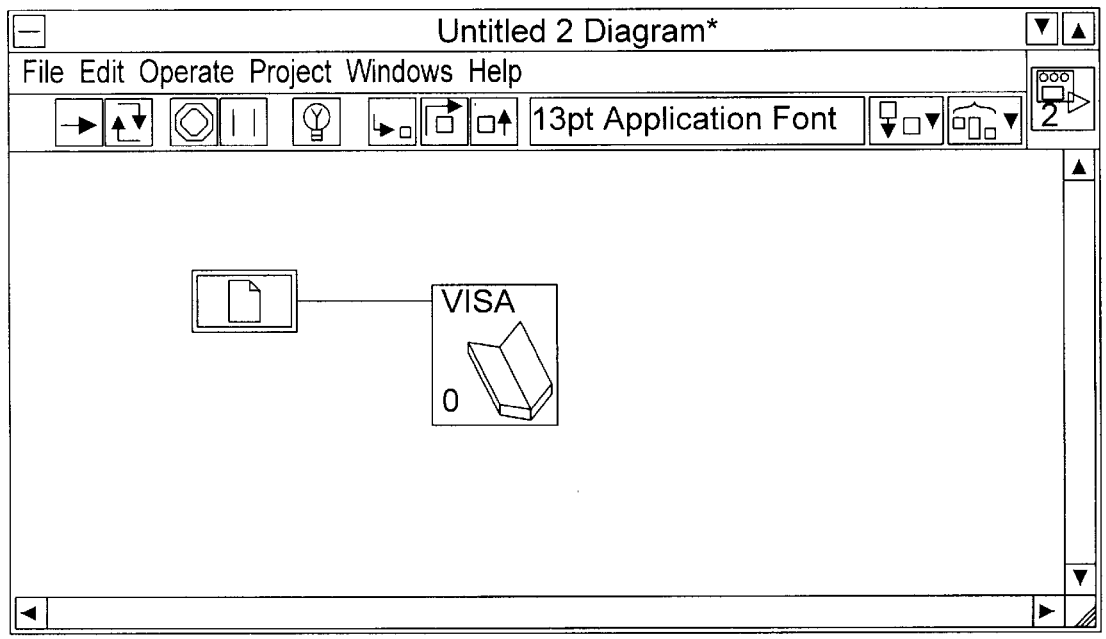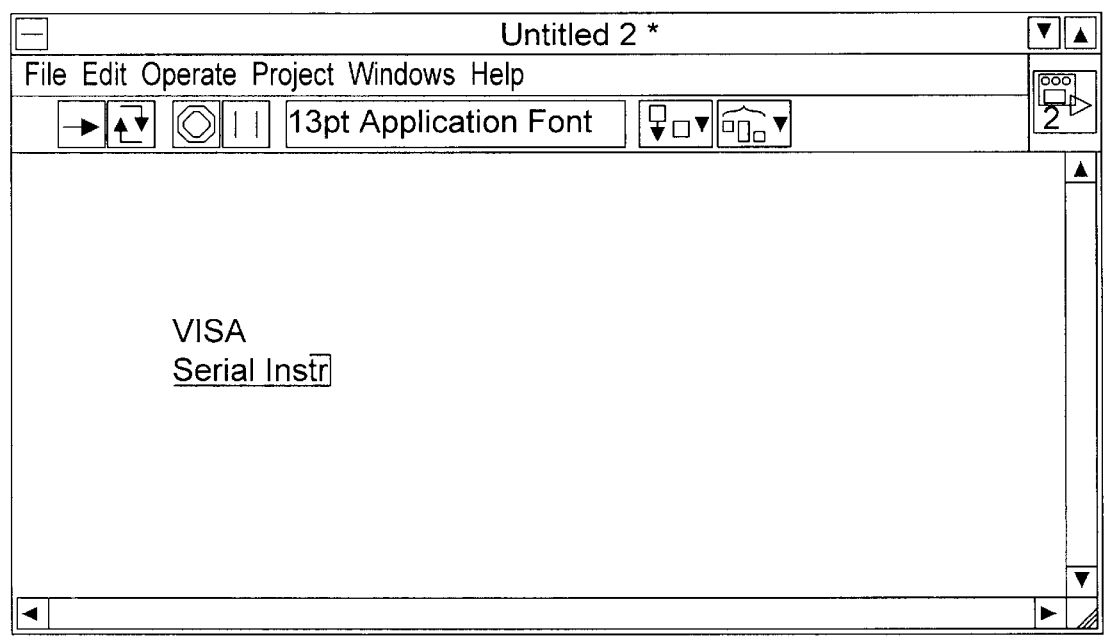
FIG. 19

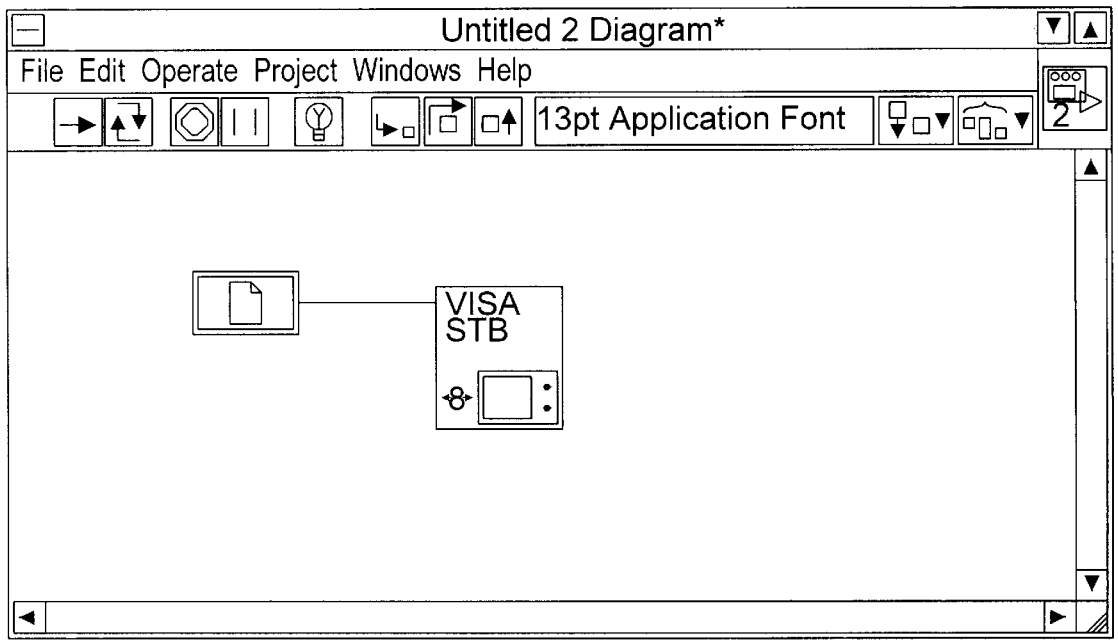
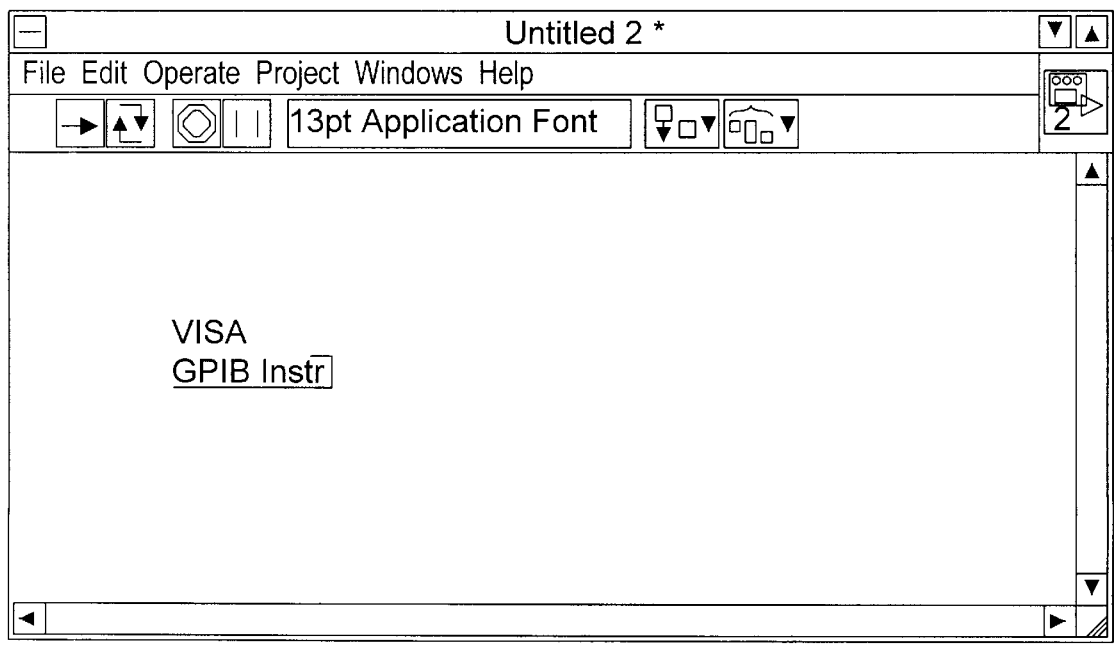
FIG. 23

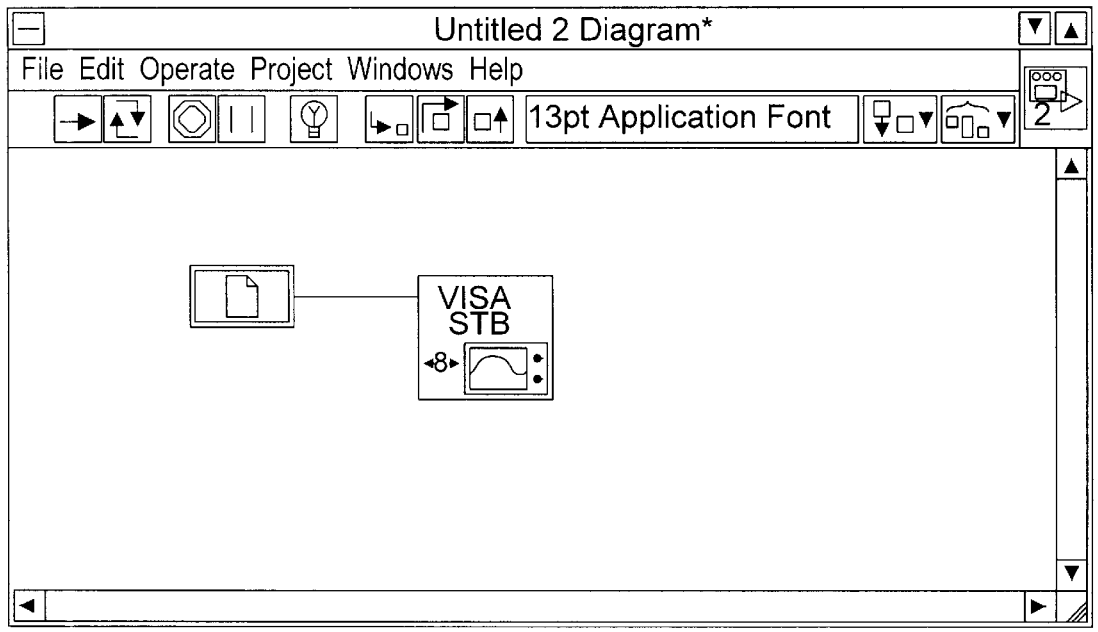
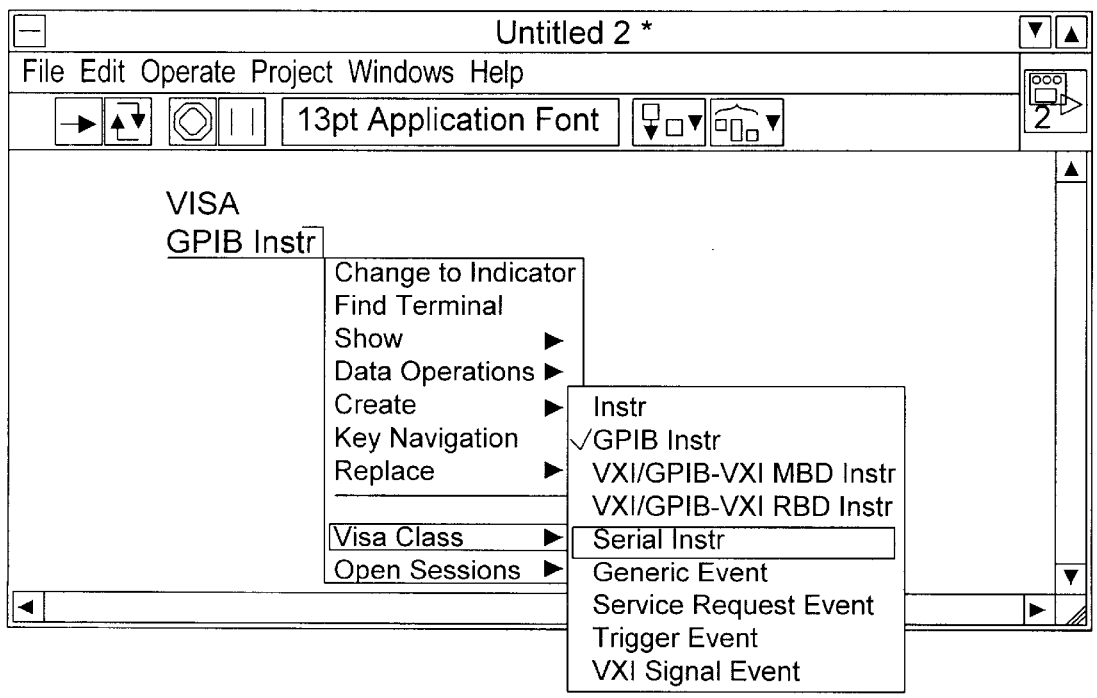
FIG. 24

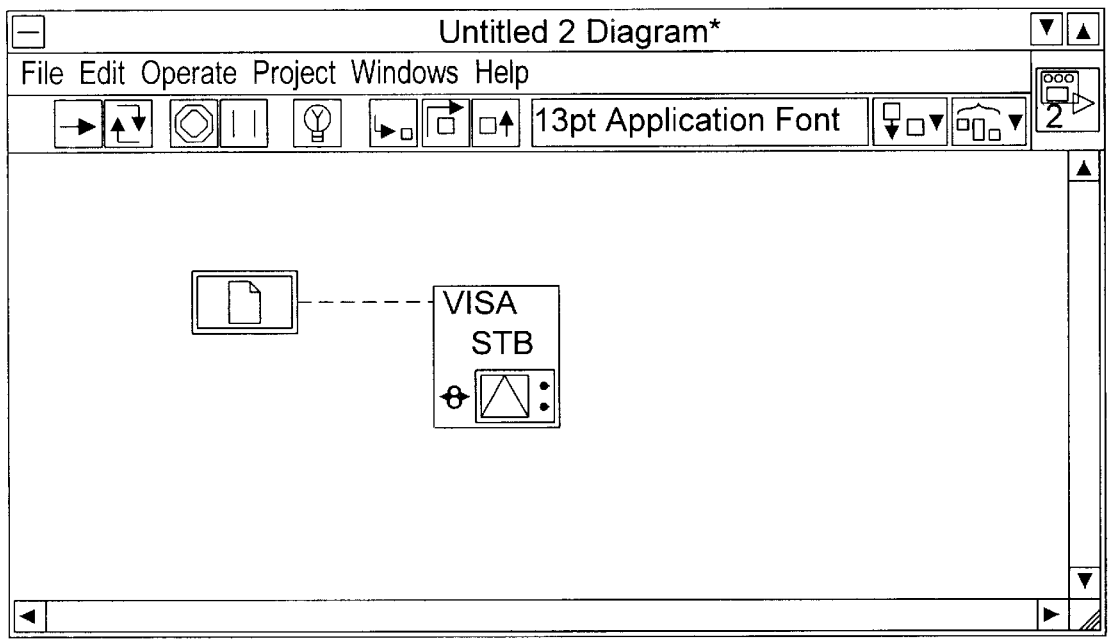
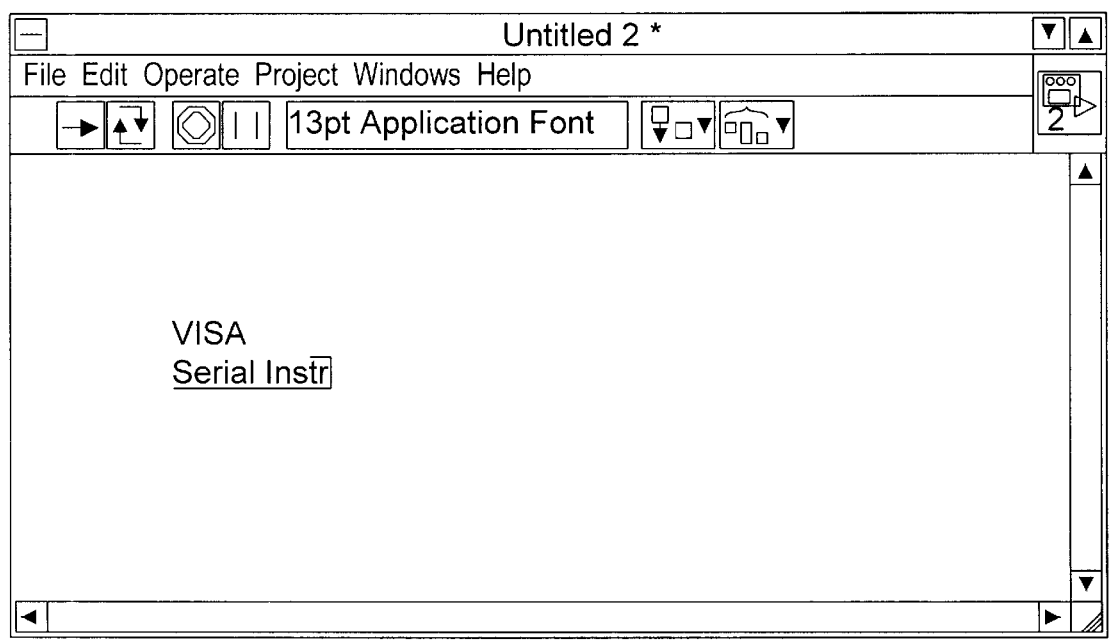
FIG. 25

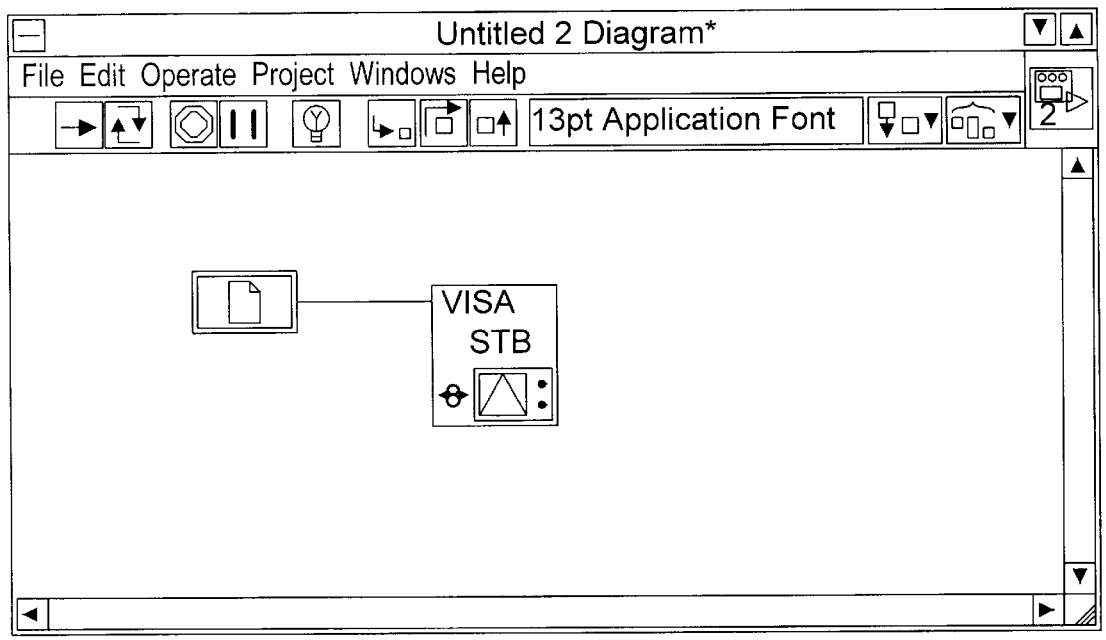
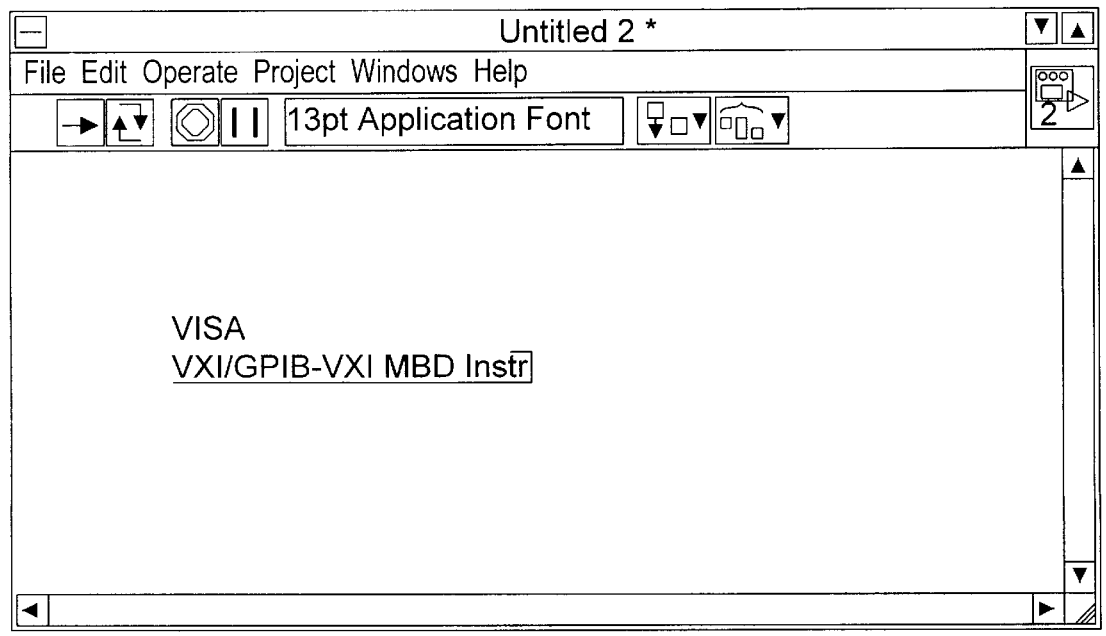
FIG. 26

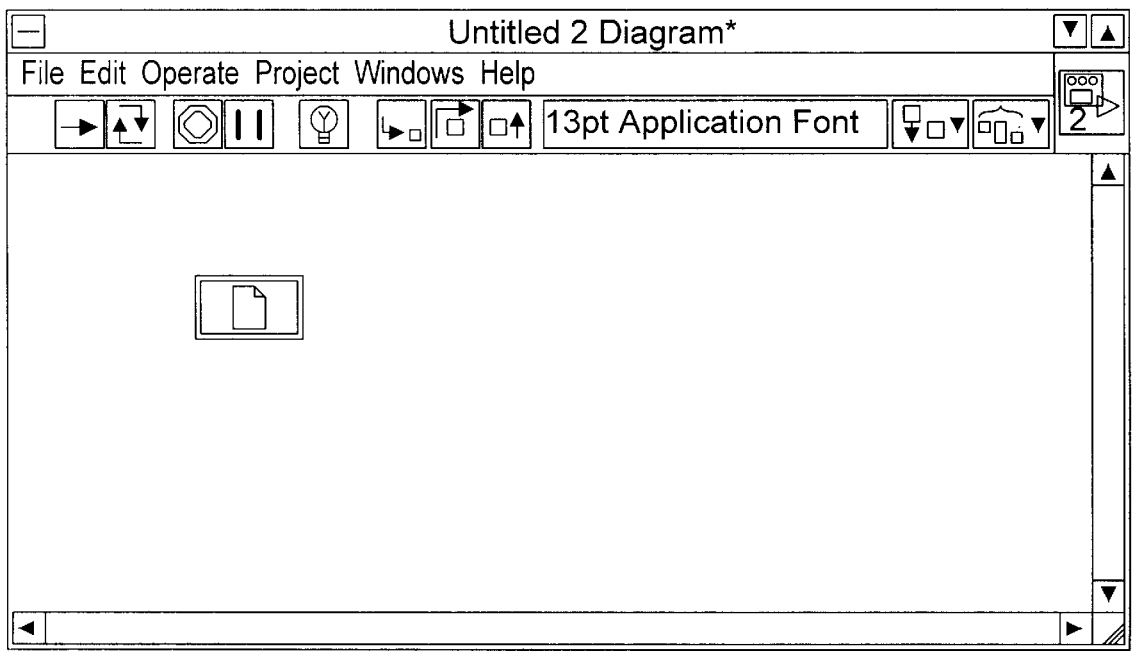
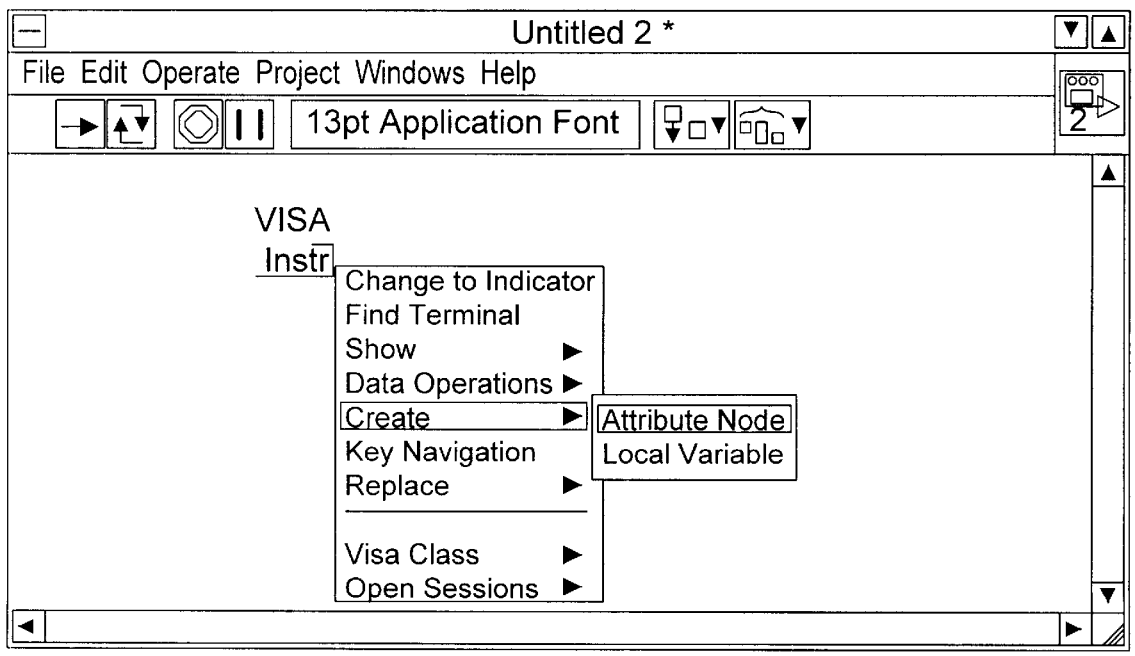
FIG. 29

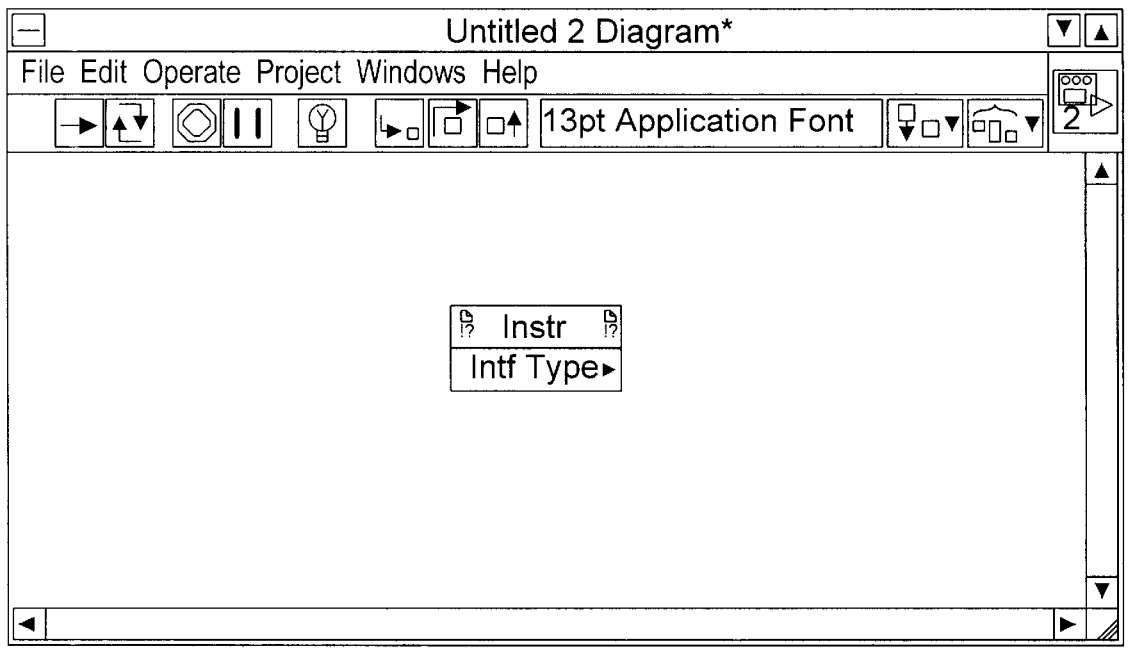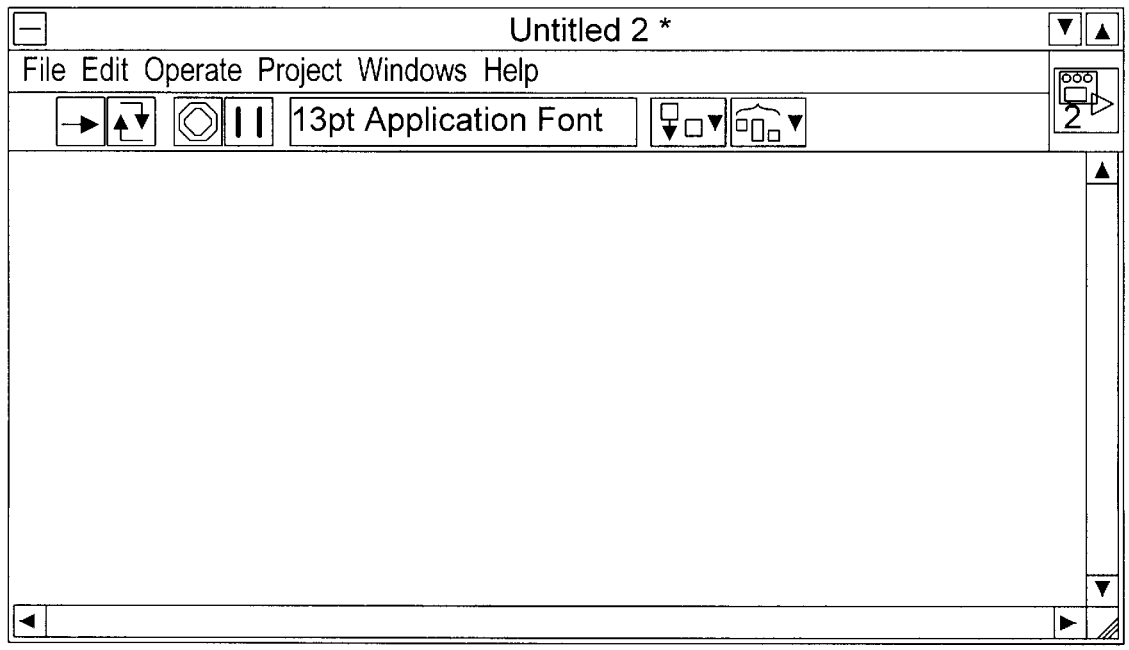
FIG. 32

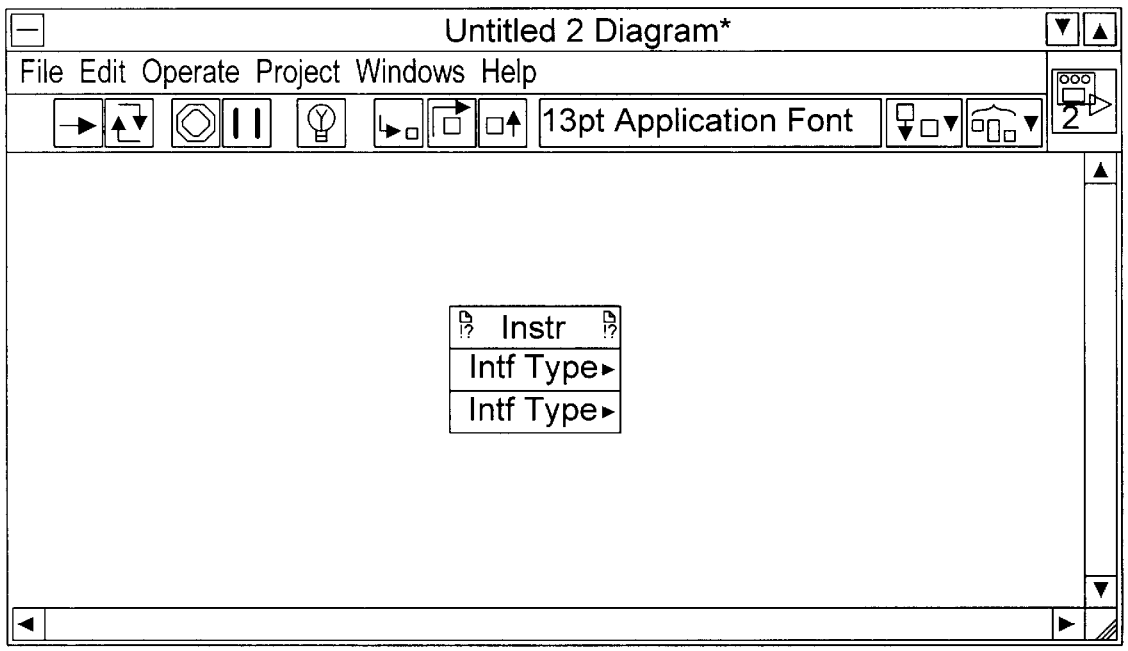
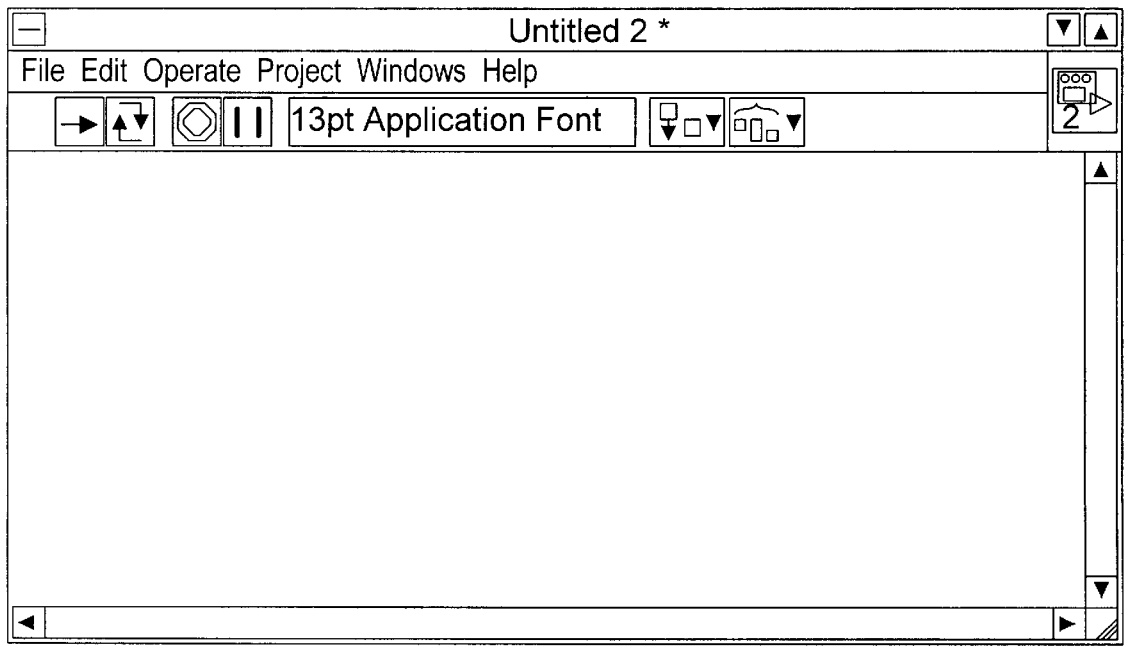
FIG. 34

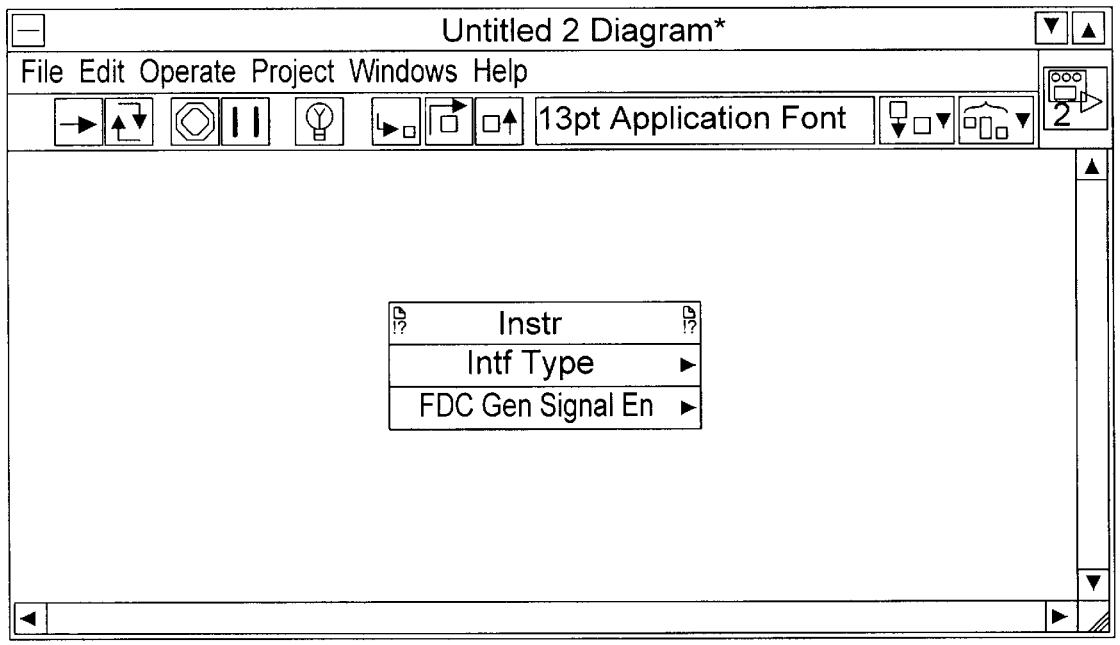
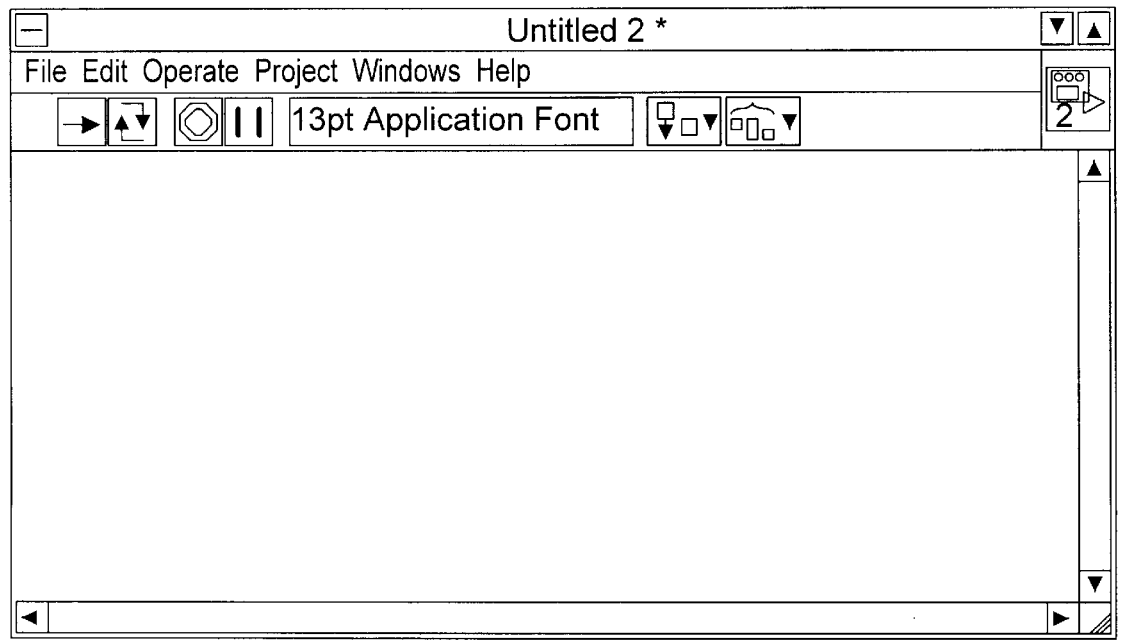
FIG. 36

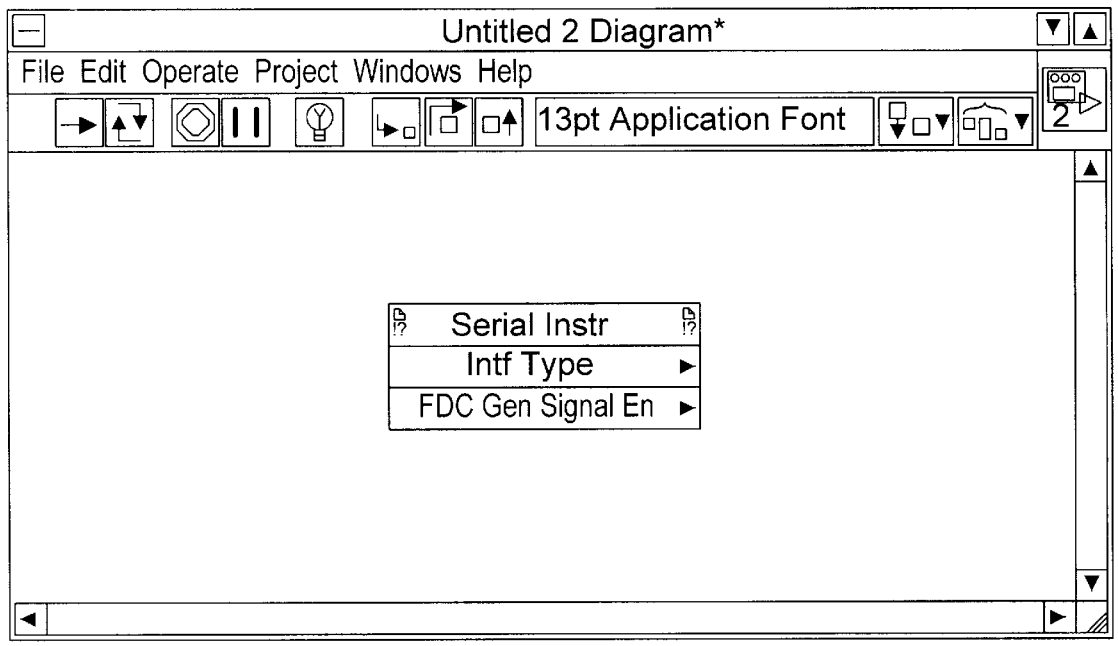
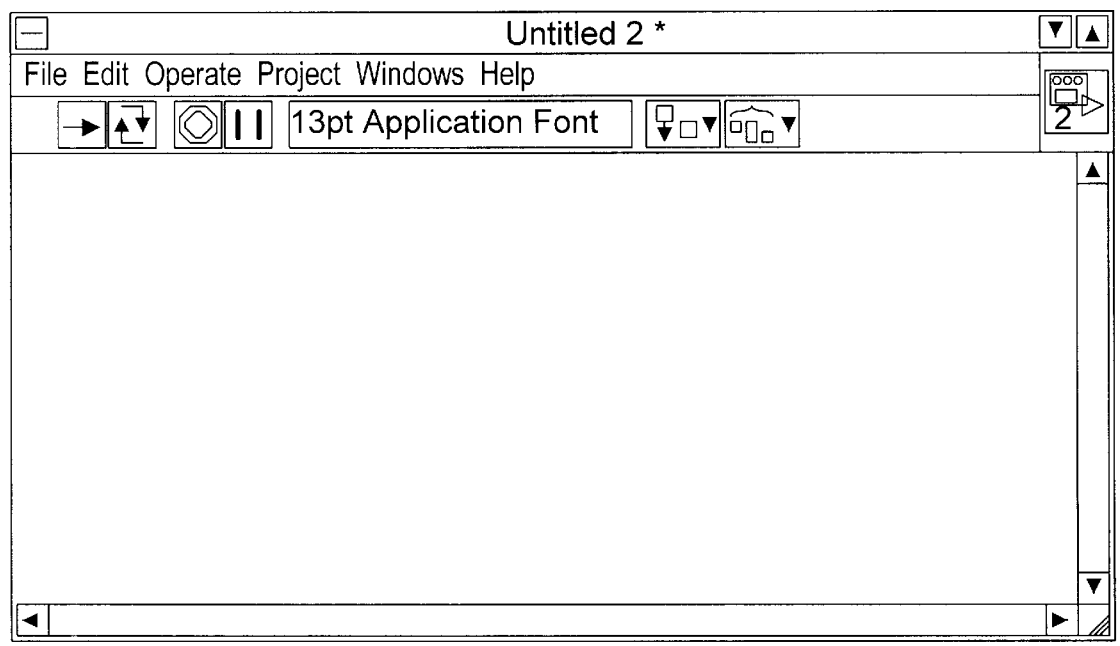
FIG. 38

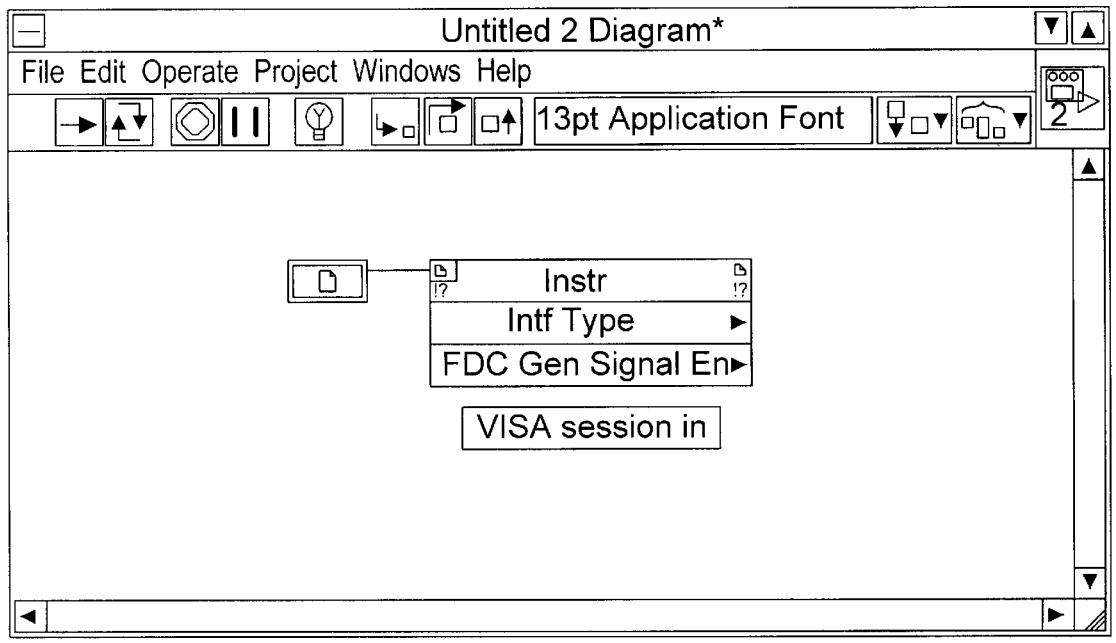
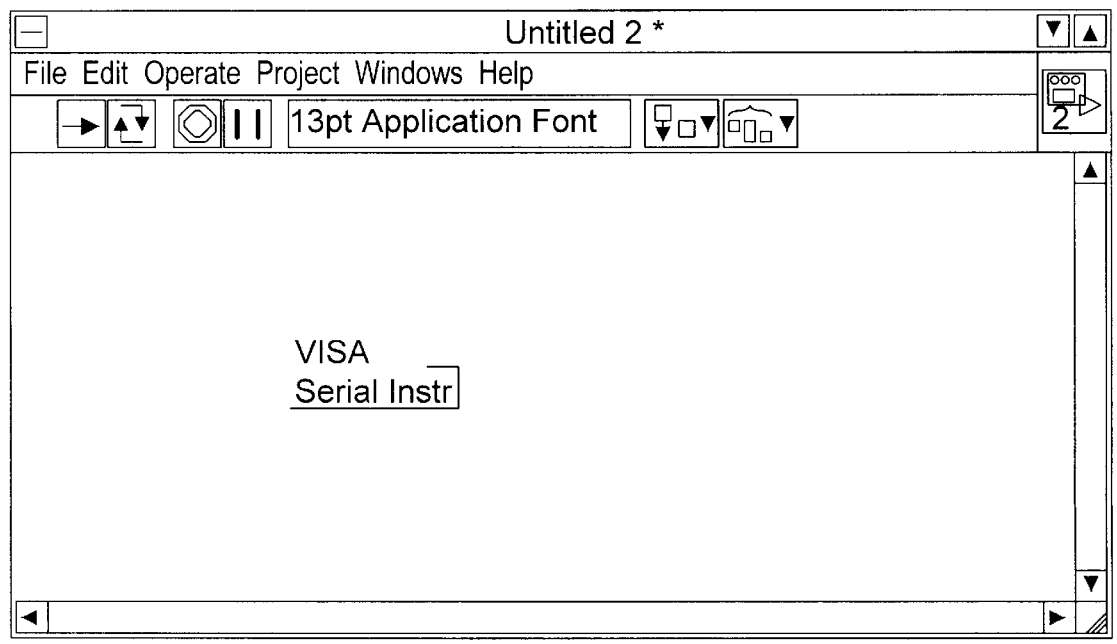
FIG. 41

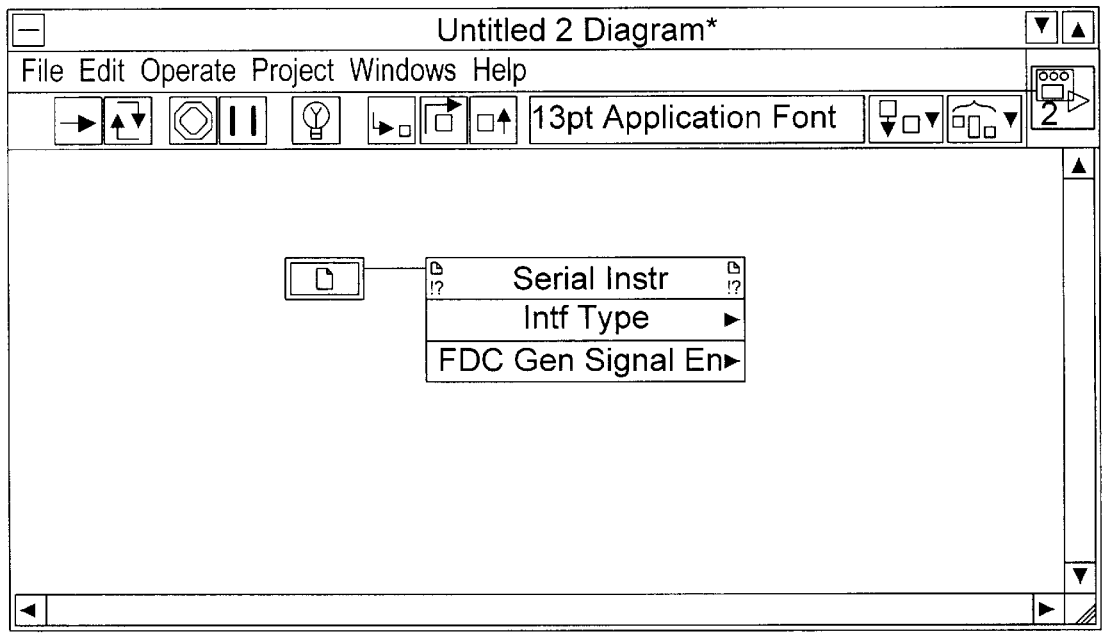
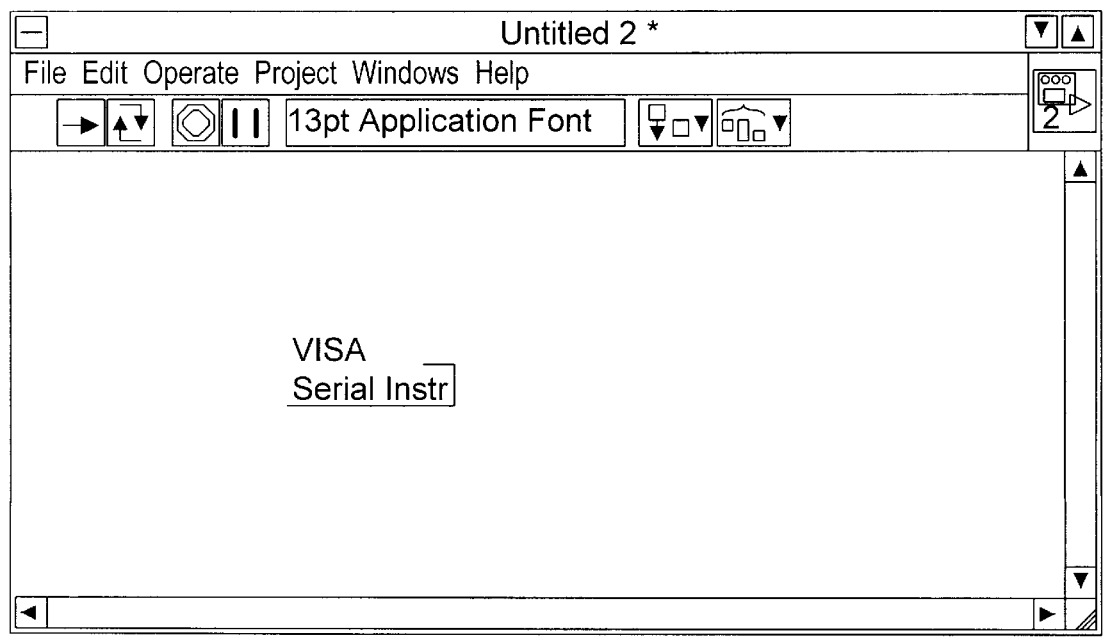
FIG. 42

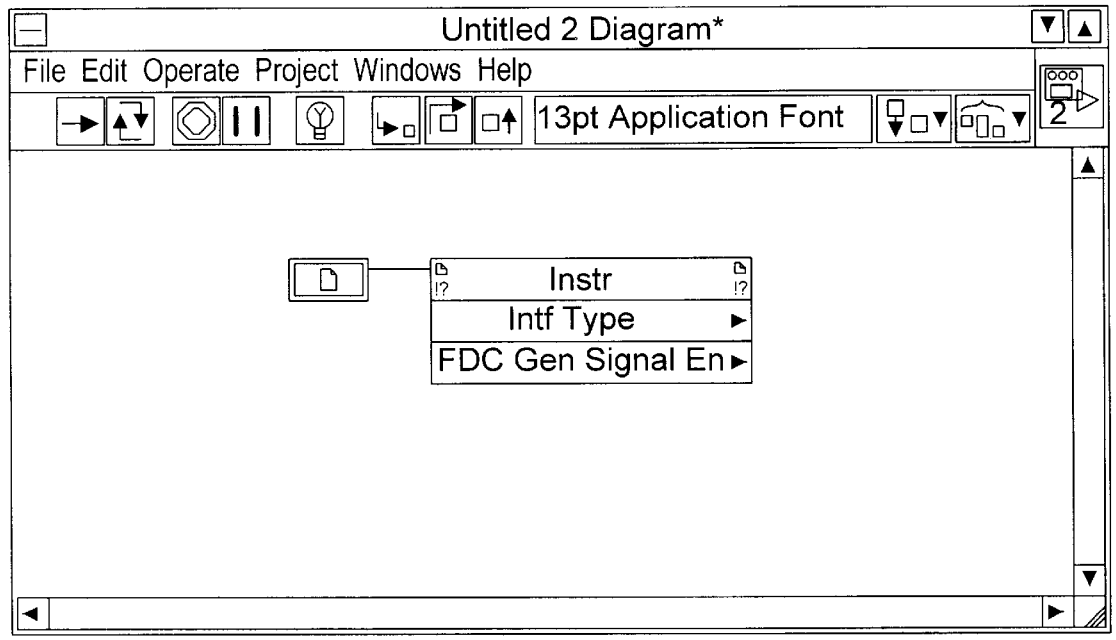
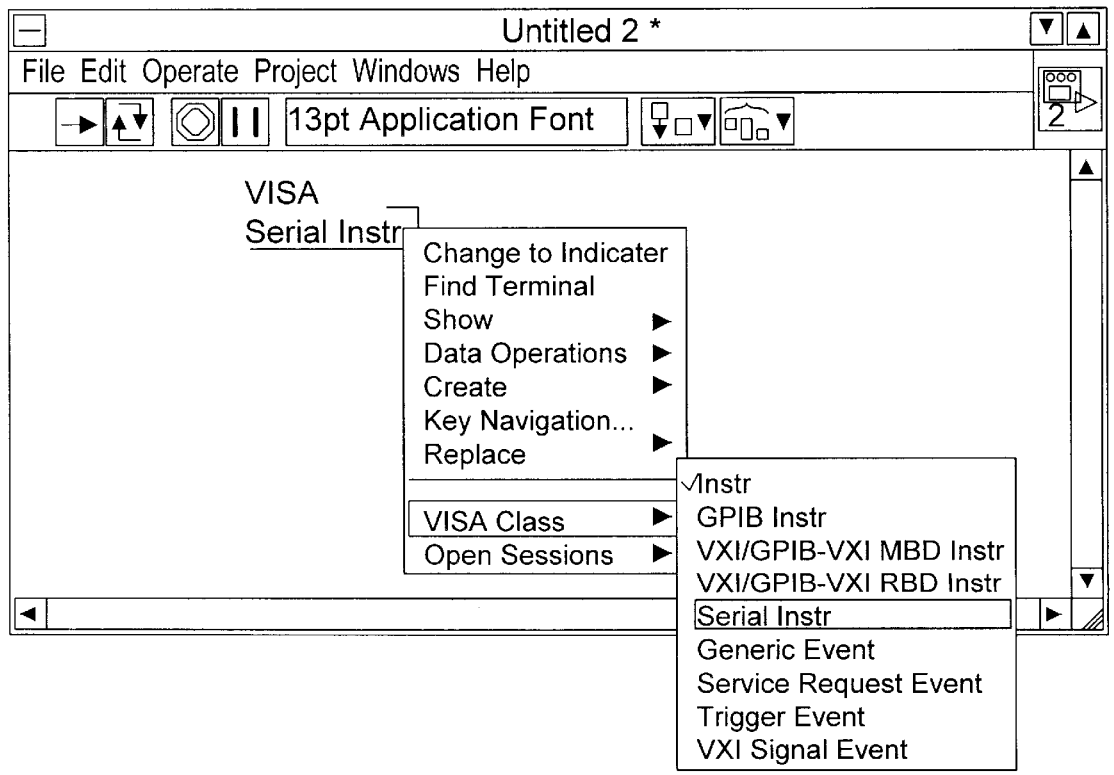
FIG. 44

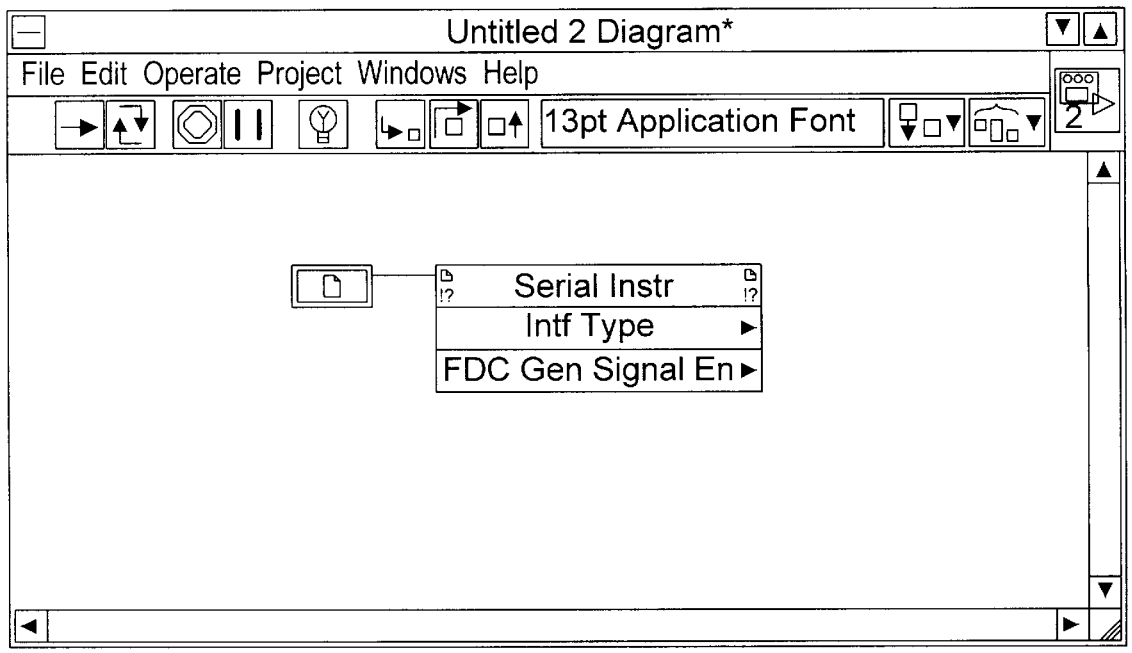
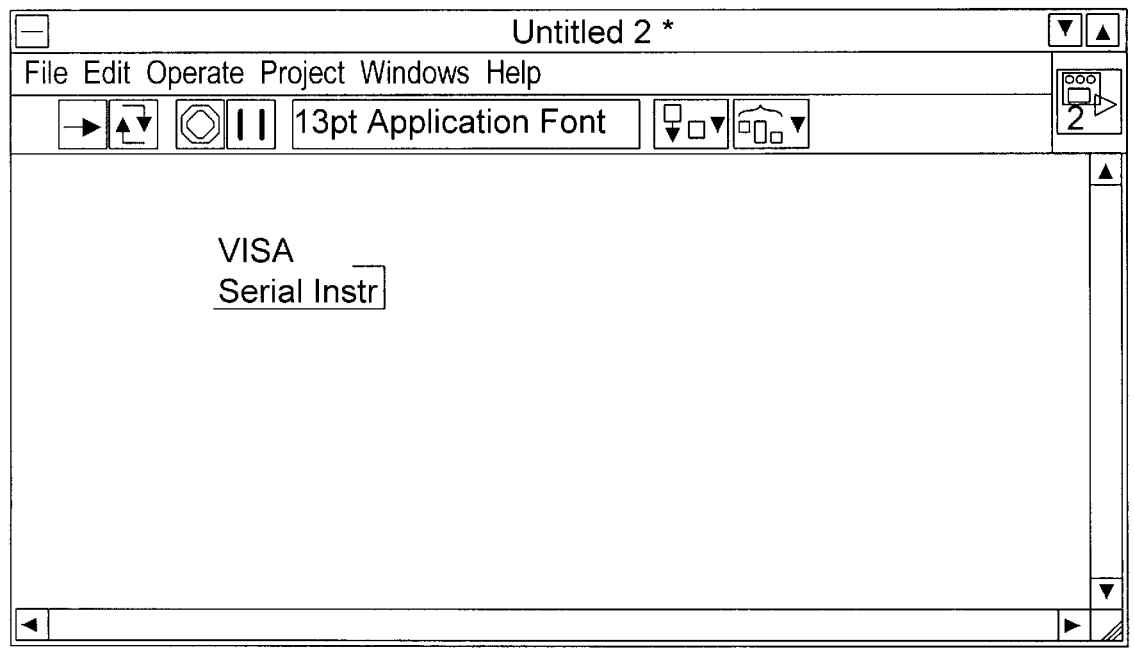
FIG. 45

SYSTEM AND METHOD FOR PERFORMING INTERFACE INDEPENDENT VIRTUAL INSTRUMENTATION FUNCTIONS IN A GRAPHICAL DATA FLOW PROGRAM

CONTINUATION DATA

This is a continuation of application Ser. No. 08/716,725, now U.S. Pat. No. 5,784,275 titled "System and Method for Performing Interface Independent Virtual Instrumentation Functions in a Graphical Data Flow Program" filed Sep. 23, 1996, whose inventors were Omid Sojoodi and Scott A. Rust, and which is assigned to National Instruments Corporation.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

CROSS REFERENCE TO RELATED APPLICATIONS

The following patents and/or patent applications are related to the present application.

U.S. Pat. No. 5,724,272 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which is assigned to National Instruments Corporation.

U.S. patent application Ser. No. 08/716,725, now U.S. Pat. No. 5,784,275 titled "System and Method for Performing Interface Independent Virtual Instrumentation Functions in a Graphical Data Flow Program" filed Sep. 23, 1996, whose inventors were Omid Sojoodi and Scott A. Rust, and which is assigned to National Instruments Corporation.

U.S. patent application Ser. No. 08/717,771, now U.S. Pat. No. 5,847,953 titled "System and Method for Performing Class Checking of Objects in a Graphical Data Flow Program" filed Sep. 23, 1996, whose inventors were Omid Sojoodi and Steven W. Rogers, and which is assigned to National Instruments Corporation.

U.S. patent application Ser. No. 08/717,772 now abandoned, titled "System and Method for Performing Type Checking and Class Propagation of Attributes in a Graphical Data Flow Program" filed Sep. 23, 1996, whose inventors were Omid Sojoodi and Steven W. Rogers, and which is assigned to National Instruments Corporation.

1. Field of the Invention

The present invention relates to virtual instrumentation, and more particularly to performing virtual instrumentation functions in a manner independent of I/O interface type in a graphical data flow program.

2. Description of the Related Art

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

Modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument (VI) operating on a central computer controls the constituent instruments or data acquisition devices from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME extension for Instrunentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bit stream of 1's and 0's directly to registers in the instrument hardware.

An instrumentation system using a data acquisition interface method typically includes transducers or sensors which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently requires the involvement of a programmer to develop software for acquisition, analysis and presentation of instrumentation data.

Modern instrumentation systems generally include high level application software which provides high level control of one or more real or virtual instruments. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

In particular, LabVIEW application software from National Instruments Corp. provides a high level graphical programming environment for controlling instruments. U.S. Pat. Nos. 4,901,221; 4,914,568; 5,291,587; 5,301,301; 5,301,336; and 5,481,741 disclose various aspects of the LabVIEW graphical programming and development system. The graphical programming environment disclosed in the above U.S. patents allows a user to construct a data flow program or diagram wherein the diagram created graphically displays a procedure or method for accomplishing a certain result, such as manipulating one or more input variables to produce one or more output variables. As the user constructs the data flow diagram using the block diagram editor, machine language instructions are automatically constructed which characterize an execution procedure which corresponds to the displayed procedure. This graphically based programming environment may be used for creating virtual instrumentation systems and modeling processes as well as for any type of general programming.

In creating a LabVIEW virtual instrument, for example, a user creates a front panel including various controls or indicators that represent the respective input and output that will be used by the VI. When the controls and indicators are created in the front panel, corresponding icons or terminals are automatically created in the block diagram by the block diagram editor. The user then chooses various functions that accomplish his desired result and connects the function icons between the terminals of the respective controls and indicators. In other words, the user creates a data flow program, referred to as a block diagram, representing the graphical data flow which accomplishes his desired function. The manipulation and organization of icons in turn produces machine language that accomplishes the desired method or process to control the instrument.

One problem with instrumentation systems is that programs which are created to control an instrumentation system are typically required to be specific to a type of I/O interface. In other words, a graphical program or virtual instrument (VI) created for one or more instruments of a first I/O interface type generally cannot be used with other instruments of other I/O interface types.

A new instrumentation programming environment is referred to as the Virtual Instrument Software Architecture (VISA). The VISA architecture provides an object-oriented environment for controlling instrumentation systems and for providing a user or developer with the capability to develop instrument drivers and application software for controlling instrumentation systems. The VISA development system is independent of I/O interface type, operating system, and programming language while also providing a consistent Application Programming Interface (API) to the user. Another new instrumentation programming environment is the Interchangeable Virtual Instruments (IVI) environment developed by National Instruments Corporation. The IVI environment allows creation of instrument drivers which are interchangeable among different I/O interface types. Another instrumentation programming environment which is intended to provide a form of I/O interface independence is referred to as SICL (Standard Instrument Control Library).

Therefore, improved methods are desired for enabling creation of graphical data flow programs which are independent of I/O interface types.

SUMMARY OF THE INVENTION

The present invention provides a graphical data flow programming system which enables a programmer to create virtual instruments which are independent of two or more different I/O interface types. In one embodiment, the graphical data flow programming system utilizes the VISA instrumentation control standard. In another embodiment, the graphical data flow programming system utilizes the IVI instrumentation control standard, or other standards such as the SICL standard. The graphical data flow programming system may use any of various other standards for I/O interface independence, as desired.

The graphical data flow programming system is comprised in an instrumentation control system comprising a computer system including a display screen and input device, an instrument coupled to the computer system, and the graphical programming system for creating and executing programs to control the instrument.

The present invention provides a session control and/or icon (also referred to as a refnum), instrumentation nodes, and an object manager. The instrumentation nodes comprise function nodes (also referred to as primitives) and an attribute node. A programmer graphically wires together icons corresponding to the instrumentation nodes to construct the execution elements of a virtual instrument or instrument driver. The programmer constructs a front panel diagram allowing a user to provide input to and receive output from the virtual instrument.

The session control represents a session, i.e., a communication channel between a software element, such as a virtual instrument, instrument driver, or instrumentation control application, and the resource or device being controlled. Examples of resources or devices include one or more GPIB, VXI, PXI, Ethernet, wireless, virtual, or serial instruments, a data acquisition card, individual elements of ftmctionality of an instrument or DAQ card, or one or more software resource objects, such as VISA objects or IVI objects, which control part or all of an instrument or perform an instrument capability or functionality. A given session has a particular class corresponding to the hardware I/O interface type of the instrument being controlled. Examples of session classes are generic instrument, VXI instrument, GPIB instrument, PXI instrument, serial instrument, etc.

The instrumentation nodes are advantageously selected by a programmer from a common instrumentation node palette. The instrumentation nodes comprise generic instrumentation nodes and specific instrumentation nodes. The generic instrumentation nodes are valid for all I/O interface types, whereas the specific instrumentation nodes are valid for only a subset of the possible I/O interface types. Advantageously, a programmer is enabled to develop graphical programs to control instruments which are independent of the I/O interface type used to couple the instrument to a computer system executing the graphical program. Further, the programmer may develop graphical programs which comprise generic and specific instrumentation nodes for controlling an instrument of a first I/O interface type, wherein only a portion of the specific instrumentation nodes must be replaced in order to control an instrument of a second I/O interface type. That is, the program requires relatively much smaller amounts of modification over previous programming environments, in order to port the program to be able to control instruments of a different I/O interface types.

Thus the present invention provides the instrumentation control application developer access to the features of I/O interface independence, such as through the VISA, SICL, or IVI standards, within the framework of a graphical programming environment and the accompanying benefits of a graphical programming environment and device resource independent I/O control library.

The system advantageously performs type propagation checking to insure that the function associated with a given function node, or the attributes of a given attribute node, wired to a given session are valid for the session. Additionally, the system advantageously propagates the class of a session to a node, such as an attribute node, when the two are wired together. The type propagation checking and class propagation features of the present system provide immediate debugging information and are highly beneficial in helping the programmer to develop an error free instrument control program, and to do so in a more timely fashion.

The system comprises a front panel window and a block diagram window upon which the icons are displayed. The front panel provides a graphical representation of the virtual instrument being controlled. The block diagram provides a graphical representation of a procedure or method for accomplishing a certain result. The procedure or method comprises, inter alia, receiving one or more input variables, performing functions on the inputs, getting and setting attributes of the session, and producing one or more output variables. In an alternate embodiment, the functionality of the block diagram and front panel are combined into a single window.

The instrumentation controls and nodes comprise attributes, methods and events according to the notion of objects in object-oriented programming environments. The instrumentation controls and nodes include a method for displaying the objects, in the form of icons in the block diagram, or controls and indicators in the virtual instrument front panel. The controls and nodes further comprise methods for performing type propagation checking and class propagation. Still further, the controls and nodes comprise methods for generating code associated with the objects. The code generation methods generate code to invoke corresponding executable functions in an I/O Control Library. The code passes to the executable functions the necessary input parameters. A portion of the input parameters are received by the input terminals of the instrumentation nodes. Further, output terminals of the instrumentation nodes provide output values received from the executable functions. The attribute node code generation methods generate code to invoke executable get or set attribute functions for each attribute specified in the attribute node.

One of the function icons represents the performance of an "open" operation. The open operation opens a session to a specified resource. The open icon receives a resource name and provides an identifier, or handle, uniquely identifying the open session to the resource. The refnum provides the user with a means of viewing a list of currently open sessions within the system and allows the user to associate the refnum with open sessions of the same class as the refnum.

The instrumentation node icons in the block diagram comprise terminals which the user wires together using a wiring tool. The instrumentation node icons comprise a session input terminal and session output terminal. The session input terminal receives a type descriptor indicating the class of the session for which the function is being performed. The input terminal receives the type descriptor from an upstream node along a wire connecting the input terminal and the upstream node. The upstream node is either a session refnum, or another instrumentation node. The type descriptor is received at the input node and passed through to the session output terminal. The session output terminal is also referred to as a dup (duplicate) session. The initial upstream node is preferably a session refnum defining the class of the session. Thus the session class is preferably propagated through to each instrumentation node in the block diagram.

The system advantageously performs type propagation checking in response to at least three different forms of user input, among others.

First, when the user wires a node to a function node, the type propagation code for the function node determines if the function is a valid function for the class passed to the session input terminal of the function node. If not, the system indicates an invalidity condition, preferably by displaying a broken wire on the block diagram between the node and the function node. If the function is valid, the system does not indicate an invalidity condition, e.g., displays a valid wire. Additionally, if the function is invalid for the class, the programming environment prevents the virtual instrument from being executed.

Second, when the user wires a node to an attribute node, the type propagation code for the attribute node determines if each of the attributes shown in the attribute node is a valid attribute for the class passed to the session input terminal of the attribute node. The system preferably displays invalid attribute names in a first manner or color indicating an invalid attribute, and displays valid attribute names in a different manner, i.e., in colors other than the first color indicating valid attributes. Additionally, the user may change the class of an attribute node directly using a pop-up menu on the node. The system performs similar type checking upon that action as well.

Third, the user is allowed to change the class of a refnum. When the user changes the class of the refnum, the new class is provided on any wires connected to the refnum terminal. The type propagation method for each instrumentation node receiving the wire determines if the function or attributes of the node are valid for the new class. If not, then in the case of a function node, the system preferably displays a broken wire, and in the case of an attribute node, the system displays an invalid attribute. The programming environment prevents the virtual instrument from being executed in the presence of a class conflict.

In addition, the system advantageously performs class propagation of sessions to nodes. When a user wires a node to an attribute node, the attribute node receives the class of the session wired to the attribute node. In response, the class of the attribute node is changed to the class of the session to which the attribute node is wired in the event that the class of the attribute node was different than that of the session.

The system comprises an object manager which maintains data structures containing information about the various classes of the objects in the system. The object manager provides functions which the type propagation checking and class propagation code call to perform their respective functions. The object manager constructs its data structures by parsing a class definition file provided in the system.

Therefore, the present invention comprises a system and method for performing interface independent virtual instrumentation using a graphical programming environment. The present invention provides various methods for performing type or class propagation or checking to insure the creating of a valid program. The present invention thus provides a novel system and method for creating graphical programs which control instruments or perform instrumentation functions.

BRIEF DESCRIPTION OF THE DRAWINGS

A better understanding of the present invention can be obtained when the following detailed description of the preferred embodiment is considered in conjunction with the following drawings, in which:

FIG. 2a is a block diagram of the computer of the control system of FIG. 1a;

FIG. 4 is a screen shot illustrating a pop-up menu of a VISA session control of FIG. 3;

FIG. 5 is a screen shot illustrating the VISA Open Sessions pull-right menu of the VISA session control;

FIG. 6 is a screen shot illustrating the block diagram and front panel of an exemplary VISA virtual instrument of FIG. 3;

FIGS. 9a–9f are screen shots illustrating various steps of FIG. 8;

FIG. 11 is a block diagram illustrating groupings of VISA resources according to I/O interface type;

FIG. 12 is a screen shot illustrating a VISA graphical program operable to control a GPIB I/O interface type device;

FIG. 14 is a screen shot of the VISA graphical program of FIG. 12 having been modified to control a VXI/GPIB-VXI RBD I/O interface type instrument;

FIGS. 16–20 are screen shots illustrating various steps of FIGS. 15a and 15b;

FIGS. 23–26 are screen shots illustrating various steps of FIGS. 22a and 22b;

FIGS. 27–29 are screen shots illustrating various aspects of the VISA attribute node of FIG. 3;

FIGS. 31–38 are screen shots illustrating various steps of FIG. 30;

FIGS. 41–42 are screen shots illustrating various steps of FIGS. 40a and 40b;

FIGS. 44–45 are screen shots illustrating various steps of FIGS. 43a and 43b.

DETAILED DESCRIPTION OF THE PREFERRED EMBODIMENT

Incorporation By Reference

U.S. Pat. No. 5,724,272 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which is assigned to National Instruments Corporation (5150-02900), is hereby incorporated by reference in its entirety as though fully and completely set forth herein.

U.S. Pat. No. 5,717,614 titled "System and Method for Handling Events in an Instrumentation System" filed May 10, 1995, whose inventors were Abhay Shah, Jogen Pathak, Bob Mitchell, Hugo Andrade, Samson DeKey, and Todd Brower, and which is assigned to National Instruments Corporation (5150-10500), is hereby incorporated by reference in its entirety as though fully and completely set forth herein.

U.S. Pat. No. 5,481,741 titled "Method and Apparatus for Providing Attribute Nodes in a Graphical Dataflow Environment" (5150-01100) is hereby incorporated by reference in its entirety as though fully and completely set forth herein.

U.S. patent application Ser. No. 09/045,243 titled "Instrumentation System and Method for Using Generic Instrument Drivers" and filed Mar. 20, 1998 (5150-20401) is hereby incorporated by reference in its entirety as though fully and completely set forth herein.

Instrumentation control system

Figure 1:
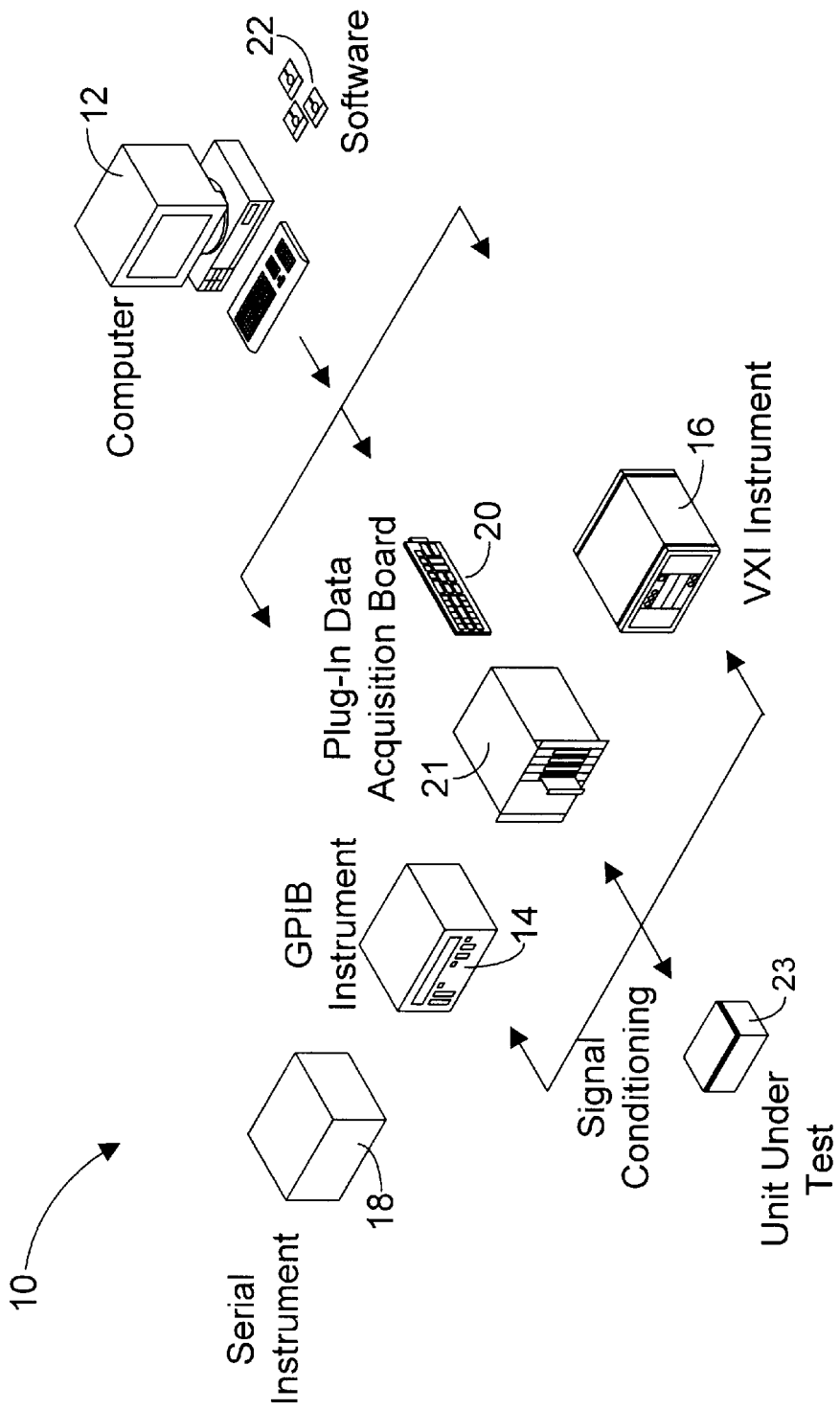
FIG. 1 illustrates an instrumentation control system according to the present invention.

Referring now to FIG. 1, an instrumentation control system 10 is shown. FIG. 1 illustrates the possible connectivity options in an instrumentation system. The system 10 comprises a computer 12, which connects to one or more instruments. The one or more instruments may include a GPIB instrument 14, a VXI instrument 16, a serial instrument 18 and/or a data acquisition board 20. The one or more instruments may also include a PXI instrument. The GPIB instrument 14 is coupled to the computer 12 via a GPIB interface provided by the computer 12. The VXI instrument 16 is coupled to the computer 12 via a VXI bus or MXI bus provided by the computer. The serial instrument 18 is coupled to the computer 12 through a serial port, such as an RS-232 port, provided by the computer 12. Finally, the data acquisition board 20 is coupled to the computer 12, typically by being plugged in to an I/O slot in the computer such as a PCI bus slot, an ISA bus slot, an EISA bus slot, or a MicroChannel bus slot provided by the computer 12. In typical instrumentation control systems an instrument will not be present of each interface type and in fact many systems may only have one or more instruments of a single interface type, such as only GPIB instruments. The term "instrument" used herein also includes software code or software objects, such as VISA software resource objects, which implement instrument functionality or are used to control instruments.

The instruments are coupled to a unit under test (UUT) 23, process or are coupled to receive field signals, typically generated by transducers. The system 10 may be used in a data acquisition and control application, or may instead be used in a test and measurement application. If the system 10 is used in a data acquisition application, the system 10 also include signal conditioning circuitry 21 coupled between the data acquisition board 20 and transducers.

The system 10 preferably includes a memory media on which computer programs according to the present invention are stored. In the present application, the term "memory media" is intended to include installation media, such as floppy disks, CD-ROMs, ZIP drives, etc., computer system memory such as DRAM, SRAM, EDO RAM, etc., and non-volatile memory, such as a magnetic media, e.g., a hard drive, or optical storage. The present invention preferably comprises a software program stored on a memory and/or hard drive of the computer and executed by a CPU of the computer. The CPU executing code and data from the memory thus comprises a means for performing various instrumentation control functions according to the steps described below.

The system 10 shown is indicative of instrumentation control systems, i.e., systems in which an I/O control library is used by an instrument control application to control the instruments comprised therein.

Figure 1A:
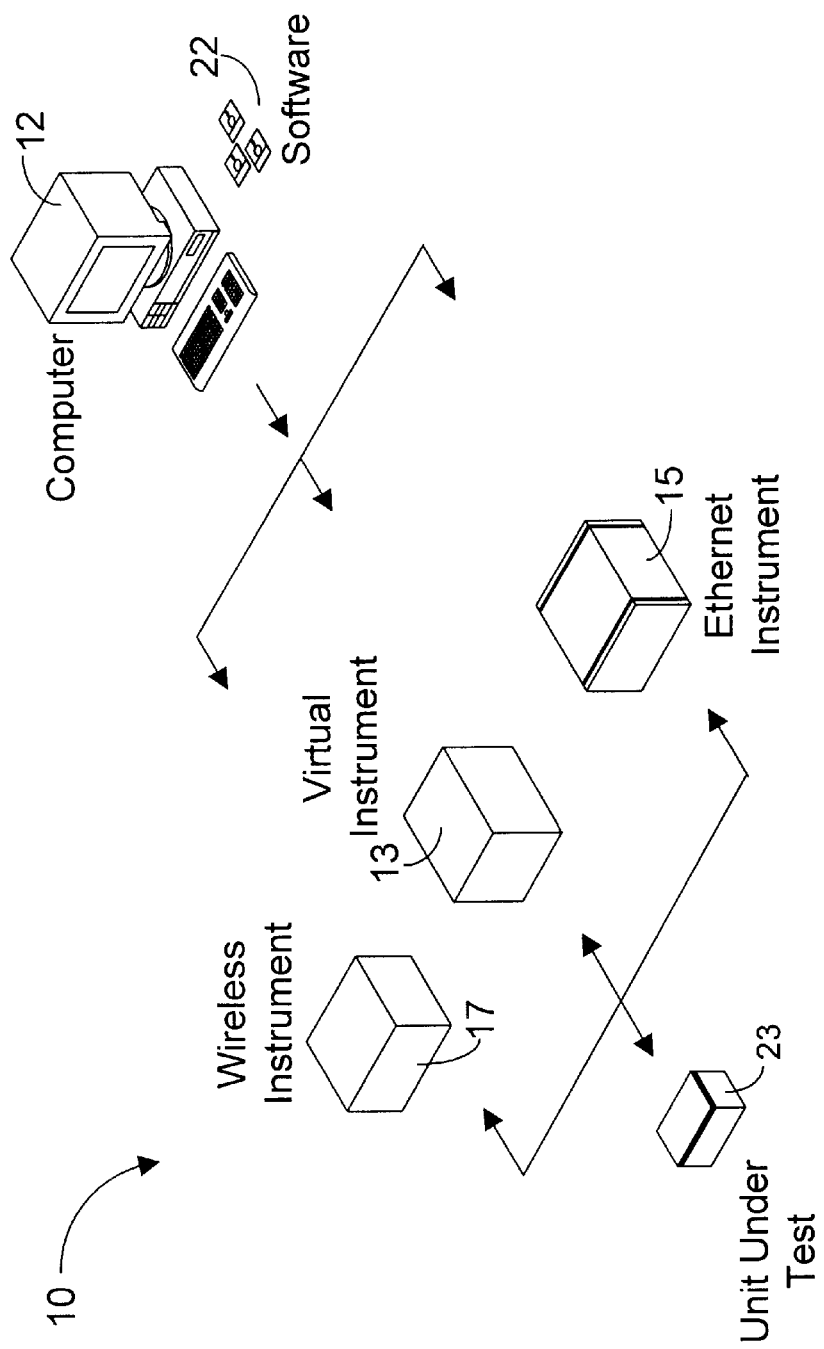
FIG. 1a illustrates an instrumentation control system similar to that of FIG. 1 comprising further instrument types.

Referring now to FIG. 1a, further possible connectivity options in the instrumentation system of FIG. 1 are shown. The system 10 is similar to that shown in FIG. 1 and corresponding elements are numbered identically. The computer 12 connects to an Ethernet instrument 15, a wireless instrument 17, and a virtual instrument 13. The Ethernet instrument 15 is an instrument with an Ethernet interface for coupling to the computer 12. The wireless instrument 17 is an instrument with a wireless communications interface, such as a radio frequency (RF) or infrared (IR) communications interface. The virtual instrument 13 is an instrument executing on a computer system. The computer system executing the virtual instrument 13 is coupled to the computer 12 by any communications means suitable for enabling two computer systems to transfer data between each other. Examples of such communications means are Ethernet networks, Token-Ring networks, the GPIB bus, asynchronous serial interfaces, the SCSI bus, etc.

Figure 2:
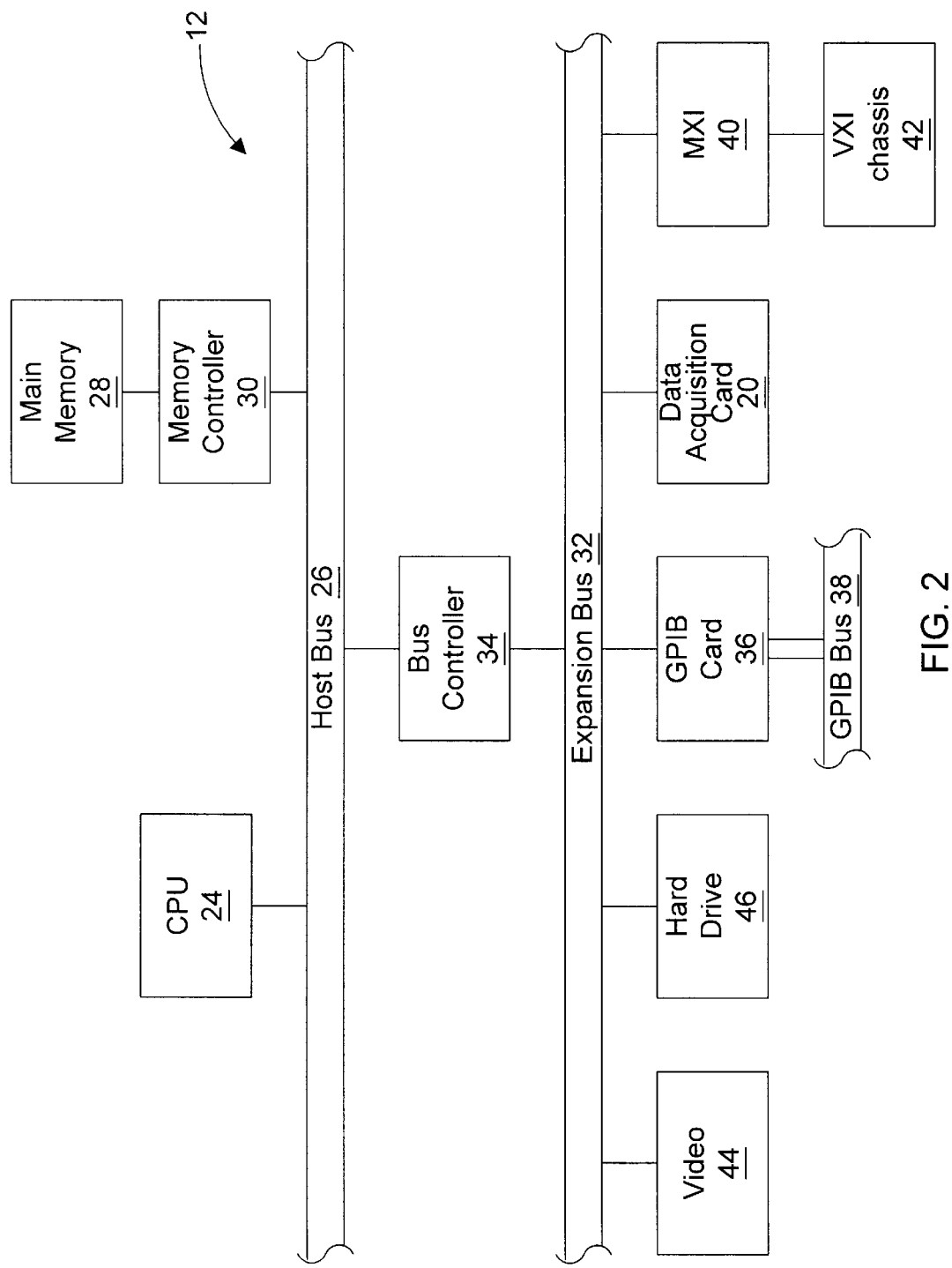
FIG. 2 is a block diagram of the computer of the control system of FIG. 1.

Referring now to FIG. 2, a block diagram of the computer 12 (of FIG. 1) is shown. The elements of a computer not necessary to understand the operation of the present invention have been omitted for simplicity. The computer 12 includes at least one central processing unit or CPU 24 which is coupled to a processor or host bus 26. The CPU 24 may be any of various types, including an x86 processor, a PowerPC processor, a CPU from the Motorola family of processors, a CPU from the SPARC family of RISC processors, as well as others. Main memory 28 is coupled to the host bus 26 by means of memory controller 30. The main memory 28 stores the various portions of instrumentation control software, including, inter alia, instrumentation control application software, an I/O control library, code and data for the instrumentation nodes and controls, an object manager for managing objects, namely instances of session classes, and a class definition file containing class information about the session classes. The main memory 28 also stores operating system software as well as the software for operation of the computer system, as well known to those skilled in the art. The instrumentation control software will be discussed in more detail below.

The host bus 26 is coupled to an expansion or input/output bus 32 by means of a bus controller 34. The expansion bus 32 includes slots for various devices such as the data acquisition board 20 (of FIG. 1), a GPIB interface card 36 which provides a GPIB bus interface 38 to the GPIB instrument 14 (of FIG. 1), and an MXI bus card 40 coupled to a VXI chassis 42 for receiving instruments such as the VXI instrument 16 (FIG. 1). The computer 12 further comprises a video display subsystem 44 and hard drive 46 coupled to the expansion bus 32.

Figure 2A:
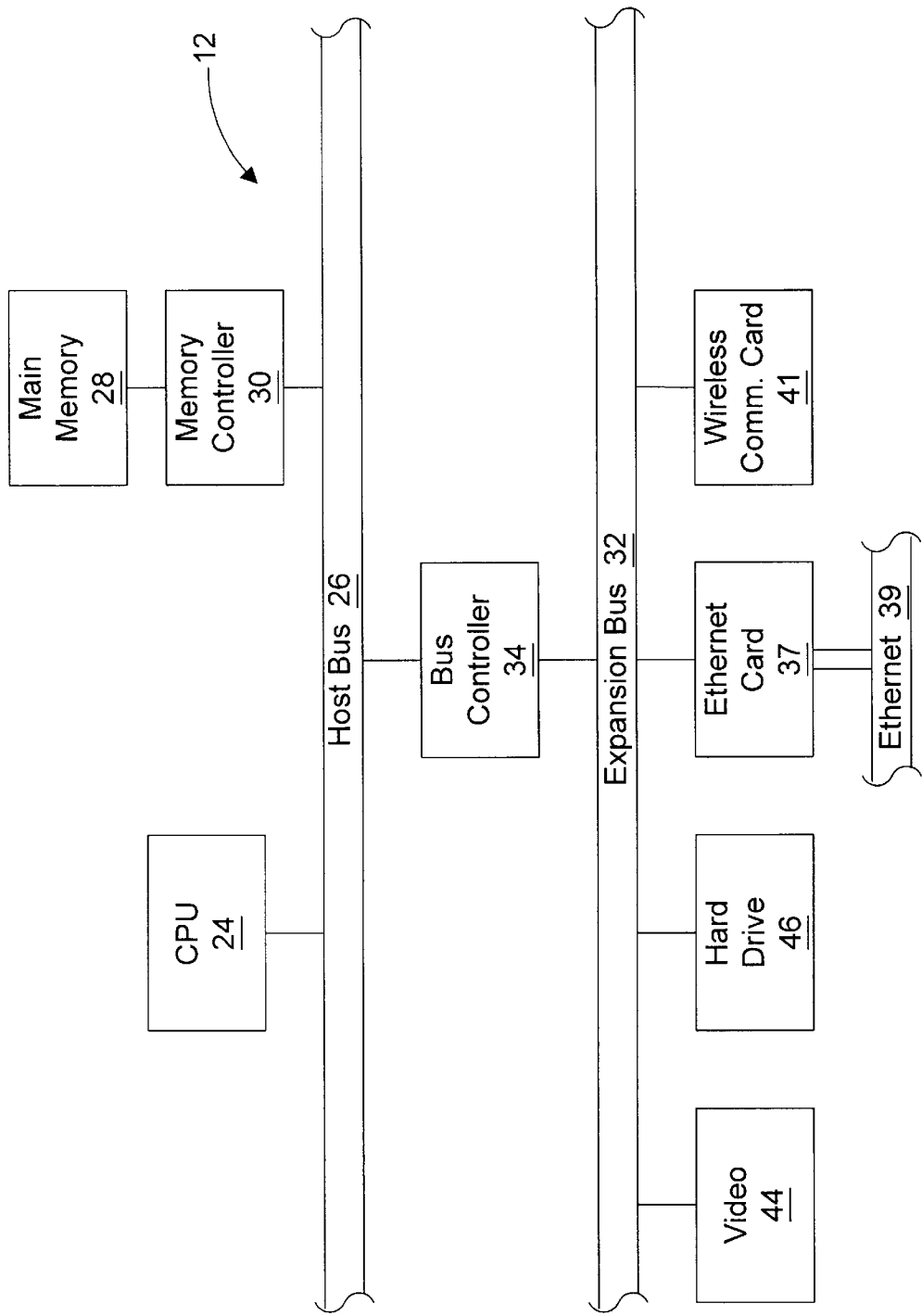

Referring now to FIG. 2a, a block diagram of the computer 12 (of FIG. 1a) is shown. The computer 12 is similar to that shown in FIG. 2 and corresponding elements are numbered identically. The expansion bus 32 includes slots for various devices such as an Ethernet card 37 which provides an Ethernet interface 39 to the Ethernet instrument 15 (of FIG. 1a), and a wireless communication interface card 41 which provides wireless communications with the wireless instrument 17 (FIG. 1a).

I/O Interface Standards

The present invention provides a graphical data flow programming system which enables a programmer to create virtual instruments which are independent of two or more different I/O interface types. It is noted that present invention may use any of various types of standards for I/O interface independence.

In one embodiment, the graphical data flow programming system utilizes the VISA instrumentation control standard. In another embodiment, the graphical data flow programming system utilizes the IVI instrumentation control standard, or other standards such as the SICL standard. The graphical data flow programming system may use any of various other standards for I/O interface independence, as desired.

In the following description, the present invention is described with reference to the VISA standard, which is the currently preferred embodiment. It is noted that the present invention is not limited to this standard. For more information about VISA resources and the VISA standard in general, please see the Virtual Instrument Software Architecture (VISA) specification, VPP-4.1, which is an appendix to U.S. Pat. No. 5,724,272.

Instrumentation Control System

Figure 3:
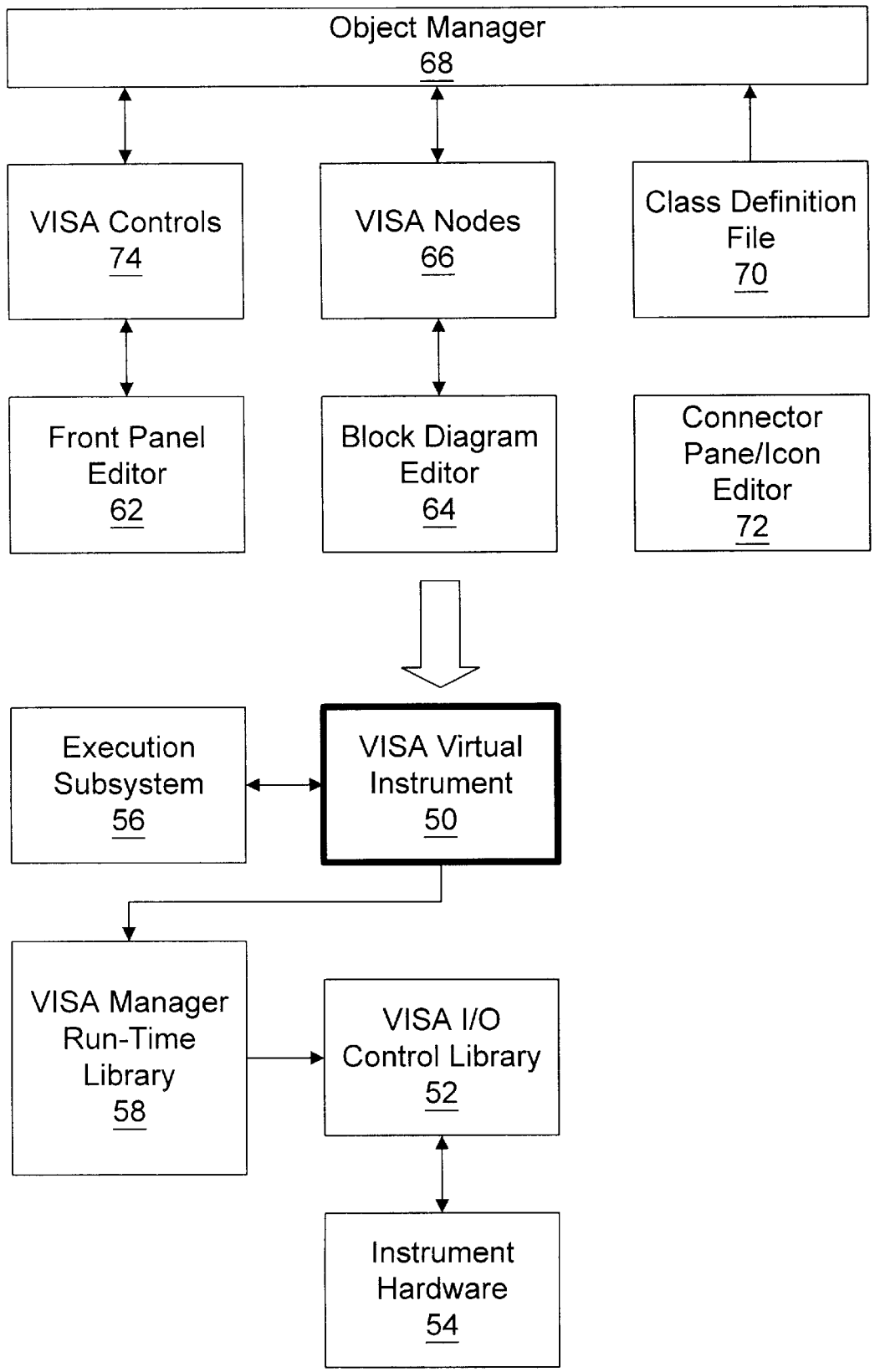
FIG. 3 is a block diagram illustrating the relationship of portions of the instrumentation control system of FIG. 1.

Referring now to FIG. 3, a block diagram illustrating the relationship of portions of the instrumentation control system 10 (of FIG. 1) are shown. The elements shown in FIG. 3 (with the exception of the hardware instrument 54) are software elements which are executed on the computer 12 (of FIG. 1). A programmer employs a front panel editor 62, a block diagram editor 64, and a connector pane/icon editor 72 of a graphical programming environment to produce a VISA virtual instrument (VI) 50. The block diagram editor 64 generates executable instructions, i.e., machine language instructions, in response to the VI 50. The VI 50 developed by the programmer is executed by an execution subsystem 56 of the graphical programming environment to control an instrument 54. The instrument 54 is illustrative of instruments such as those of FIG. 1 having I/O interfaces supported by the VISA standard.

Referring ahead briefly to FIG. 6, a screen shot of a graphical programming environment, according the present invention, including a VISA virtual instrument exemplary of the VI 50 of FIG. 3 is shown. The screen shot of FIG. 6 comprises an instrument front panel in a window in the upper portion of the screen and a block diagram in a window in the lower portion of the screen. The block diagram comprises program execution elements, referred to as nodes, which are wired together to produce a dataflow program. The front panel comprises controls for providing input data to the block diagram and indicators for receiving and/or displaying output data from the nodes of the block diagram.

Preferably the graphical programming system comprises portions of the National Instruments LabVIEW 4.0 product. The programming system further includes an object manager for managing objects used by a programmer to create instrumentation control applications and instrument drivers. The drawings of the present disclosure include numerous screen shots displayed during the execution of LabVIEW 4.0, which includes support for the VISA standard. In the screen shots, LabVIEW is executing under the supervision of the MICROSOFT WINDOWS NT operating system. For more information on the LabVIEW graphical programming environment of the prefeerred embodiment, please see U.S. Pat. No. 5,481,741 referenced above.

Referring again to FIG. 3, the graphical programming environment further comprises a VISA session control 74. The front panel editor 62 communicates with the VISA session control 74, which in turn communicates with an object manager 68 to produce a VI front panel.

Figure 9C:
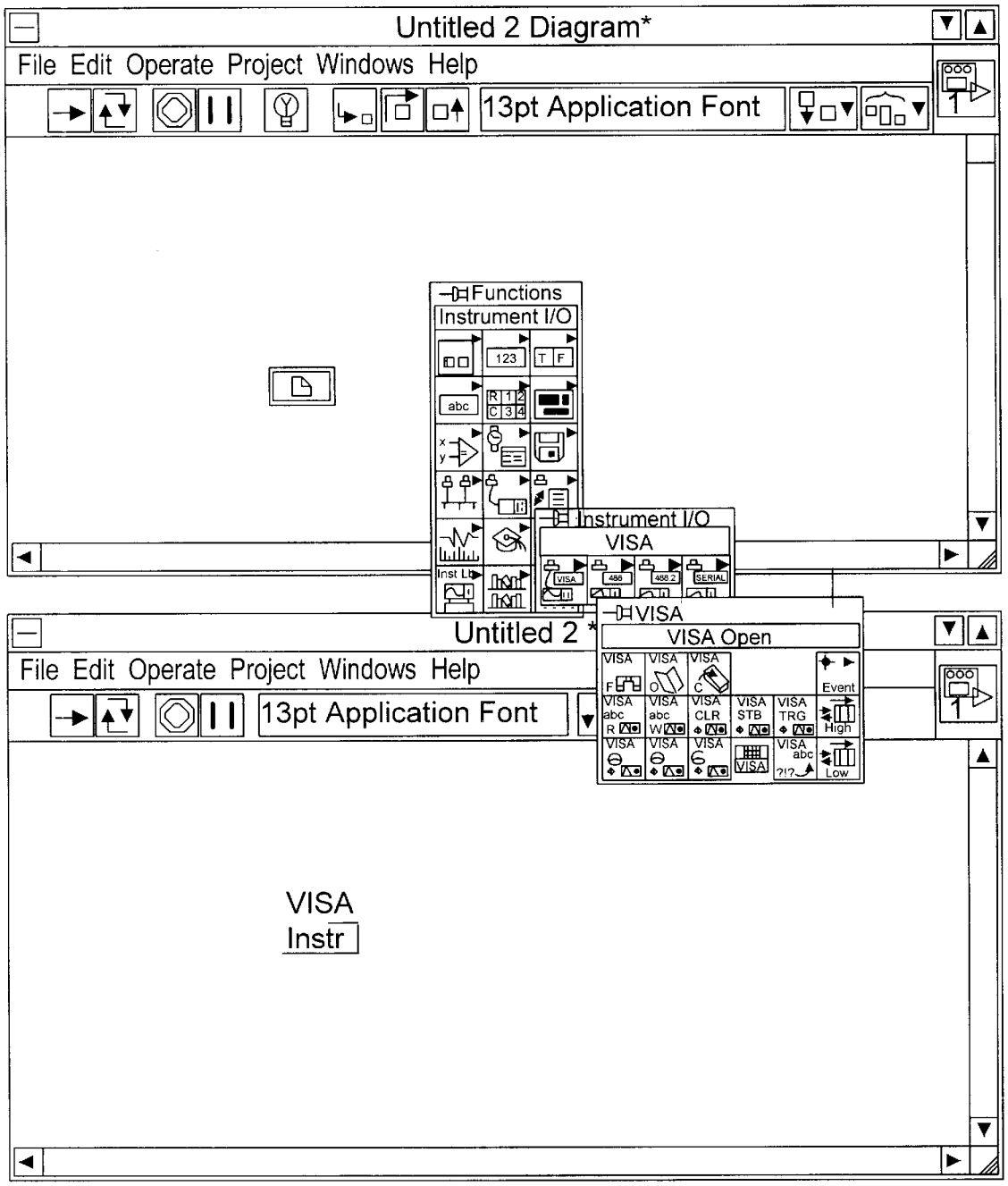

The graphical programming environment further comprises VISA nodes 66. The VISA nodes 66 are shown in FIG. 9c and are listed in the discussion of FIG. 9c. The block diagram editor 64 communicates with the VISA nodes 66, which in turn communicate with the object manager 68 to produce a VI block diagram. The object manager 68 parses a class definition file 70 to acquire information necessary to perform object management operations. The VISA session control 74, VISA nodes 66, and object manager 68 will be discussed in more detail below.

The graphical programming environment further comprises a connector pane/icon editor 72 for forming VI's into subVI's, i.e., a VI which may be used as a graphical programming element in another VI. The reader is referred to U.S. Pat. No. 5,301,336 for more information about the subVI's and the icon editor 72.

The execution subsystem 56 executes the executable instructions constructed from a block diagram of the VI 50, such as the block diagram of FIG. 4. For more information about the execution subsystem 56 the reader is referred to U.S. Pat. No. 5,481,741.

Preferably, the VI 50 executes VISA executable functions of a VISA I/O control library 52 indirectly through the services of a VISA manager run-time library 58. The VISA I/O control library 52 preferably comprises a dynamic link library (DLL) in the Windows environment, a code fragment in the MacIntosh environment, and a shared library on Unix platforms. The VISA library 52 comprises executable functions which are called by the VI 50 to perform various operations in order to control the instrument 54. Examples of the executable functions are viopen(), viClose(), viRead(), viwrite(), viSetAttribute(), viGetAttribute(), vipeek(), viPoke(), viAssertTrigger(), viClear(), and viReadSTB(). These functions perform operations to control the instrument 54 as defined in the VISA specification in Appendix C. VISA resources comprise the operations, along with numerous attributes defined in the VISA specification. The VISA nodes 66 and VISA session control 74 comprise various classes and objects, according to the notion of classes and objects in the art of object-oriented programming. These classes and objects correspond to the resources in the VISA I/O Control library 52 as will be explained in more detail below.

The VI 50 comprises the instrument control application, or a portion thereof, for controlling the instrument 54. The VI 50 is a VISA VI which represents and controls an instrument 54 according to the VISA specification. The VISA VI 50 uses executable functions from the VISA I/O control library 52. VISA functionality may be created using conventional text-based programming techniques, namely, using a text editor or similar program to enter high-level textual language or assembly language source code statements into a file for compilation and execution.

The present invention advantageously provides a graphical system and method for producing the VI 50, the method having a number of benefits. These benefits include reduction in the development time required to create the VI 50 as well as reduction of the number of code defects in the VI 50. Yet another benefit is the simplicity of programming which makes the development of an instrumentation control program more practical for a larger number of people, i.e., those who might not have the skills, or resources to develop the skills, to develop programs according to more conventional text-based methods. The present invention also provides class propagation, class checking and type checking in a graphical programming environment, thus simplifying program development.

Preferably the VI 50 executes the VISA executable functions of the VISA I/O control library 52 indirectly through the services of a VISA manager run-time library 58. The VISA manager run-time library 58 advantageously performs housekeeping functions which make possible features of the programming environment. An example of the housekeeping functions provided by the VISA manager run-time library 58 is keeping track of open VISA sessions within the system.

Referring now to FIG. 4, a screen shot illustrating a pop-up menu of a VISA session control 74 (of FIG. 3) is shown. The bottom menu item in the pop-up menu is the "Open Sessions" menu item. It is noted that in FIG. 4 the Open Sessions item is greyed out, i.e., not accessible to the user. This is because at the time in which the menu was popped up, no open VISA sessions were available in the system 10 (of FIG. 1).

Referring now to FIG. 5, a screen shot illustrating a pop-up menu of a VISA session control 74 (of FIG. 3) after the block diagram of FIG. 4 was executed is shown. The block diagram of FIG. 4 performs an open of a VISA session with the VISA resource having a VISA resource name "ASRL1." It is noted that the Open Sessions item is no longer greyed out and the Open Sessions pull-right menu displays an open session choice, namely an open session with a VISA serial instrument of resource name ASRL1.

The VISA manager run-time library 58 maintained information indicating that the ASRL1 resource was opened when the block diagram of FIG. 4 was executed and the VISA open operation successfully performed. This was possible because the call by the VI 50 (of FIG. 3) to the viOpen() routine of the VISA I/O control library 52 was made indirectly to the VISA manager run-time library 58, thus allowing the VISA manager run-time library 58 to maintain the information about the open session. That is, the VI called a function in the VISA manager run-time library 58, which in turn called the viOpen() function after performing the housekeeping functions.

When the Open Sessions pull-right menu displays the open VISA sessions in the system it greys out open sessions which are not of the same class as the VISA refnum. This advantageously prevents programming errors due to class conflicts by disallowing the user to choose an invalid open session. It is noted that the open sessions list is only available on refnums that are on the panel of an idle VI, i.e., VI's which are not currently running. Further more, it is possible that the session selected from the list may become invalid if other VIs are running in the system. For example, ASRL1 in FIG. 5 was available when the open sessions list was created was created. If another VI in the system closes the resource ASRL1 as the menu is being tracked, it will be invalid if it is selected. Using this resource will then likely result in a VISA runtime error.

The present invention contemplates an alternate embodiment in which executable instructions of the VI 50 make direct calls to the executable VISA functions in the VISA I/O control library 52 rather than indirect calls through the VISA manager run-time library 58.

Virtual Instrument Example

Referring again to FIG. 6, a screen shot of the front panel and block diagram of an exemplary VI created using a graphical programming system according the present invention is shown. The front panel of the VI, titled "write read", is displayed in a front panel window in the bottom portion of the screen. The block diagram corresponding to the front panel is displayed in the block diagram window in the upper portion of the screen. The front panel consists of controls for providing input to the instrument and indicators for receiving output from the instrument. The block diagram consists of nodes, terminals and wires. The nodes are the program execution elements of the virtual instrument. The terminals are ports through which data passes between the block diagram and the front panel, as well as between nodes on the block diagram. The wires are the data paths between the input and output terminals of the nodes, controls and indicators.

The VI opens a VISA resource, writes to the resource, reads from the resource, checks the status of the open, write and read operations, and then closes, i.e., releases, the resource.

The front panel shows a VISA session control (also referred to as a VISA refnum) having a label "Serial Instr" and representing a session to a VISA serial instrument, i.e., an instrument which interfaces to the computer 12 (of FIG. 1) via an asynchronous serial connection such as RS-232. The VISA session control is an object which is an instance of the class Serial Instr, a VISA instrument class according to the present invention. The VISA classes of the present invention comprise the Serial Instr class, a GPIB Instr class, a VXI/GPIB-VXI MBD (VXI or VXI to GPIB Message Based Device) Instr class, a VXI/GPIB-VXI RBD (VXI or VXI to GPIB Register Based Device) Instr class, and the Instr class. The invention contemplates an Ethernet Instr class, a Wireless Instr class, and a Virtual Instr class. The Instr class is a class encompassing the union of the other VISA instrument classes according to the present invention. The methods and attributes of the VISA classes will be discussed in more detail throughout the disclosure and in particular during the discussion of the class definition file and object manager.

A corresponding VISA session refnum node is wired to the upper left corner of a "VISA Open" function node in the block diagram. The VISA open function node represents the performance of a VISA open operation, i.e., a call to the VISA viOpen() routine in the VISA I/O Library 52 (of FIG. 3). When a block diagram, such as the one shown in FIG. 6, is to be run, the code generation method of the VISA open function node is invoked and the method generates a code fragment, preferably a machine language code fragment, which makes a call to the VISA manager run-time library 58 (of FIG. 3), which in turn calls the viOpen() routine.

The viOpen() routine opens a session to the resource specified in the resource name input parameter corresponding to the resource name input terminal of the VISA open function node. The VISA refnum node provides the VISA open function with the class of the VISA session to be opened, in this case the class Serial Instr corresponding to a VISA serial instrument. The VISA class provided by the VISA refnum node to the VISA open function node enables the VISA open function node to advantageously perform a check to verify that the class specified is valid for the class of the resource name specified. The viOpen() routine returns a VISA session identifier, or handle, which the VISA open function node provides on a VISA session output terminal. Preferably the VISA session identifier is a pointer to a VISA session control object. A wire connected to the upper right hand corner of the VISA open function node is connected to the VISA session identifier output terminal.

The front panel further comprises a resource name string control, by which the user inputs a string specifying the name of the resource, i.e., instrument to be controlled. This resource name is provided to the resource name input terminal of the VISA open function node via the resource name string node associated with the resource name string control. In this example, the asynchronous serial port number 1 on the computer 12 is specified by the string "ASRL1". For a description of the grammar used to specify VISA resource names the user is referred to the VISA specification.

The block diagram further comprises a "VISA Write" function node wired to the VISA open function node. The VISA write function node represents the performance of a VISA write function, i.e., the code generation method of the VISA write function node class generates a call to the VISA manager run-time library 58, which in turns calls the VISA viWrite() routine in the VISA I/O Library 52. The viWrite() routine performs a write of a specified number of bytes from a specified buffer in the memory of the computer 12 (of FIG. 1) to an instrument specified by the VISA session identifier. The number of bytes, write buffer and VISA session identifier are specified by the input parameters to the viWrite() routine. The VISA write function node comprises input terminals corresponding to the write buffer and VISA session identifier of the viWrite() routine. The user provides the string to be written to the instrument by means of a write buffer string control on the front panel. The write buffer control provides the string to the write buffer input terminal of the VISA write function node. The code generation method of the VISA write function node supplies the byte count corresponding to the size of the buffer to be written.

Preferably the VISA write function node represents a call to the viWriteAsync() routine. A user may selectively choose to perform writes synchronously, in which case the viWrite() routine is invoked.

The front panel further comprises a write buffer control, by which the user inputs a string specifying the name of a buffer containing the data to be written to the instrument. The front panel further comprises a string read indicator, which displays the string of bytes read from the instrument.

During execution of the VI, the VISA session identifier returned by the viOpen() routine is passed to the VISA write function node VISA session identifier input terminal from the VISA open function node VISA session identifier output terminal along the wire connecting the two terminals.

The block diagram further comprises a "VISA Read" function node coupled to the VISA write function node. The VISA read function node represents the performance of a VISA read function, i.e., the code generation method of the VISA read function node class generates a call to the VISA manager run-time library 58, which in turns calls the VISA viRead() routine in the VISA I/O Library 52. The viReado routine performs a read of a specified number of bytes from an instrument, specified by the VISA session identifier, to a specified buffer. The number of bytes to read, the buffer, and VISA session identifier are specified by the input parameters to the viRead() routine. The VISA read function node comprises input terminals corresponding to the byte count to be read and the VISA session identifier of the viRead() routine. A constant node in the block diagram provides the byte count, in this case 200, to the byte count input terminal of the VISA read function node.

The front panel further comprises a string read indicator which receives the string read from the instrument from the VISA read function node read buffer output terminal and displays the string on the front panel. The front panel further comprises a return count indicator which receives the number of bytes successfully read from the instrument from the VISA read function node return count output terminal and displays the string on the front panel. The VISA read function node is similar to the VISA write function node in that it receives a VISA session identifier and provides a duplicate VISA session identifier.

Preferably the VISA read function node represents a call to the viReadAsync() routine. A user may selectively choose to perform reads synchronously, in which case the viRead() routine is invoked.

The block diagram further comprises a "VISA Status Description" function node coupled to the VISA read function node. The VISA status description function node represents the performance of a VISA status description function, i.e., the code generation method of the VISA status description function node class generates a call to the VISA manager run-time library 58, which in turns calls the VISA viStatusDesc() routine in the VISA I/O Library 52. The viStatusDesc() routine returns a user-readable description of the status code passed as a parameter to the routine. The error in input terminal of the VISA status description function node receives the status code. The VISA session input terminal of the VISA status description function node receives the VISA session identifier which is passed to the viStatusDesc() routine. The reader is referred to the discussion of FIG. 7 for an explanation of the error in input terminal.

The front panel further comprises a status description indicator which receives the status description from the VISA status description function node status description output terminal and displays the status description string on the front panel. The VISA status description function node is similar to the VISA read function node in that it receives a VISA session identifier and provides a duplicate VISA session identifier.

The block diagram further comprises a "VISA Close" function node coupled to the VISA status description function node. The VISA close function node represents the performance of a VISA close function, i.e., the code generation method of the VISA close function node class generates a call to the VISA manager run-time library 58, which in turns calls the VISA viClose() routine in the VISA I/O Library 52. The viClose() routine performs a close of a VISA session specified by the VISA session identifier input parameter. The VISA session input terminal of the VISA close function node receives the VISA session identifier which is passed to the viClose() routine.

Figure 7:
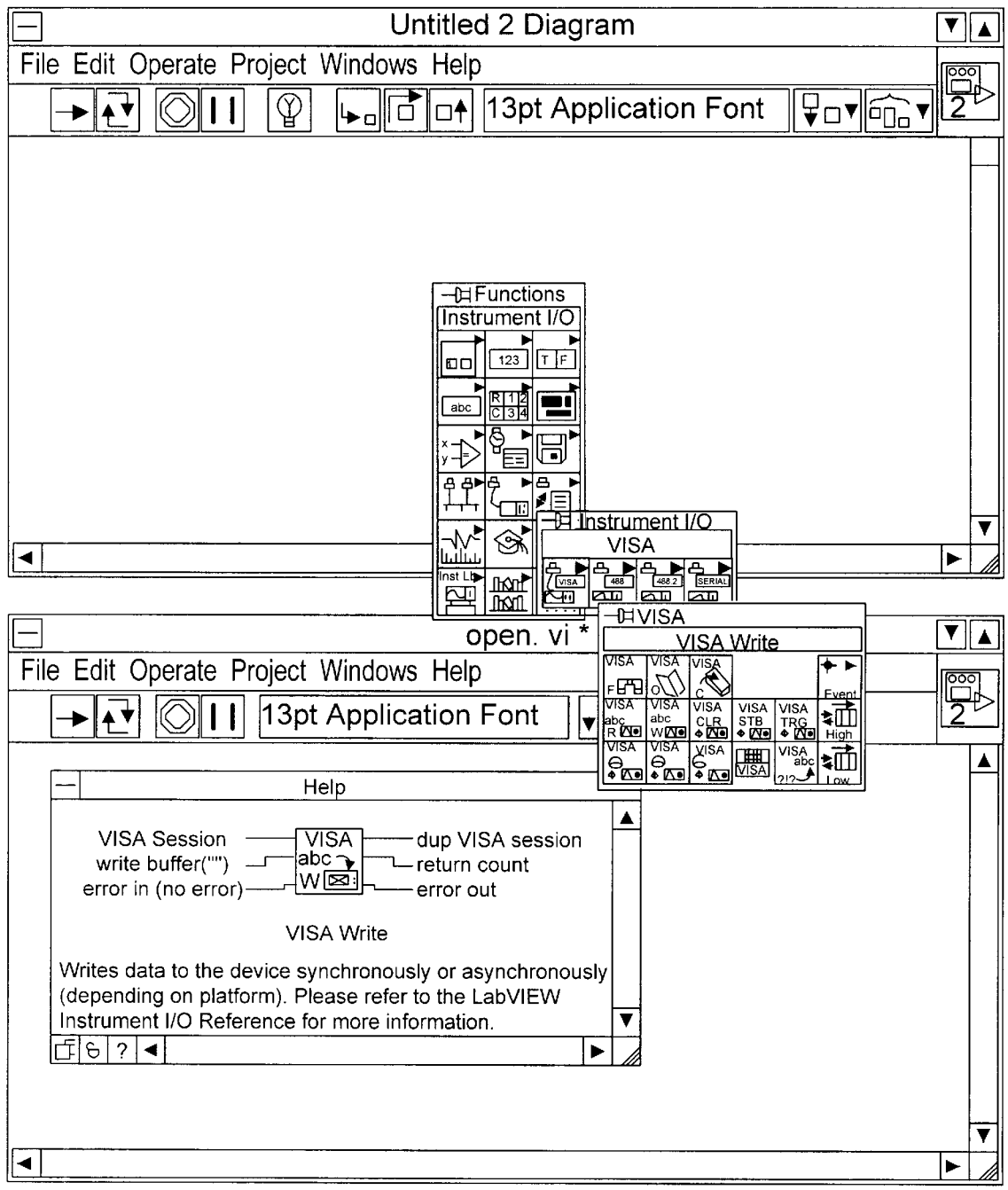
FIG. 7 is a screen shot illustrating the VISA functions palette including a help window illustrating the terminals of an exemplary VISA function node.

Referring now to FIG. 7, a screen shot including a help screen illustrating the terminals of a VISA Write function node is shown. The VISA write node is illustrative of most VISA function nodes in that it has a VISA session input terminal, a dup VISA session output terminal, an error in input terminal, and an error out output terminal. These four terminals are advantageously provided on the VISA nodes of the present invention and enable the VISA nodes to be wired together such that the VISA session identifier and error status associated with the performance of VISA operations to be propagated through the various nodes comprising the VI. This feature advantageously enables, inter alia, type propagation checking and class propagation. This feature further provides the code generation method of each VISA node with the VISA session identifier required as an input parameter to the VISA library functions.

The error in and error out terminals comprise error clusters in the VISA nodes. An error cluster contains three fields: a status field, a code field and a source field. The status field is a boolean value which simply indicates whether or not an error occurred. The code field contains a valid VISA error code value (as defined by the VISA specification) if the status field indicates that an error has occurred. The source field is a string which describes where the error occurred. By wiring the error out terminal of each VISA node to the error in terminal of the next VISA node, the first error condition is recorded and propagated to the end of the block diagram where the error is reported in only one place.

VISA Virtual Instrument Construction and Use

Figure 8:
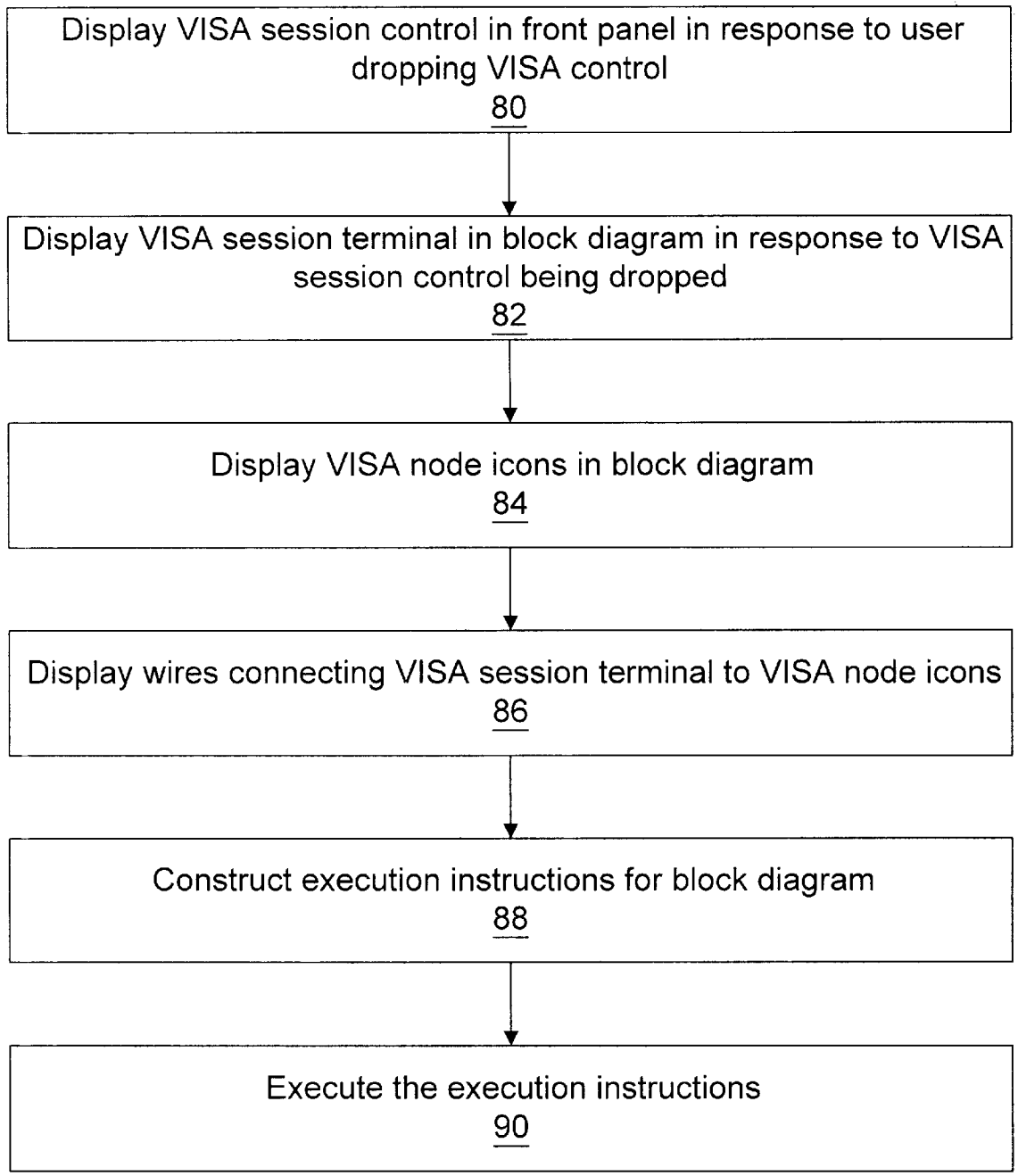
FIG. 8 is a flowchart illustrating steps taken to create and use a VISA virtual instrument of FIG. 3.

Referring now to FIG. 8, a flowchart illustrating steps taken to create and use a VISA virtual instrument are shown. A programmer "drags" a VISA session control from the Path and Refnum palette, as shown in FIG. 9a, and "drops" the control in a virtual instrument front panel. This "drag" and "drop" operation is performed by the user using a mouse or other pointing device, as is well known in the art. The front panel editor 62 (of FIG. 3) operates with the VISA control software 74 (of FIG. 3) to display the control in the front panel in step 80, as shown in FIG. 9b, in response to the user dropping the icon. In response to displaying the control in the front panel, the graphical programming system displays a VISA session control terminal icon, also referred to as a VISA refnum terminal icon, corresponding to the VISA session control icon, in the block diagram, as shown in FIG. 9b, in step 82. The VISA session control terminal icon corresponds to the VISA session control icon displayed in the front panel and thus also represents the VISA session between the virtual instrument and the instrument being controlled.

Figure 9D:
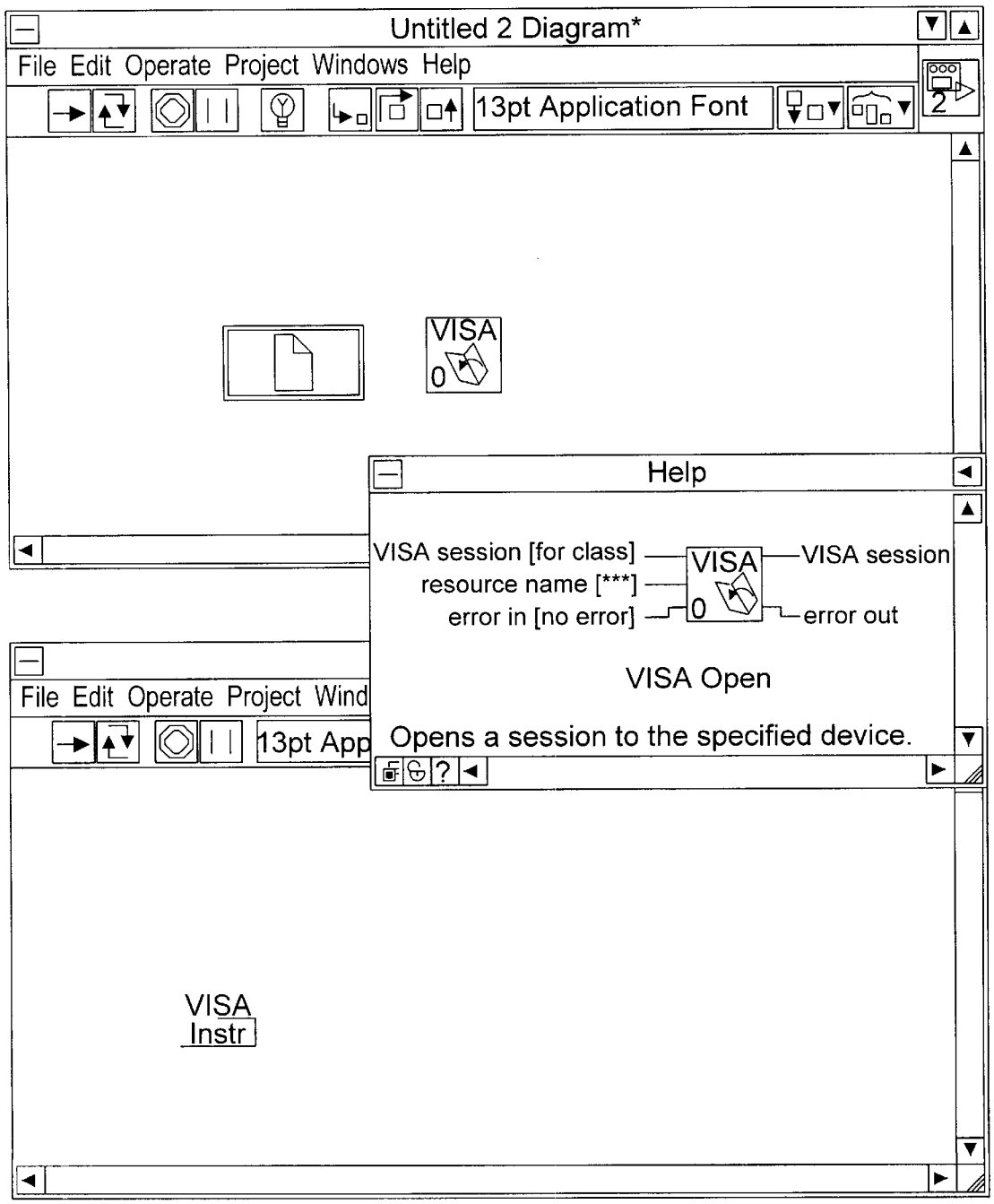

After the user has placed a VISA session control terminal icon in a block diagram, in order to create a graphical program, the programmer drags a VISA node icon from the VISA palette of the Instrument I/O palette of the Functions palette, as shown in FIG. 9c, and drops the icon in the virtual instrument block diagram. The block diagram editor 64 (of FIG. 3) operates with the corresponding VISA node software 66 (of FIG. 3) to display the icon in the block diagram in step 84, as shown in FIG. 9d, in response to the user dropping the icon. In the example shown in FIG. 9d, the VISA node 66 is a VISA Open function node. FIG. 9d also includes a Help window showing the various input and output terminals of the VISA Open function node.

Referring now to FIG. 9c, a user may choose from a number of VISA operations to drop on the block diagram from the VISA functions palette. In the embodiment shown, a Find Resource function node, an Open function node, a Close function node, a Read function node, a Write function node, a Clear device function node, a Read Service Request Status (from a message based device) function node, an Assert Trigger function node, a Lock device function node, a Lock Asynchronous function node, an Unlock device function node, a VISA attribute node, a Status Description function node, and pull-right menus for VISA events, VISA High-Level Register Access and VISA Low-Level Register Access function nodes are provided. The reader is referred to the VISA Library Reference chapter of the LabVIEW Instrument I/O VI Reference Manual, which is hereby incorporated by reference, for more detail about each of the VISA nodes. Most of the nodes correspond to VISA I/O Library 52 functions, as described previously with regard to the VISA Open, Write and Read function nodes and their relationship to the viOpen(), viWrite() and viRead() routines, respectively. Most VISA nodes will accept VISA refnums of all classes although a particular function, or method, may be valid only for a subset of classes. An example is VISA Poke 16 which is defined only for VXI/GPIB-VXI MBD and VXI/GPIB-VXI RBD classes.

Referring again to FIG. 8, the programmer selects a wiring tool from a tool menu, as shown in FIG. 9e, and wires together input terminals to output terminals of the nodes. In response, the block diagram editor 64 displays wires connecting the terminals, as shown in FIG. 9f, between the VISA session control terminal and the VISA session (for class) input terminal of the VISA open function node, in step 86.

The programmer repeat steps 84 and 86 numerous times, dragging and dropping other nodes, including VISA attribute nodes or other VISA function nodes, and wiring them together to construct the functions desired by the programmer to perform his or her particular application or instrument driver. FIG. 6 exemplifies a programmer having repeated steps 84 and 86 to create a VI.

Once the programmer has created the virtual instrument, the programmer instructs the graphical programming environment to construct execution instructions in accordance with the nodes in the block diagram in step 88. Preferably, constructing the execution instructions comprises generating machine language instructions into an executable program. Alternatively, constructing the execution instructions comprises generating programming language instructions, such as C language instructions, and compiling the programming language instructions into an executable program. In one embodiment, the user causes the execution instructions to be generated by clicking on the run button, indicated by a double wide right-pointing arrow at the far left of the toolbar of the front panel of FIG. 9f. In addition, the user causes the execution instruction to be generated by saving the virtual instrument to a file via the File pull-down menu of FIG. 9f.

Once the execution instructions have been generated, the programmer directs the environment to execute the execution instructions. In response, the execution subsystem 56 (of FIG. 3) executes the execution instructions of the virtual instrument in step 90. As previously stated, preferably the user clicks the run button, or selects the run menu item from the Operate menu of FIG. 9f, to execute the execution instructions. The present invention contemplates the execution instructions being interpreted rather than compiled.

VISA Virtual Instrument Graphical Program Portability

The present invention provides a system and method for creating graphical programs to control instruments, wherein the graphical programs are independent of input/output interface type. The graphical programming system and method thus advantageously provides a means for creating instrumentation control graphical programs which are portable. As described above, an instrument can be coupled to the computer system according to one or more of a plurality of possible I/O interface types. In the preferred embodiment, the "plurality of possible I/O interface types" includes one or more of GPIB, VXI/GPIB-VXI RBD, VXI/GPIB-VXI MBD, and asynchronous serial interface, but is not necessary limited to these interfaces. The plurality of possible I/O interface types may also include a coupling to a data acquisition card or a communication channel to a software instrument, i.e., an instrument or instrument capability created in software.

According to the present invention, graphical programs created to control an instrument coupled to a computer system via one of the supported VISA I/O interface types, such as GPIB, VXI/GPIB-VXI RBD, VXI/GPIB-VXI MBD, asynchronous serial interface, are capable of controlling an instrument coupled to a computer system via a different one or more of the supported VISA I/O interface types, with little or no modification. The present invention further contemplates providing a means for creating portable instrumentation control programs for controlling instruments coupled to a computer system via an Ethernet or wireless I/O interface. The present invention provides a means for creating portable graphical instrumentation control programs enjoying the portability advantages of VISA along with the advantages of creating the program in a graphical manner.

Figure 10:
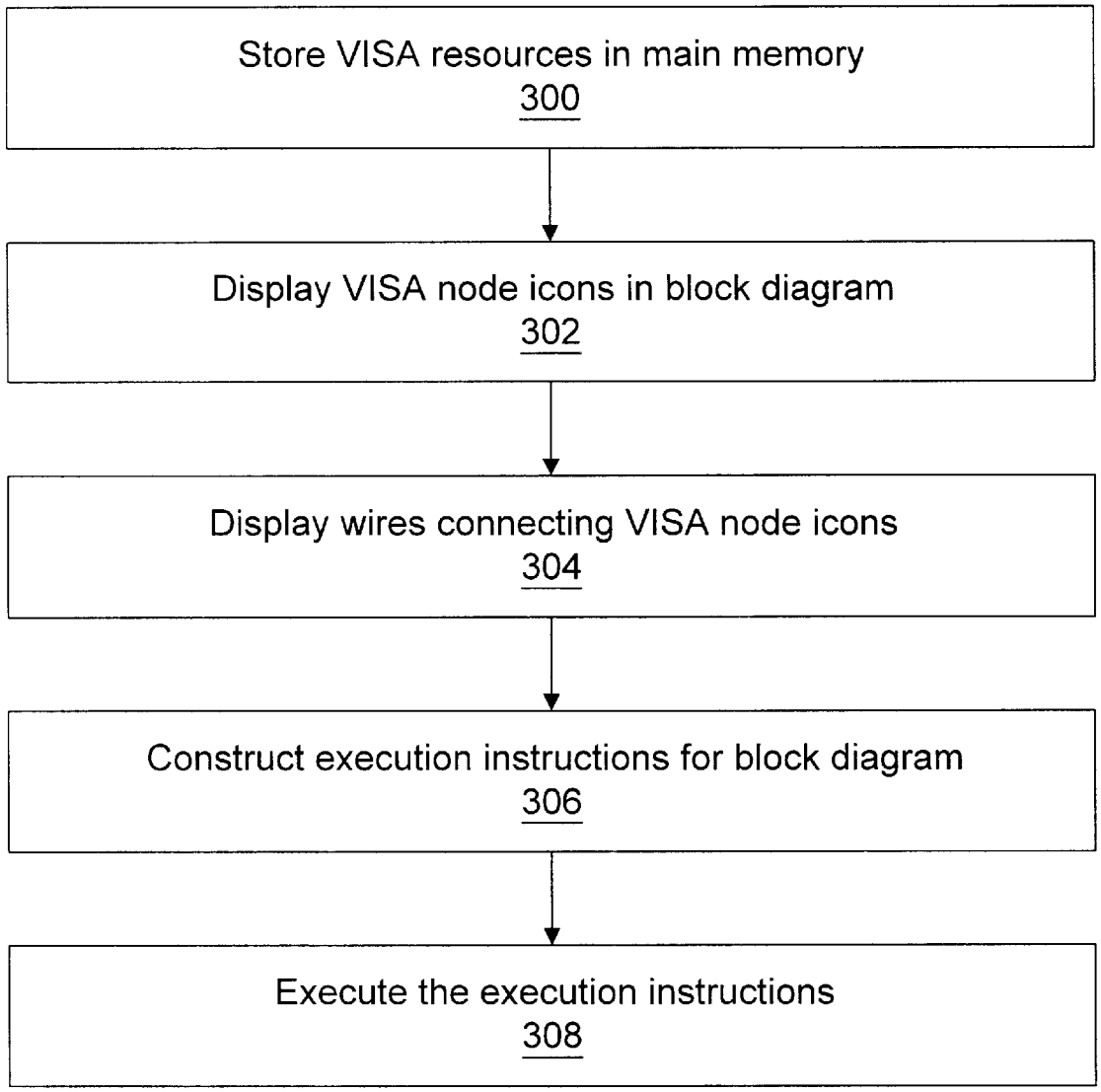
FIG. 10 is a flowchart illustrating steps taken to create a VISA graphical program.

Referring now to FIG. 10, a flowchart illustrating steps taken to create a VISA graphical program or virtual instrument is shown. The VISA I/O Control Library 52 (of FIG. 3) comprises VISA resources which are stored in the memory 28 (of FIG. 2) of the computer system 12 (of FIG. 1) according to step 300. The VISA resources comprise operations (i.e., methods, or functions) corresponding to capabilities of VISA instruments such as those of FIG. 1.

A subset of the VISA resources are generic, i.e., are independent of the I/O interface type connecting the instrument to the computer system. These resources are common to instruments of all I/O interface types. The remaining VISA resources are specific to less than all of the I/O interface types of an instrument, i.e., are specific to one or more I/O interface types, and are not generic to all I/O interface types. That is, instruments which are designed to connect to a certain I/O interface type have capabilities which instruments designed for other I/O interface types do not have, and thus VISA resources which implement these certain capabilities are inherently specific.

FIG. 11 illustrates groupings of VISA resources according to I/O interface type. The reader is referred to the VISA specification for a detailed description of each of the VISA resources of FIG. 11. As shown, the VISA resources comprise "generic", or "independent", resources, i.e., resources which are supported by instruments of all the possible VISA I/O interface types. The VISA resources also include "specific" resources, which are resources which are supported by instruments with only a subset of the possible VISA I/O interface types. The generic VISA resources group 320 comprises Status Description, Open, Close, Lock, Unlock, Enable Event, Disable Event, Wait on Event, and Discard Events resources. These resources are supported for all I/O interface types.

The remaining groups, 322, 324, 326, and 328, are specific VISA resources, i.e., which only support, i.e., are only valid for, a subset of the possible VISA I/O interface types. Group 322 comprises the Clear and Read Status Byte resources. These resources are supported by GPIB devices and VXI/GPIB-VXI message based devices. Group 324 comprises the Read and Write resources. These resources are supported by Serial devices, GPIB devices and VXI/GPIB-VXI message based devices. Group 326 comprises the In 32, In 16, In 8, Out 32, Out 16, Out 8, Map Address, Unmap Address, Peek 32, Peek 16, Peek 8, Poke 32, Poke 16, Poke 8, Move In 8, Move In 16, Move In 32, Move Out 8, Move Out 16, Move Out 32, Memory Allocate, and Memory Free resources. These resources are supported by VXI/GPIB-VXI register based devices and VXI/GPIB-VXI message based devices. Group 328 comprises the Assert Trigger resource. This resource is supported by GPIB devices, VXI/GPIB-VXI message based devices, and VXI/GPIB-VXI register based devices.

Referring again to FIG. 10, the block diagram editor 64 (of FIG. 3) operates with the corresponding VISA node software 66 (of FIG. 3) to display VISA node icons in the block diagram in step 302 in response user input, i.e., in response to a user dropping or placing VISA node icons in a block diagram or graphical program. Displaying the VISA node icons in step 302 is as described in step 84 of FIG. 8. The block diagram editor 64 displays wires connecting the terminals of the VISA nodes in step 304, in response to user input, similar to step 86 of FIG. 8. The user drops VISA node icons in step 302 and wires the nodes together in step 304 to create a VISA VI, such as the VI shown in FIG. 6.

The VISA node icons correspond to the VISA resources of FIG. 11. Correspondingly, some of the VISA nodes are generic VISA nodes, i.e., are supported for all VISA I/O interface types, and some of the VISA nodes are specific to only a subset of the possible I/O interface types of the instrument.

Referring to FIG. 7, the VISA node palette illustrates the various VISA nodes. A subset of the VISA nodes are generic, i.e., are valid for all VISA session classes. The VISA session classes correspond to the possible VISA I/O interface types. The generic VISA nodes correspond to the generic VISA resources in group 320 of FIG. 11. The generic VISA nodes are the Status Description, Open, Close, Lock, Unlock, and Event (Enable Event, Disable Event, Wait on Event, and Discard Events available via the pull-right menu) function nodes.

The remaining VISA nodes of FIG. 7, i.e., the VISA nodes which are not generic, are specific VISA nodes, i.e., VISA nodes which are valid only for a subset of the possible VISA session classes and VISA I/O interface types. The VISA nodes supported only by GPIB devices and VXI/GPIB-VXI message based devices are the Clear and Read Status Byte (STB) function nodes. The VISA nodes supported only by Serial devices, GPIB devices and VXI/GPIB-VXI message based devices are the Read and Write VISA nodes. The resources supported by VXI/GPIB-VXI register based devices and VXI/GPIB-VXI message based devices are the High level (In 32, In 16, In 8, Out 32, Out 16, Out 8, Peek 32, Peek 16, Peek 8, Poke 32, Poke 16, Poke 8, Move In 8, Move In 16, Move In 32, Move Out 8, Move Out 16, Move Out 32, Memory Allocate, and Memory Free available via the pull-right menu), and Low level (Map Address, Unmap Address, Memory Allocate, and Memory Free available via the pull-right menu) VISA nodes. The Assert Trigger VISA node is supported by GPIB devices, VXI/GPIBVXI message based devices, and VXI/GPIB-VXI register based devices.

Referring again to FIG. 10, once the programmer has created the virtual instrument or graphical program, the programmer instructs the graphical programming environment to construct execution instructions in accordance with the nodes in the block diagram in step 306, as in step 88 of FIG. 8, and the execution subsystem 56 (of FIG. 3) executes the execution instructions of the virtual instrument in step 308 as in step 90 of FIG. 8.

The graphical program created in FIG. 6 comprises the VISA Open, Close, and Status Description nodes, which are generic VISA nodes. The program of FIG. 6 further comprises the VISA Read and Write nodes, which are specific to the Serial, GPIB and VXI/GPIB-VXI message based device I/O interface types. Thus, the VI of FIG. 6 is operable to control a VISA instrument with a Serial, GPIB or VXI/GPIB-VXI message based device I/O interface type.

FIG. 6 illustrates a graphical program operable to control a Serial I/O interface type device. FIG. 12 illustrates the graphical program operable to control a GPIB I/O interface type device. It is noted that, in the VI of FIG. 12, the VISA class of the VISA session has been changed to I/O interface type GPIB and the resource name in the front panel has been changed to "GPIB::0::1", indicating the instrument to be controlled is a GPIB device at primary address 1 and secondary address 0 in GPIB interface 0.

Thus, the graphical program of FIG. 6 is advantageously portable, i.e., operable to control a VISA instrument of a first I/O interface type and operable to control a VISA instrument of a second I/O interface type without replacing, changing, adding or deleting any of the VISA node icons.

Figure 13:
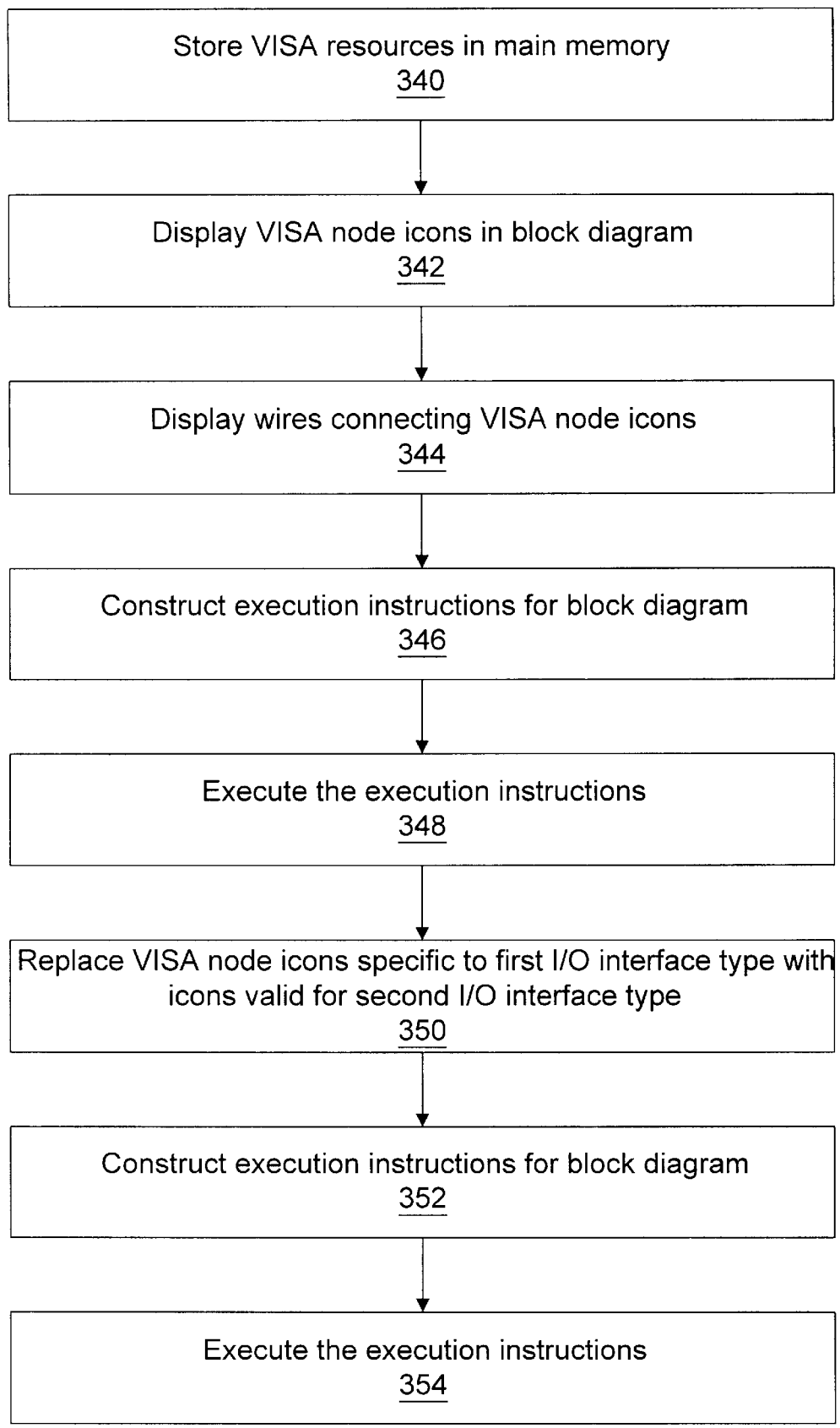
FIG. 13 is a flowchart illustrating steps taken to create a VISA graphical program and then modify the program to control an instrument of a different I/O interface type.

Referring now to FIG. 13, a flowchart illustrating steps taken to create a VISA VI or graphical program and then modify the VI to control an instrument of a different I/O interface type is shown. Steps 340, 342, 344, 346 and 348 are performed as in steps 300, 302, 304, 306 and 308 of FIG. 10 to create a VI, as shown in FIG. 12, operable to control a GPIB I/O interface type instrument.

In order to create a VI to similarly control a VXI/GPIB-VXI register based device (RBD), a user replaces the VISA nodes which are not supported by the VXI/GPIB-VXI RBD class of instruments with VISA nodes which are supported by the VXI/GPIB-VXI RBD class and perform similar functionality. In particular, the Write and Read VISA function nodes of FIG. 12 are not valid for the VXI/GPIB-VXI RBD class. Hence, the user replaces the Write and Read nodes with the Move Out 8 and Move In 8 VISA nodes, respectively, in step 350 as shown in FIG. 14. The VI of FIG. 14 is operable to control a VXI/GPIB-VXI RBD I/O interface type instrument. The Move Out 8 and Move In 8 VISA nodes are supported by the VXI/GPIB-VXI RBD class and perform similar functionality to the VISA Write and Read nodes, respectively, but for register based devices.

Once the necessary nodes are replaced in step 350, execution instructions are created in step 352 and the instructions executed in step 354 as in steps 306 and 308 of FIG. 10. Thus, the programmer is advantageously enabled to reuse substantial portions of his or her graphical instrumentation control program to control instruments across I/O interface types.

In addition, the graphical programming system and method of the present invention provides a single palette of graphical icons or VISA nodes, as shown in FIG. 7, which can be used as building blocks to create a graphical program or virtual instrument. The VISA nodes can be used to create graphical programs to control instruments or perform instrument functionality according to any of the possible I/O interface types. This is in contrast to prior graphical programming systems, which provide a different palette of graphical icons or nodes for each of the possible I/O interface types. Thus the present invention enables the user to only have to learn a single palette of graphical nodes, and these nodes can then be used for instruments of any I/O interface type. This greatly simplifies the creation of graphical programs. In addition, as described above, the present invention provides improved portability of graphical programs for instrumentation applications which require different I/O interface types. Thus the present invention provides an improved graphical programming system and method.

VISA Function Node Type Propagation Checking During Wiring

Figure 15A:
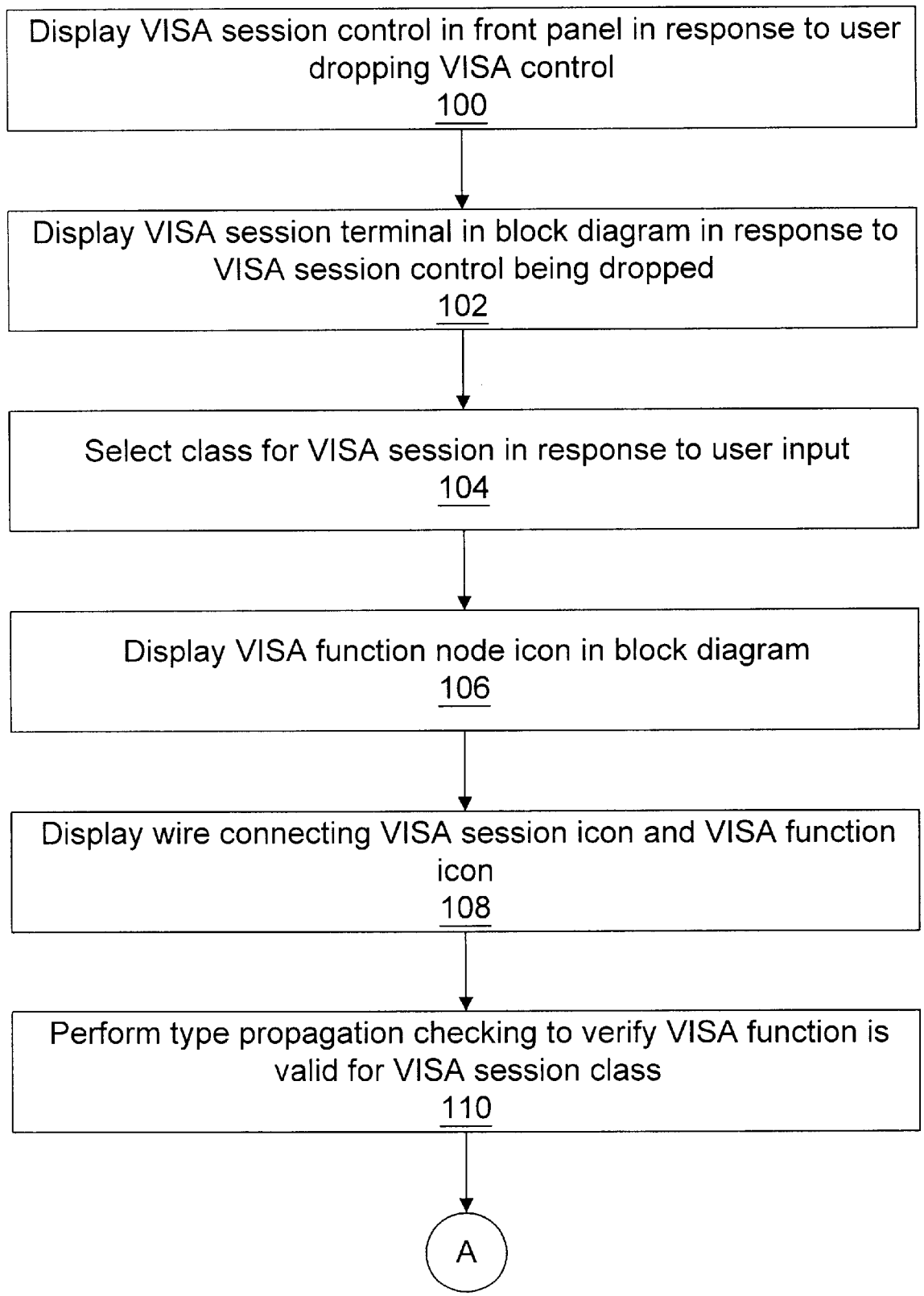
FIGS. 15a and 15b are a flowchart illustrating steps taken to perform type propagation checking of VISA function nodes.
Figure 15B:
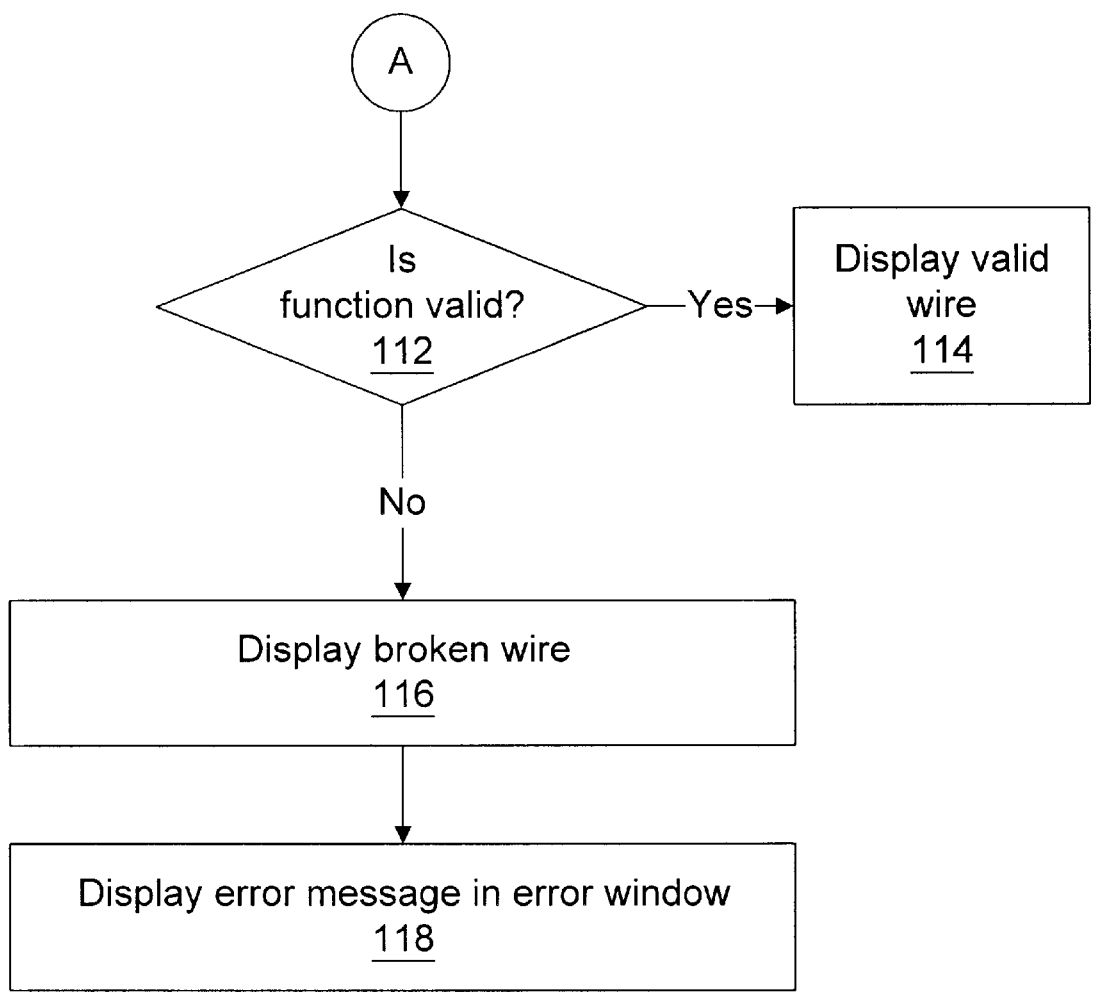

Referring now to FIGS. 15a and 15b (referred to collectively as FIG. 15), a flowchart illustrating steps taken to perform type propagation checking of VISA function nodes is shown. A programmer drags a VISA session refnum icon from the Path and Refnum palette, as shown in FIG. 9a, and drops the icon in a virtual instrument front panel. The front panel editor 62 (of FIG. 3) operates with the VISA control 74 (of FIG. 3) to display the icon in the front panel in step 100, as shown in FIG. 9b, in response to the user dropping the icon. In response, the graphical programming system displays a VISA session control terminal, corresponding to the VISA session control icon, in the block diagram, as shown in FIG. 9b, in step 102.

Figure 16:
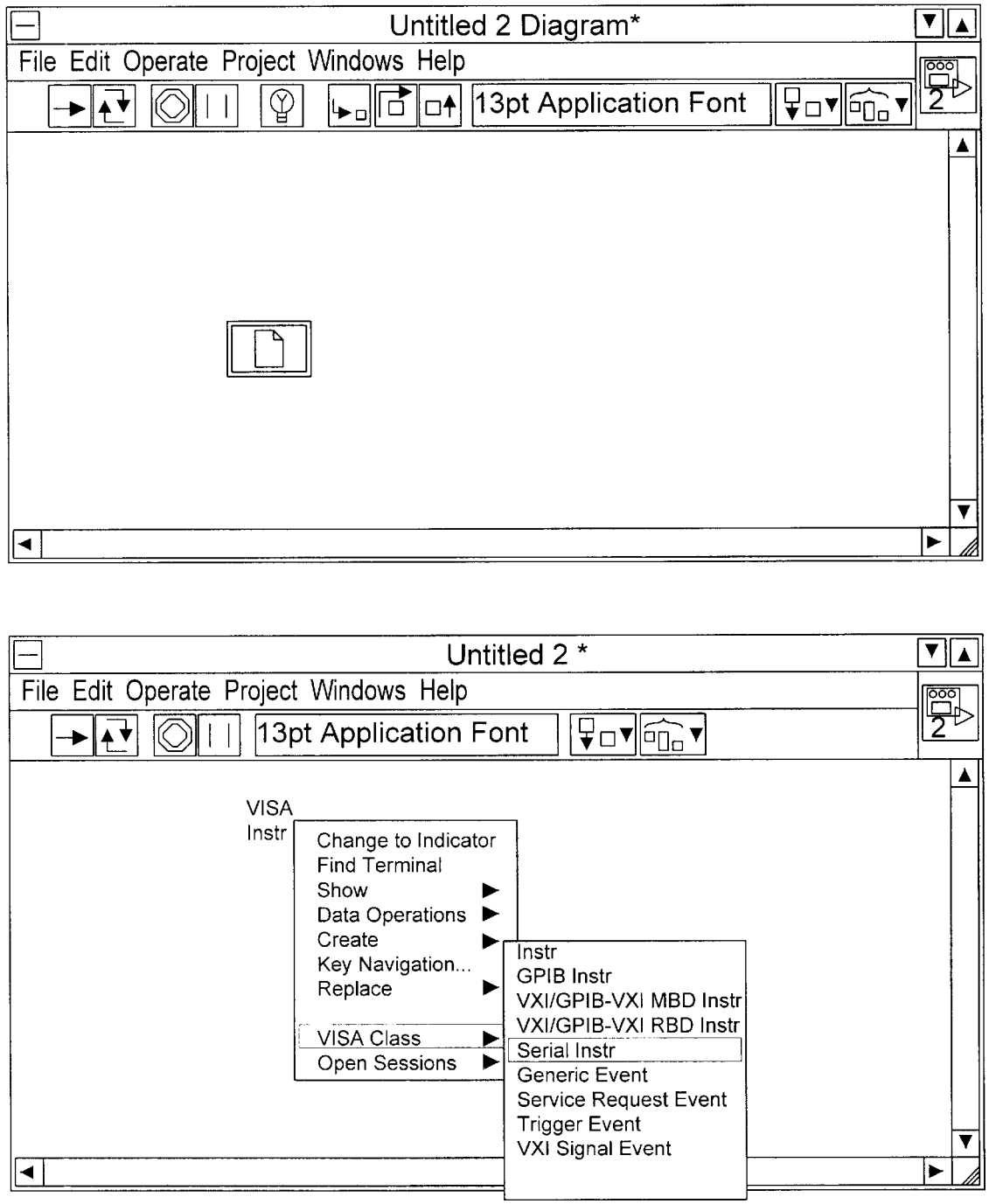

The programmer then selects the class of the VISA session represented by the VISA session control in step 104. The programmer selects the class, preferably based upon the type of interface by which the instrument to be controlled is coupled to the computer 12 (of FIG. 1). The programmer selects the class, as illustrated in FIG. 16, by popping up on the VISA session control, selecting the VISA Class pull-right menu, and then selecting one of the available classes listed.

When the VISA session control is dropped it initially is of the class Instr, i.e., the generic VISA instrument class. This is shown in FIG. 16 by the "Instr" label on the VISA session control and by the check mark to the left of Instr in the VISA Class list. In the example of FIG. 16, the user has highlighted and chosen the class Serial Instr, as seen in FIG. 17 by the label on the control being changed to Serial Instr. The available instrument class choices shown in FIG. 16 are a generic VISA instrument, a GPIB instrument, a VXI or GPIB-to-VXI Message Based Device instrument, a VXI or GPIB-to-VXI Register Based Device instrument, and a Serial instrument. In addition, the programmer may choose one of the event classes for the VISA session control. The available choices are Generic Event, Service Request Event, Trigger Event, and VXI Signal Event.

The programmer drags a VISA function node icon from the VISA palette of the Instrument I/O palette of the Functions palette, as shown in FIG. 9c, and drops the icon in the virtual instrument block diagram. The block diagram editor 64 (of FIG. 3) operates with the corresponding VISA node software 66 (of FIG. 3) to display the icon in the block diagram in step 106, as shown in FIG. 9d, in response to the user dropping the icon. In the example shown in FIG. 9d, the VISA node 66 is a VISA Open function node.

The programmer wires together input terminals to output terminals of the nodes. FIG. 18 is a screen shot just prior to the user clicking on the input terminal to connect the input and output terminals. The terminals of the VISA Open function node are displayed and a help window displaying "VISA session (for class)" is displayed to indicate to the user the terminal over which the cursor is currently placed. In response to the user placing the cursor over the terminal, the block diagram editor 64 displays a dotted line wire from where the user first clicked to the current location of the cursor, as shown in FIG. 18, in step 108.

Once the user clicks on the VISA session input terminal of the VISA function node, in this case a VISA Open function node, the type propagation checking code of the VISA function node is invoked by the block diagram editor 64, to verify that the VISA function represented by the VISA function node is valid for the VISA session class of the VISA session control in step 110. A more detailed description of the type propagation checking performed in step 110 will be given below.

In step 112 a determination is made as to whether or not the function is valid for the class of the VISA session class. If the function is valid for the class, the block diagram editor 64 displays a valid wire indicated by a solid line, as shown in FIG. 19, in step 114. Since the VISA Open function is a supported function, also referred to as a method or resource, for the VISA session class of Serial Instr in this example, the wire connecting the VISA refnum and the VISA session input terminal of the VISA function node is valid.

Figure 20:
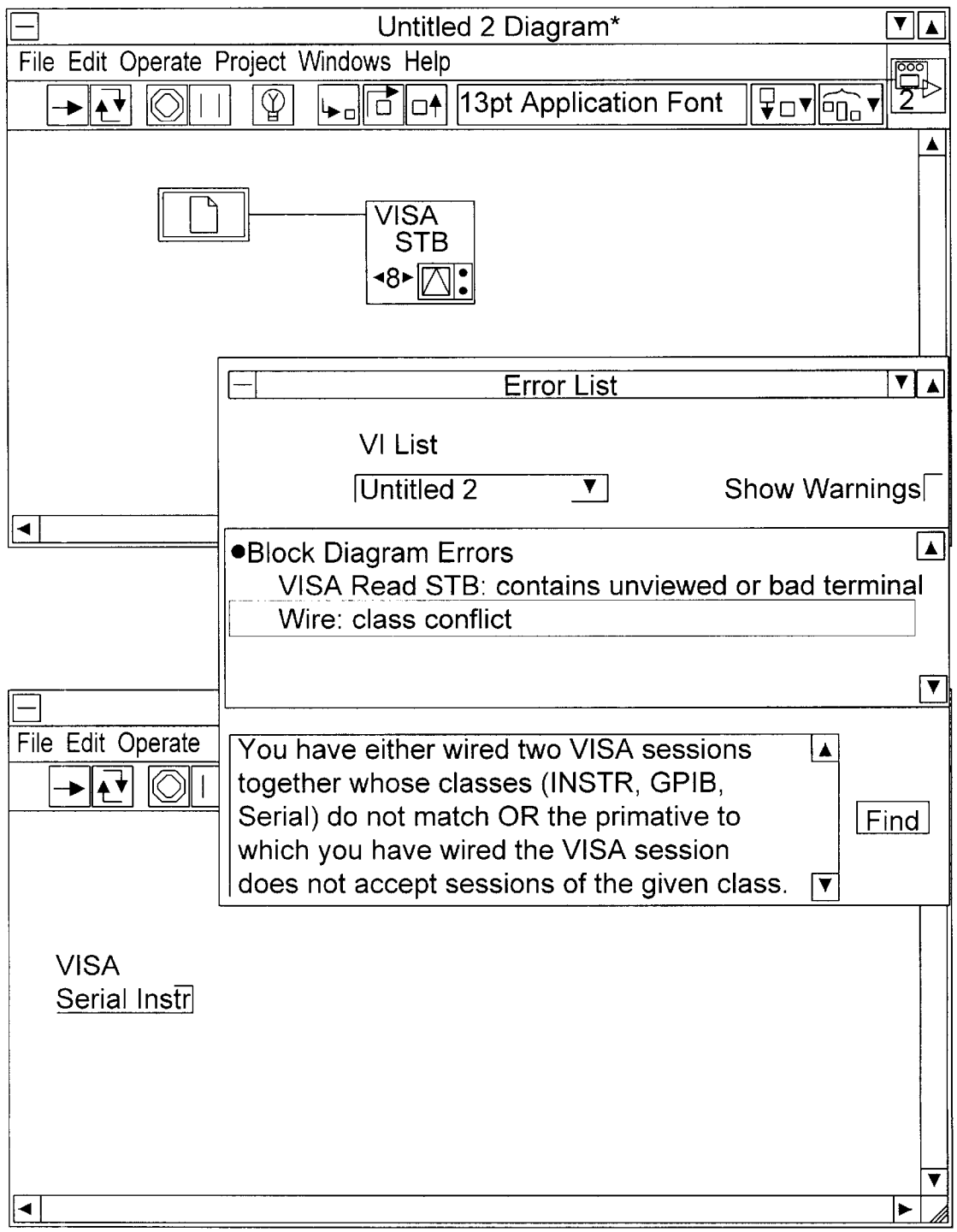

If the function is not valid for the class, the block diagram editor 64 displays an invalid wire indicated by a dashed line, as shown in FIG. 20, in step 116. In addition, if the user has opened an error message window, the error message indicating that a class conflict has occurred is displayed, as shown in FIG. 20, in step 118. In the example of FIG. 20, the read service request status function, represented by the VISA read service request status function node, is not a supported function for the Serial Instr class. This function is used to poll the status of GPIB or VXI interface devices. Thus the wire connecting the VISA refnum and the VISA session input terminal is invalid.

Each wire and terminal in a block diagram has an associated data type. The programming environment keeps track of the data type in a structure in memory called a type descriptor. The type descriptor comprises a string of word integers that describe the data type. The generic format of a type descriptor is:

<length><typecode>.

Table 1 lists three of the supported data types, the type codes, and type descriptors in one embodiment of the programming environment.

TABLE 1

| Data Type | Type Code | Type Descriptor |
| --- | --- | --- |
| Long Integer | 0x03 | 0004 xx03 |
| Handle | 0x31 | 0006 xx31 <kind> |
| Array | 0x40 | <nn> 0x40 <k> <k dimensions> <element type descriptor> |

When a wire is initially connected to a terminal, the wire takes on the data type of the terminal. i.e., the programming environment creates a type descriptor for the wire. When the user connects this wire to another terminal in the block diagram, the programming environment performs type propagation checking by comparing the type descriptor of the wire with the type descriptor of the terminal. If the type descriptors do not match, then a type conflict error is generated. In one embodiment, the programming environment performs type propagation checking on each wire and terminal in the block diagram each time a change is made to the diagram.

The present invention advantageously comprises a new type descriptor for the VISA refnum terminal. The VISA Refnum terminal type descriptor contains the name of the VISA class to which it belongs. The VISA Refnum type descriptor has the format:

<size><refnumCode><VISA refnum><class-name>[label].

The <size> byte of the type descriptor is as described above. The <refnumCode> is the type code for a refnum. The <VISA refnum> value distinguishes this refnum from other refnums as a VISA refnum. The <class-name> is a string which is the name of the class associated with the refnum or wire. An example of the class-name string is "Serial Instr." The [label] is an optional field which is the label of the particular VISA refnum.

The VISA nodes comprise a type propagation checking method which may be invoked to perform type propagation checking. When the user connects a wire to a terminal of a VISA node, the type propagation method of the node is invoked and the type descriptor of the wire being connected to the terminal is passed as an argument to the type propagation method. This class name in the type descriptor enables the type propagation method to advantageously determine class conflicts in the block diagram.

In particular, with reference to FIG. 15, the type propagation method of the VISA function node determines if the function associated with the function node is a valid method of the VISA class associated with the class name of the type descriptor passed as an input parameter.

Thus, the present invention advantageously performs type propagation checking to determine program correctness when wiring VISA function nodes. This checking advantageously prevents run-time errors which would occur when the user attempted to perform an operation which is invalid for the type of instrument with which a session had been opened.

Object Manager

The graphical programming environment of the present invention comprises an object manager. The object manager is a central repository of class information. The following is an incomplete list of the functions which the object manager provides to other modules of the programming environment for the purposes of type propagation checking and class propagation.

| | |
| --- | --- |
| MgErr | OMGetClassNames(ObjList **names); |
| OMClassPtr | OMGetClass(PStr className); |
| MgErr | OMGetAttrList(OMClassPtr omClass, ObjList **attrList); |
| OMAttrPtr | OMGetAttr(OMClassPtr omClass, PStr attrName); |
| Bool32 | OMIsAttrOfClass(OMClassPtr omClass, PStr attrName); |
| MgErr | OMGetMethList(OMClassPtr omClass, ObjList **methList); |
| OMMethPtr | OMGetMeth(OMClassPtr omClass, PStr methName); |
| Bool32 | OMIsMethOfClass(OMClassPtr omClass, PStr methName); |
| Bool32 | OMIsParent(PStr parent, PStr child); |
| Bool32 | OMValidPrim(OHHandle h, TypeID n, RsrcID rsrcID); |

Some of the functions above will be discussed in more detail as necessary. The operation of the object manager will become more apparent with reference to the FIG. 21.

Figure 21:
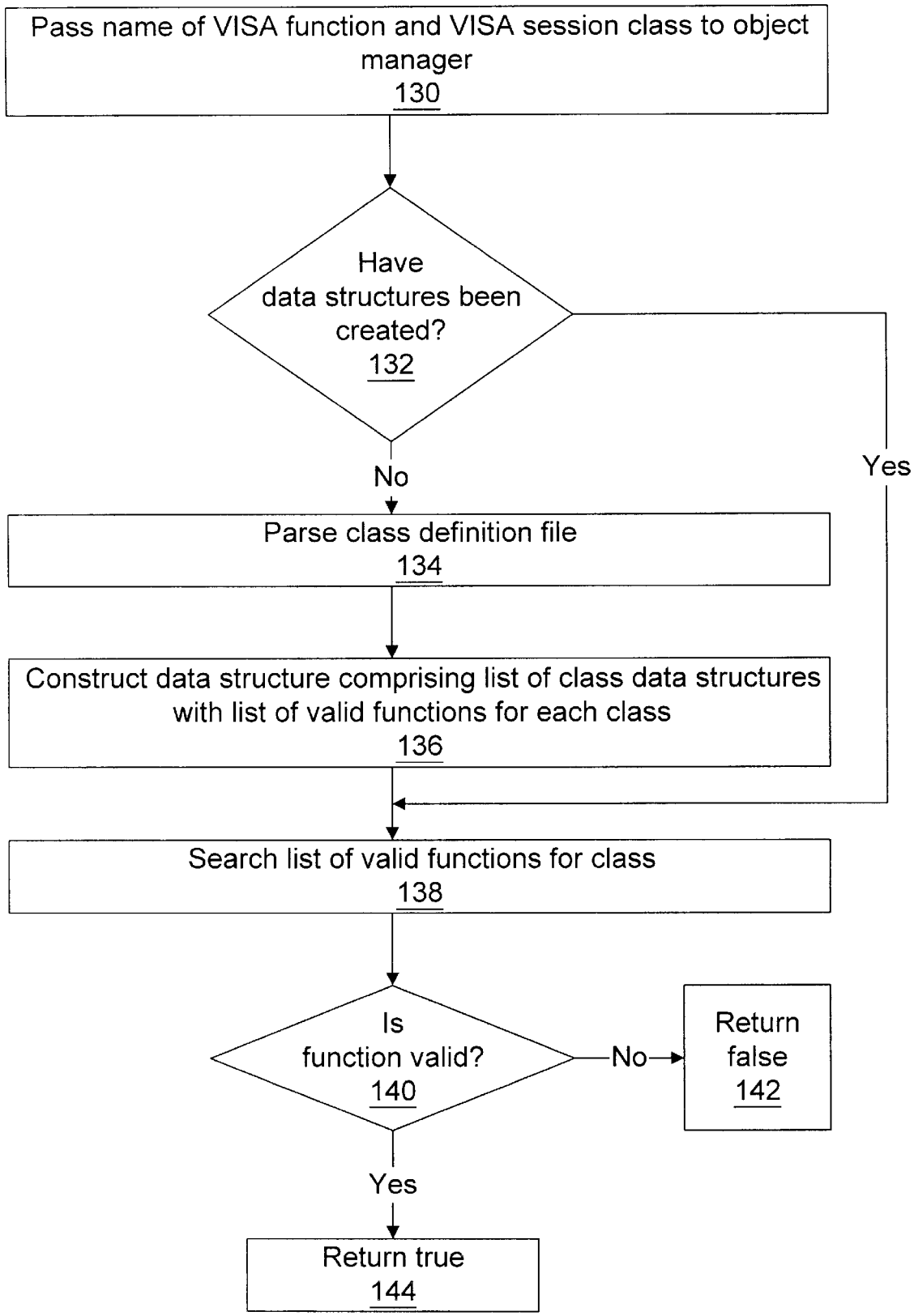
FIG. 21 is a flowchart illustrating steps taken to perform the type propagation checking of step 110 of FIG. 15.

Referring now to FIG. 21, a flowchart illustrating steps taken to perform the type propagation checking of step 110 of FIG. 15 is shown. When the user connects a wire to the VISA session input terminal of a VISA function node as in step 108 of FIG. 15 the type propagation method of the node is invoked in response to the wiring. The type propagation method in response, calls the OMIsMethOfClass()routine of the object manager 68 (of FIG. 3). The type propagation method passes the class name received in the type descriptor of the wire and the method name associated with the VISA function node to the OMIsMethOfClass() routine in step 130.

In order to return a true or false value, the routine must access a data structure containing the appropriate class information. The data structure comprises a list of class data structures. The C language typedef for the class data structures is shown here.

typedef struct VCLASS

{PStr name; /*Instr, VXI, GPIB, etc. */ObjList **attr; /*attribute list */ObjList **meth; /*method list */ObjList **evnt; /*event list*/ ObjList **parent; /*parent list */int 32 flags; /* event list */} Vclass, *VClassPtr;

The class data structure is used to maintain the class, attribute and method information and comprises a list of attributes, methods events, and parent classes associated with each class described in the class definition file 70. The object manager functions advantageously minimize the visibility of the class data structure, i.e., allow access to the class data structures without having to be concerned with the implementation of the data structure itself. The implementation of the class data structure allows for multiple inheritance and "abstract" classes.

Each VISA class that the programming environment is aware of has an entry in the class definition file 70. Each class has a name and a set of methods and attributes. Each attribute has a short and long name, a datatype, a read only or read/write denotation, a local or global scope denotation, and a magic number. The magic number is used when referring to the attribute in the VISA I/O library 52 (of FIG. 3). Each method has a name. Following is the grammar defining the class definition file 70 in Backus-Naur Form (BNF).

S->comment
S-class S
class->class: name super attribute* method*
super->classname* (these should be classes already defined)
attribute->attribute: shortname longname datatype accessrights scope value description
datatype->uB|uW|uL|iB|iW|iL|bool|string
accessrights->readonly|readwrite
scope->local|global
value->number
method->method: name
comment->// commentstring <eol>

S is the start symbol, underline denotes a string, regular text is keywords and italics are identifiers used in the grammar.

The object manager 68 checks to see if the class data structures have been created in step 132. If they have not been, then the object manager 68 parses the class definition file 70 (of FIG. 3) in step 134 and creates the class data structures in step 136. Once the class data structures have been created, if necessary, the object manager 68 finds the class data structure for the class name and searches the list of valid methods for the class to see if the method name passed to the OMIsMethOfClass() routine is in the list of valid methods in step 138.

The object manager 68 determines if the method, or function, is valid in step 140. If the function is valid the object manager 68 returns a true value in step 144. Otherwise, the object manager 68 returns a false value in step 142.

The object manager 68 need only parse the class definition file 70 once within a given invocation of the programming environment, in particular, the first time one of the object manager 68 functions is called which requires the object manager 68 to access the class data structures. There are three events which can occur to cause the object manager to parse the class definition file 70. Wiring to the VISA session input terminal of a VISA function node as in step 108 of FIG. 3 is one of the three events and has already been described. A similar event, which will be described later, is wiring a VISA session input terminal of a VISA attribute node.

Another event which causes the object manager 68 to parse the class definition file 70 is when a user pops up on a VISA session control and highlights the VISA class pull-right menu, causing the programming environment to display the list of VISA classes, as seen in FIG. 16.

The third event which causes the object manager 68 to parse the class definition file 70 is when a user pops up on a VISA attribute node to display the list of valid attributes for the node as will be described below.

Figure 22A:
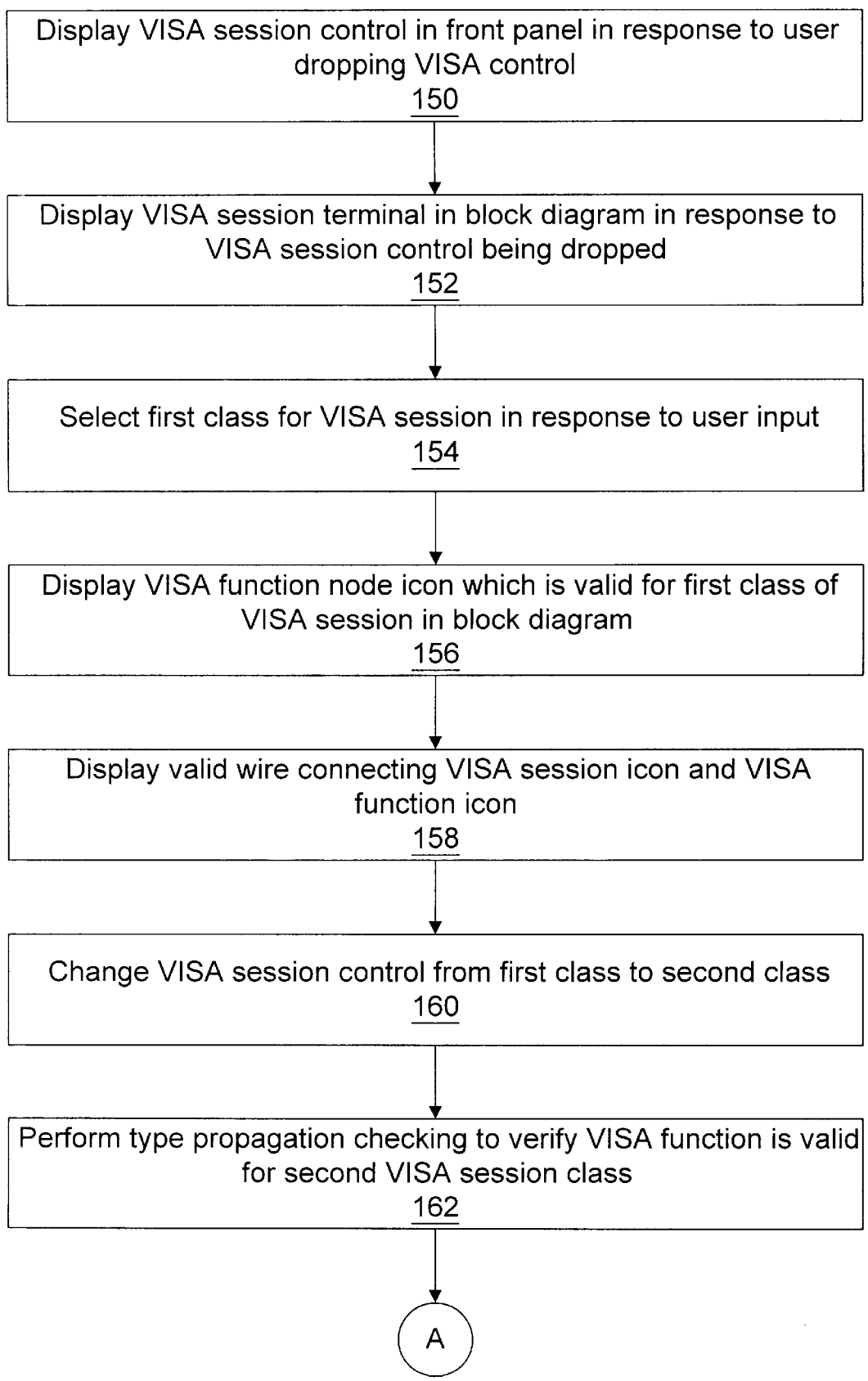
FIGS. 22a and 22b are a flowchart illustrating steps taken to perform type propagation checking of VISA function nodes when a user changes the class of the VISA session associated with the VISA function node.
Figure 22B:
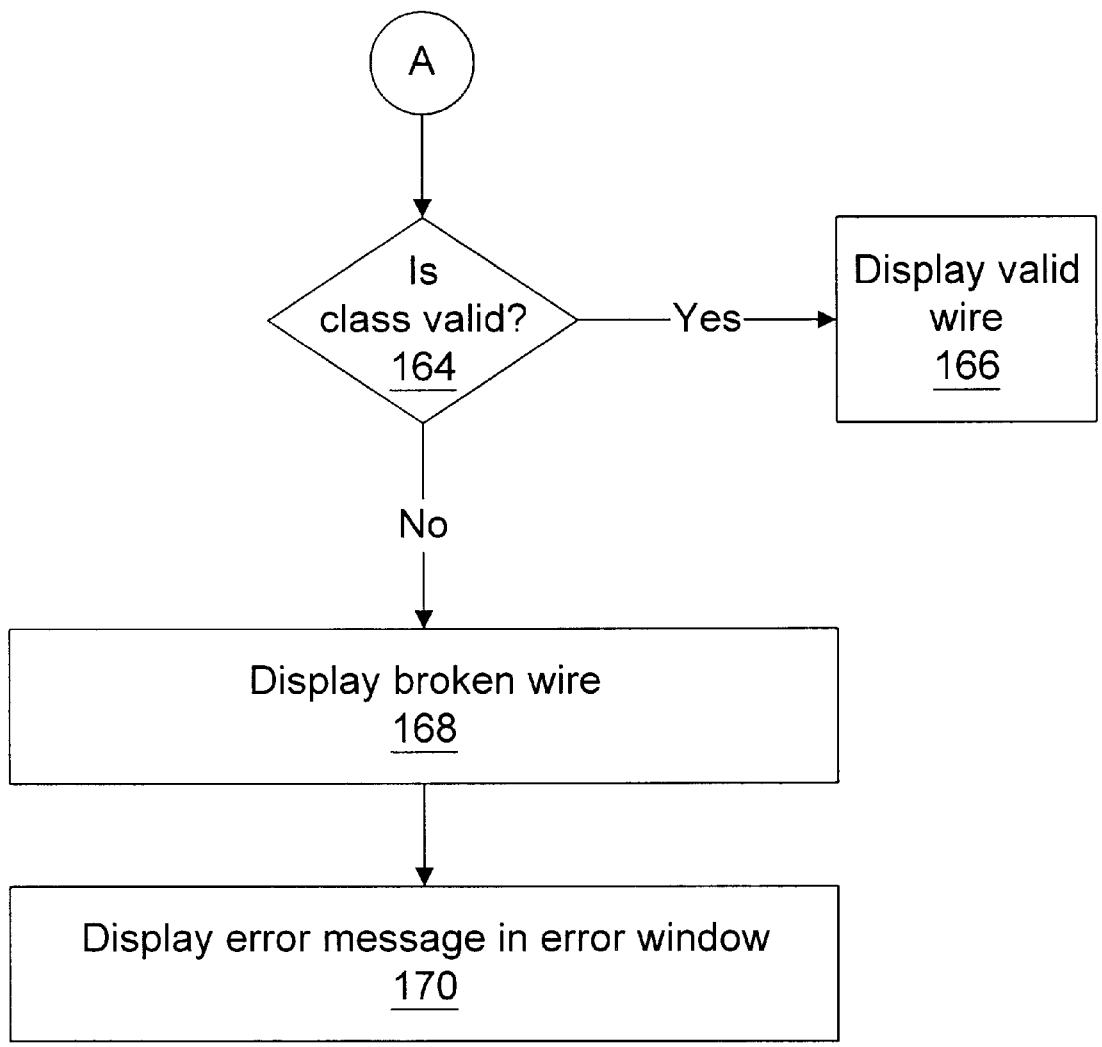

VISA Function Node Type Propagation Checking When Changing Class of a VISA session Referring now to FIGS. 22a and 22b (referred to collectively as FIG. 22), a flowchart illustrating steps taken to perform type propagation checking of VISA function nodes when a user changes the class of the VISA session connected to a VISA function node is shown. The user drops a VISA session control on the front panel and a corresponding terminal is displayed in the block diagram in steps 150 and 152 in the same manner as that described in steps 100 and 102, respectively, of FIG. 15. The user selects a first class for the VISA session in step 154 in the same manner as that described in step 104 of FIG. 15. The user drops a VISA function node which is displayed in the block diagram in step 156 in the same manner as that described in step 106 of FIG. 15. The VISA function node dropped in step 156 is a valid function for the first class of the VISA session selected in step 154. The user wires the VISA session control terminal to the VISA session input terminal of the VISA function node in step 158 in the same manner as that described in step 108 of FIG. 15. FIG. 23 shows the completion of steps 150, 152, 154, 156, and 158.

The user changes the class of the VISA session control to a second class different from the first class in step 160 as shown in FIG. 24. In response, the programming environment performs type propagation checking in steps 162, 164, 166, 168, and 170 in the same manner as that described in steps 110, 112, 114, 116, and 118, respectively, of FIG. 15. FIG. 25 illustrates the programming environment displaying a broken wire per step 168, since the VISA Read Service Request Status function is not valid for the Serial Instr class. FIG. 26 illustrates the programming environment displaying a valid wire per step 166, since the VISA Read Service Request Status function is valid for the VXI Message Based Device Instr class.

In addition to displaying a broken wire in the case of a class conflict, i.e., when a VISA function, or VISA attribute node attribute, is not valid for the class of the VISA session specified at the VISA session input terminal of the node, the programming environment also prevents execution of the virtual instrument. The run button, indicated by a double wide right-pointing arrow at the far left of the toolbar of the front panel of FIG. 25, is darkened and is displayed with a crack, indicating that there are one or more errors in the block diagram and therefore the virtual instrument is not executable. In contrast, the run button in FIG. 26 is a white, unbroken arrow, indicating that the virtual instrument is ready to be executed.

Thus, the present invention advantageously performs type propagation checking to determine program correctness when changing the class of VISA session controls. This advantageously prevents run-time errors which would occur when the user attempted to change the class of a VISA session to one which is invalid for one or more VISA function nodes wired to the VISA session control.

The VISA Attribute Node

Figure 27:
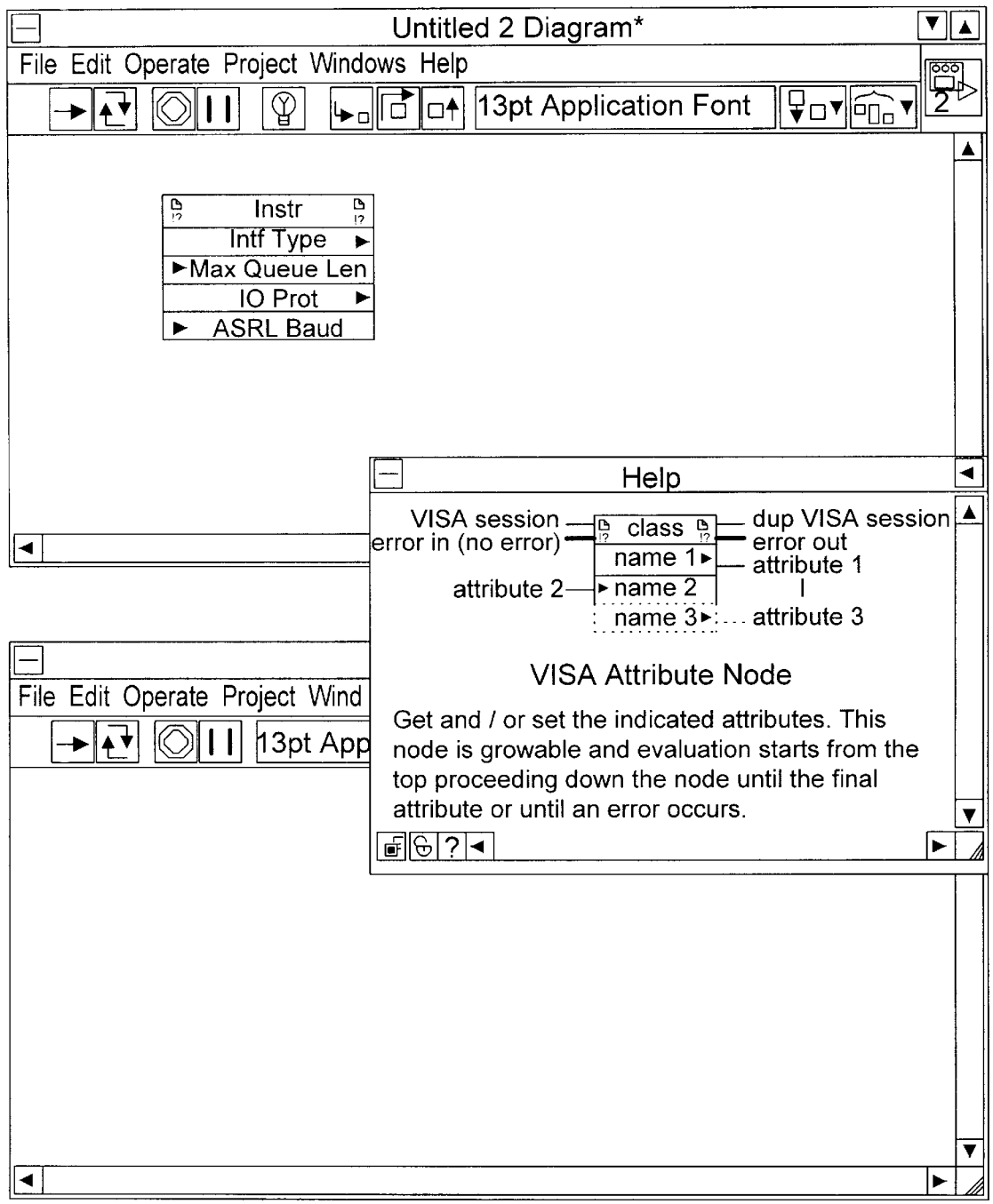

Referring now to FIG. 27, a VISA attribute node (one of the VISA nodes 66 of FIG. 3) displayed in a VI block diagram is shown. The VISA attribute node of the present invention advantageously enables a user to set and read attributes of a VISA session control programmatically. The number of attributes which may be set or gotten on a given VISA attribute node is growable. The VISA attribute node of FIG. 27 has four attributes associated with it. The VISA attribute node has an associated VISA class. The VISA class is shown in the head (top rectangle) of the VISA attribute node, as shown in FIG. 27 as "Instr." The attributes which may be set or gotten depends upon the class of the VISA session, i.e., the class of the instrument of the open session.

The help window of FIG. 27 shows the terminals of a VISA attribute node. The VISA attribute node comprises a terminal for each of the attributes of the node. Some attributes are read-only and some attributes are both readable and writable. Attributes which are both readable and writable may be edited by the user to have an input terminal or output terminal. Read-only attributes may only have an output terminal. Attributes having an input terminal, i.e., an arrow on the left side of the attribute rectangle, are attributes which may be set. Attributes having an output terminal, i.e., an arrow on the right side of the attribute rectangle, are attributes which may be read. In FIG. 27, the Intf Type (interface type) and IO Prot (I/O protocol) attributes are readable attributes. The Max Queue Len and ASRL Baud (serial baud rate) are writable attributes.

The VISA attribute node further comprises a VISA session input terminal, a dup VISA session output terminal, an error in input terminal, and an error out output terminal like those described above of VISA function nodes. These terminals are in the head of the VISA attribute node.

Figure 28:
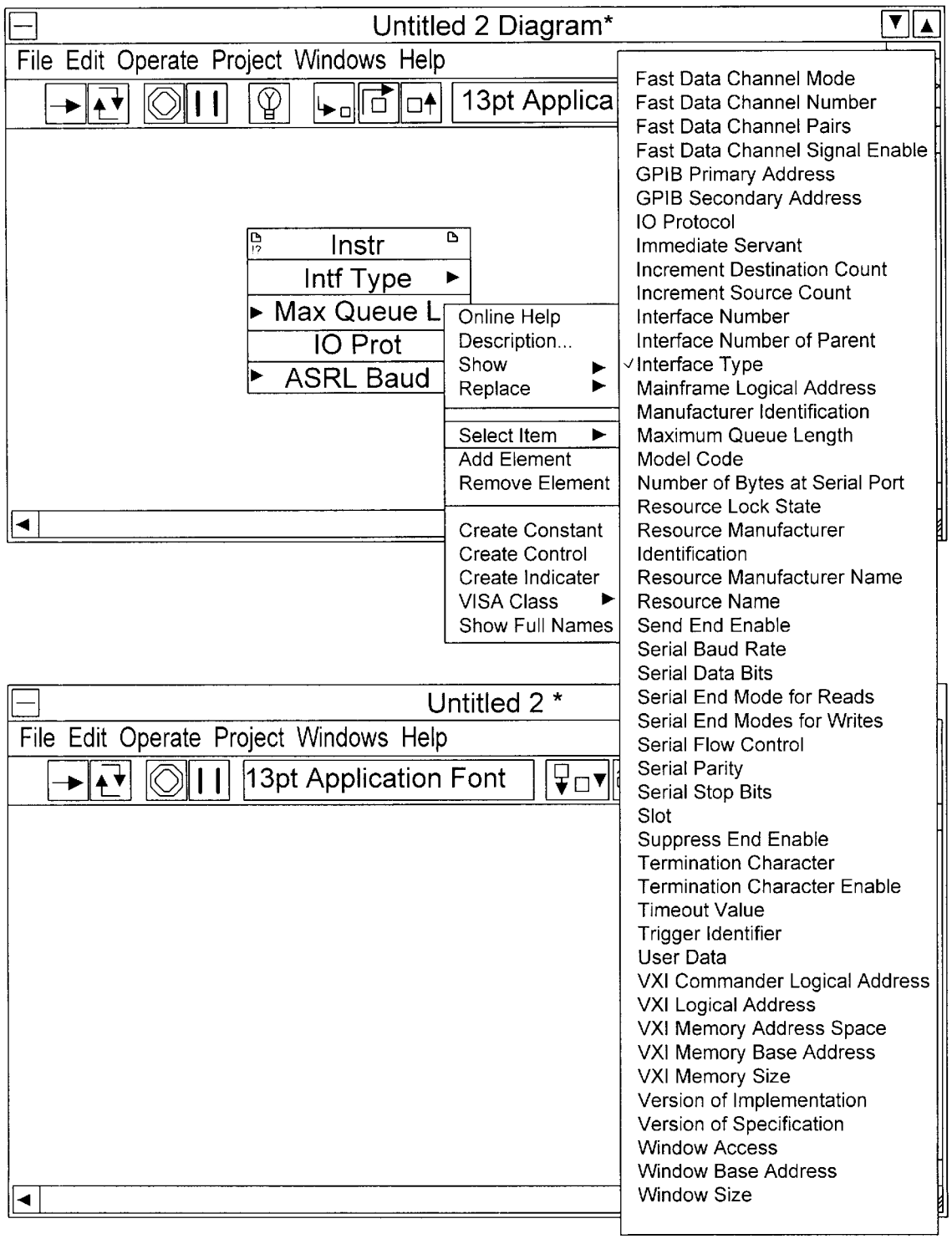

FIG. 28 shows a list of attributes for the VISA Instr class in the Select Item pullright menu. The Select Item pull-right menu only displays attributes for the user to select which are valid for the current VISA class of the attribute node. That is, the Select Item pull-right menu does not display attributes which are not valid for the current class.

A VISA attribute node may be created by dragging and dropping a VISA attribute node from the VISA functions palette shown in FIG. 7. It is noted that a VISA session may also have an associated attribute node, which is not a VISA attribute node, but rather an attribute node common to the graphical user environment, which is used to set or get more common properties of a control such as the control's visibility, key focus, disablement, etc. A conventional, i.e., non-VISA, attribute node may be created by popping up on a VISA session control and choosing the Attribute Node item from the Create menu shown in FIG. 29.

The VISA attribute node comprises a code generation method which generates calls to the viGetAttribute() and viSetAttribute() routines of the VISA I/O control library 52 (of FIG.3) to get and set, respectively, attributes of a VISA session. The VISA attribute node VISA session input terminal receives a VISA session identifier which is passed to the viGetAttribute() and viSetAttribute() routines.

The viGetAttribute() and viSetAttribute() routines also receive as an input parameter a unique number, commonly referred to as the magic number, identifying the attribute to be set or gotten. The magic number is referred to as the "value" in the class definition file 70 (of FIG. 3) grammar described previously. The magic number is used by VISA I/O control library 52 to access the correct attribute. In order to obtain the magic number for a given attribute, the VISA attribute node code generation method calls the OMGetAttr() routine of the object manager 68 (of FIG. 3) passing the class name and attribute name to the routine. The routine returns a pointer to a data structure associated with the attribute which contains the magic number for the attribute.

A VISA attribute node performs the reads and writes of the attributes from top to bottom, i.e., the top attribute in the list of attributes (e.g., Intf Type in FIG. 27) will be read or written first, the attribute below it next, and so on. If an error occurs during the reading or writing of an attribute, the evaluation of the attribute node will cease and the error will be reported via the error out output terminal.

The VISA attribute node further comprises display methods for displaying, or drawing, VISA attribute node icons on a VI block diagram.

Figure 30:
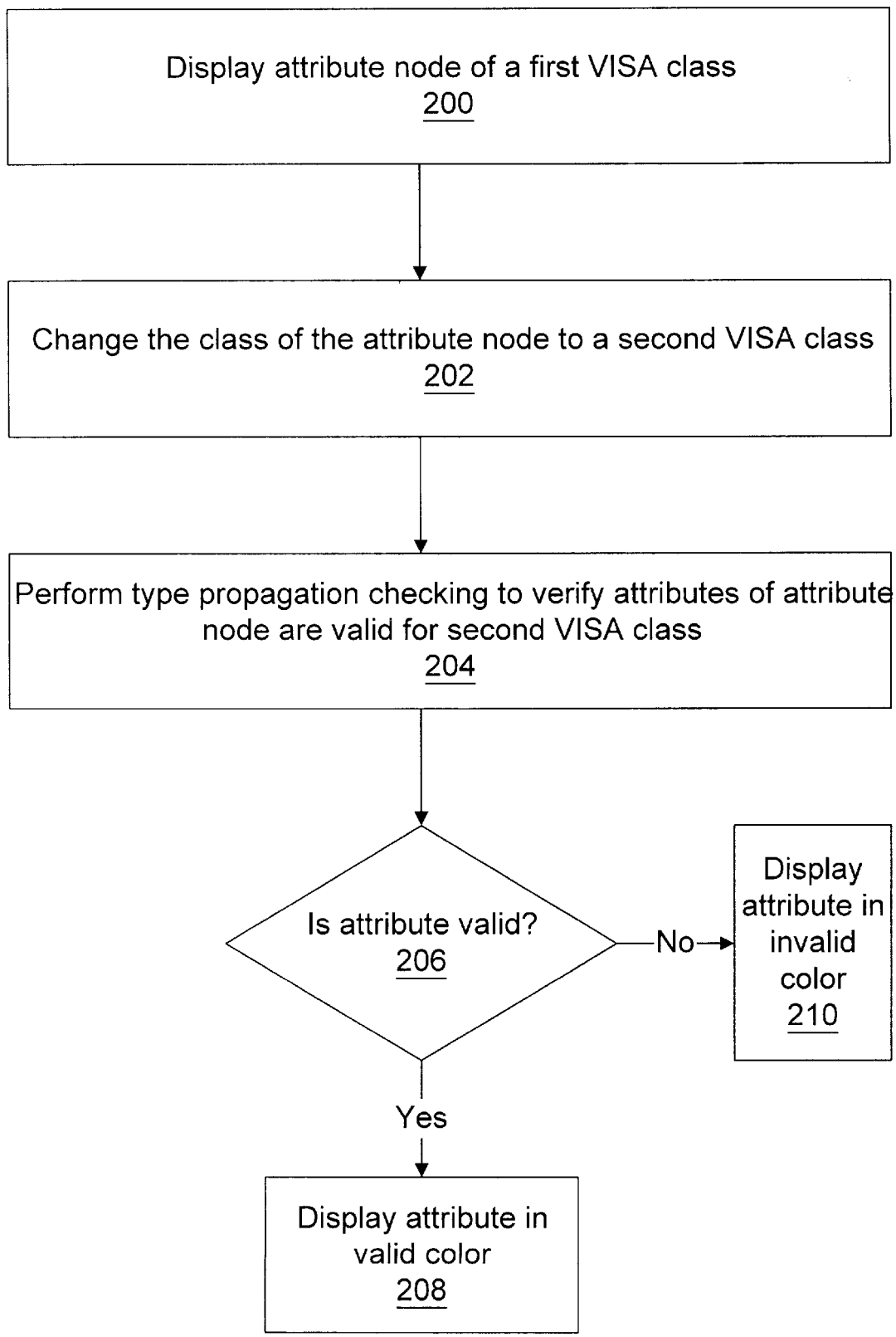
FIG. 30 is a flowchart illustrating steps taken to perform type propagation checking on a VISA attribute node.
Figure 31:
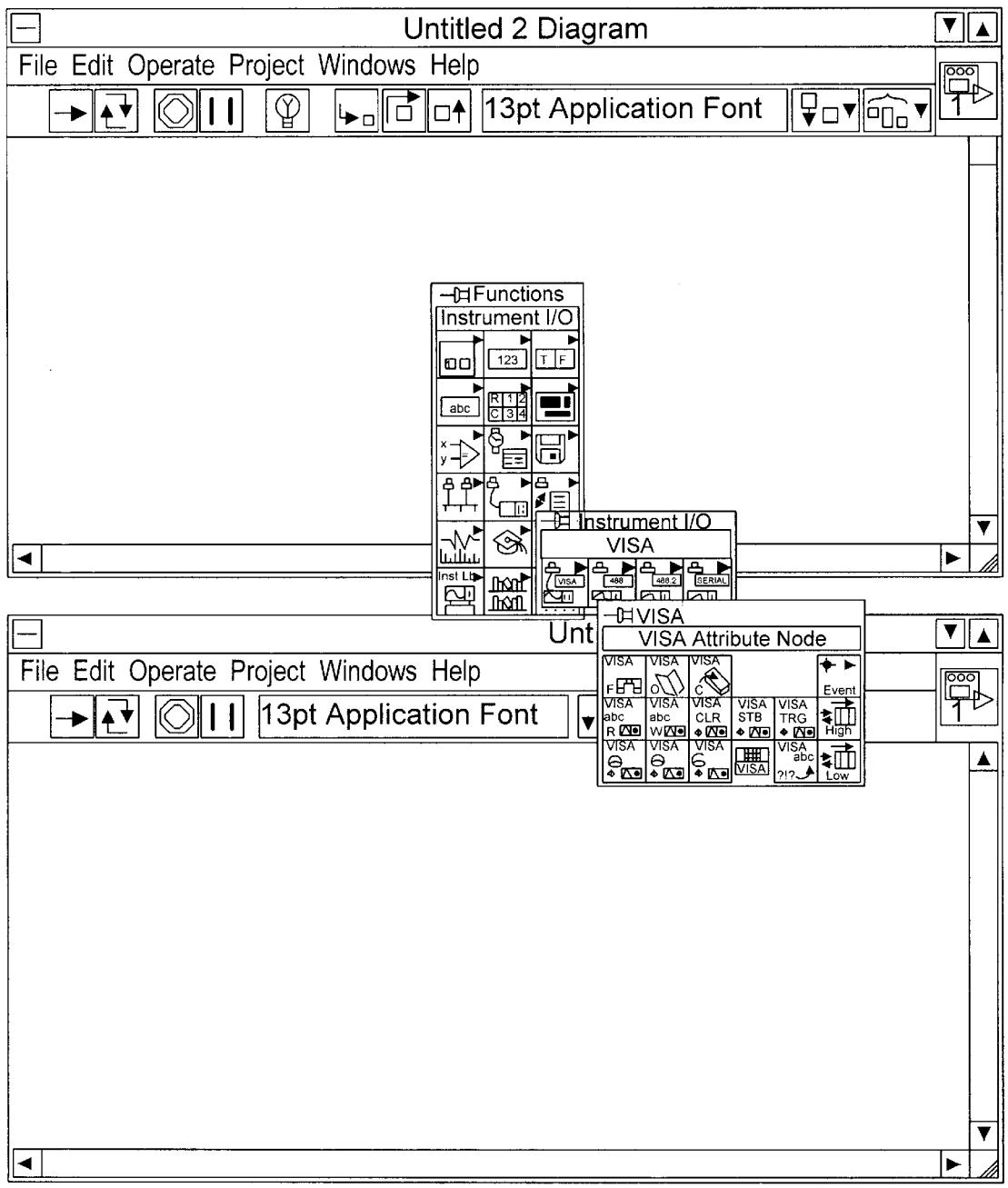

Referring now to FIG. 30, a flowchart illustrating steps taken to perform type propagation checking on a VISA attribute node is shown. A programmer drags a VISA attribute node icon from the VISA palette of the Instrument I/O palette of the Functions palette, as shown in FIG. 31, and drops the icon in a virtual instrument block diagram. The block diagram editor 64 (of FIG. 3) operates with the VISA attribute node to display the icon in the front panel in step 200, as shown in FIG. 32, in response to the user dropping the icon. The VISA attribute node has an associated first VISA class. Preferably the VISA attribute node is of VISA class "Instr" when initially dropped.

Figure 33:
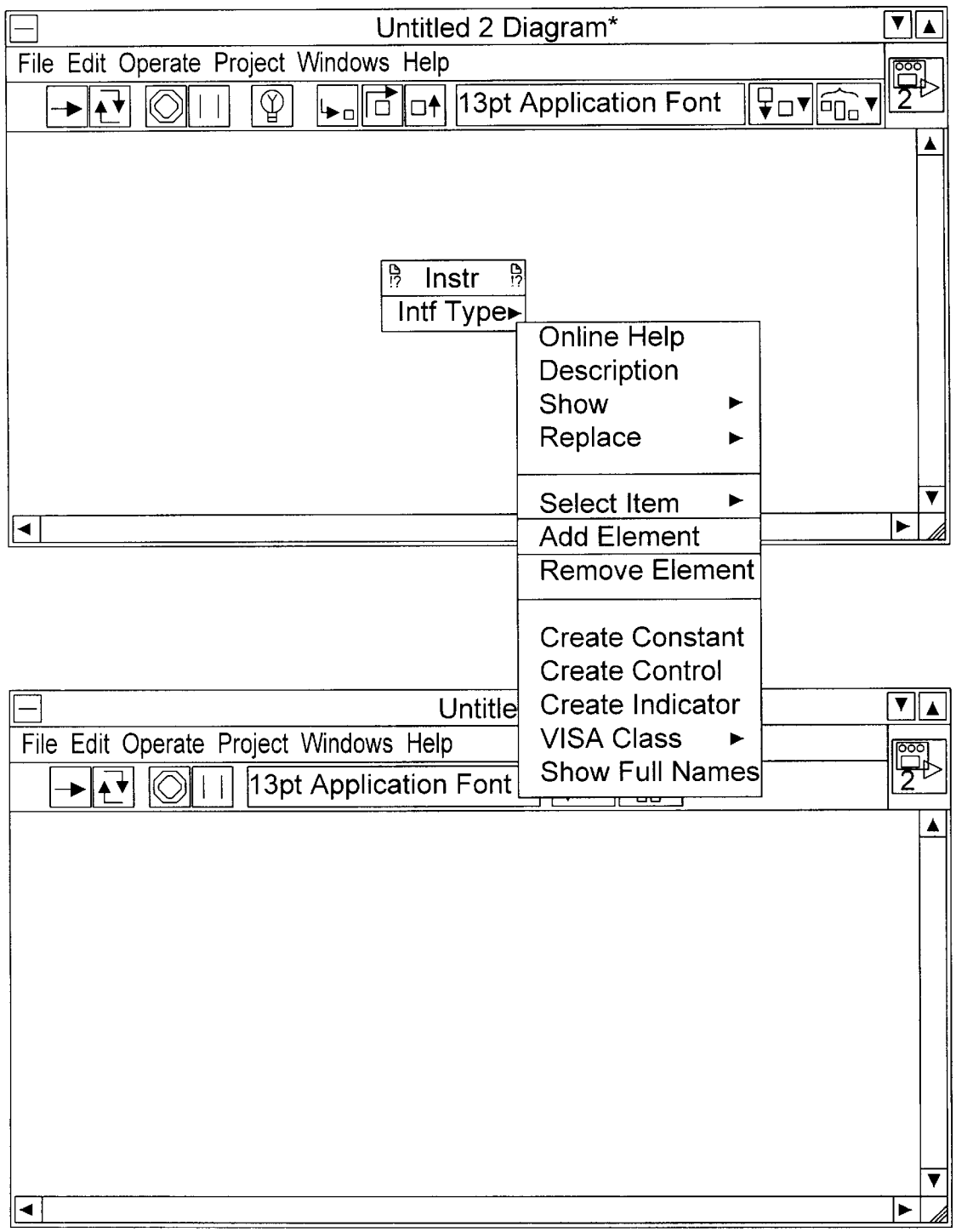
Figure 35:
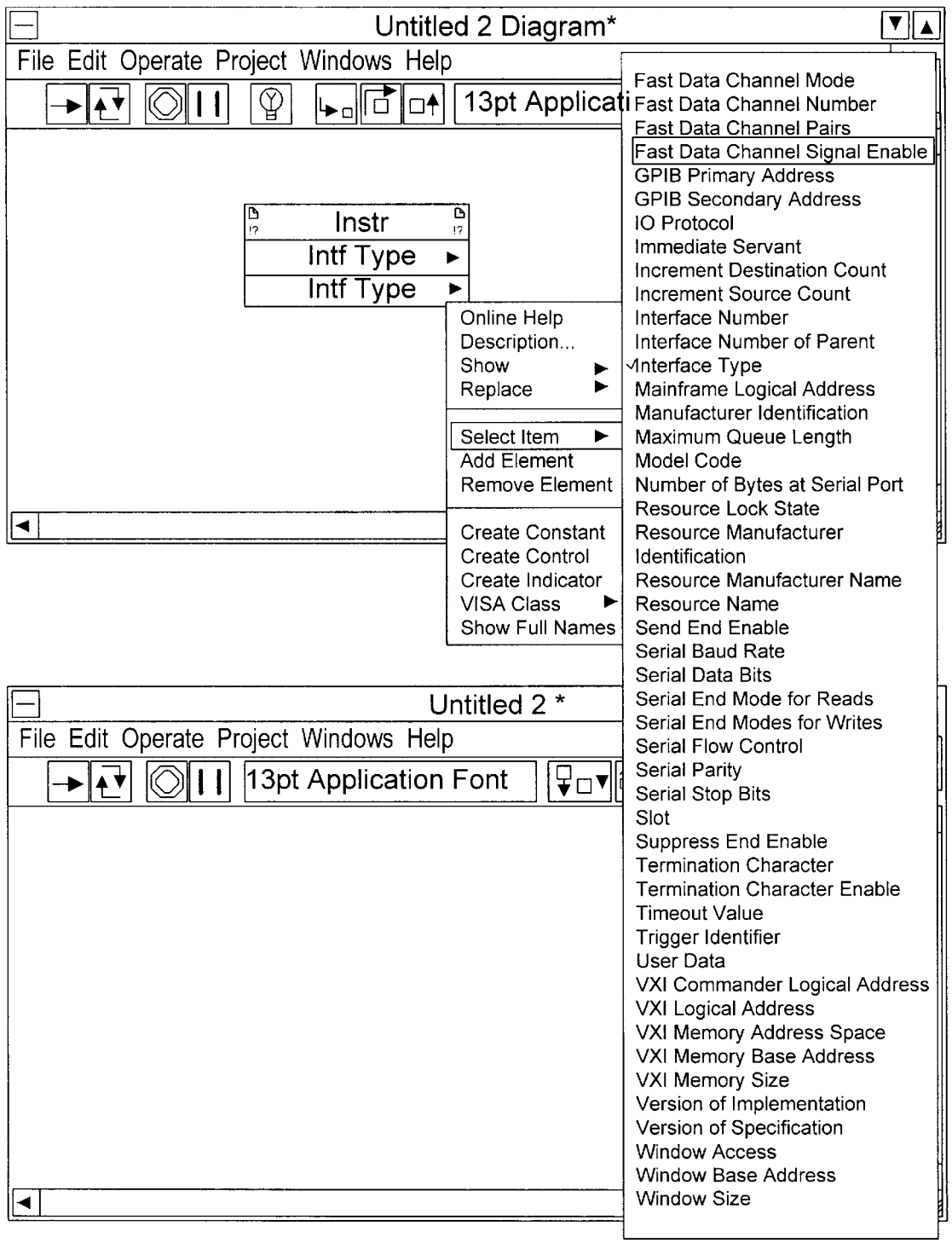

Preferably the VISA attribute node has one attribute when initially dropped. In FIG. 32, the attribute is Intf Type, and is displayed in the color blue since it is an integer data type. The user optionally grows the VISA attribute node after dropping the node, i.e., adds more attributes to the attribute node, by choosing the Add Element menu item as shown in FIGS. 33 and 34. After having grown the attribute node, the user then selects the desired attributes using the Select Item menu item as shown in FIGS. 35 and 36. In FIG. 36, the added attribute is FDC Gen Signal En (Fast Data Channel Generate Signal Enable) and is displayed in the color green since it is of type boolean.

The programmer then changes the class of the VISA attribute node to a second class, preferably based upon the type of interface by which the instrument to be controlled is coupled to the computer 12 (of FIG. 1), in step 202. The programmer changes the class, as illustrated in FIG. 37, by popping up on the VISA attribute node, selecting the VISA Class pull-right menu, and then selecting one of the available classes listed.

Figure 37:
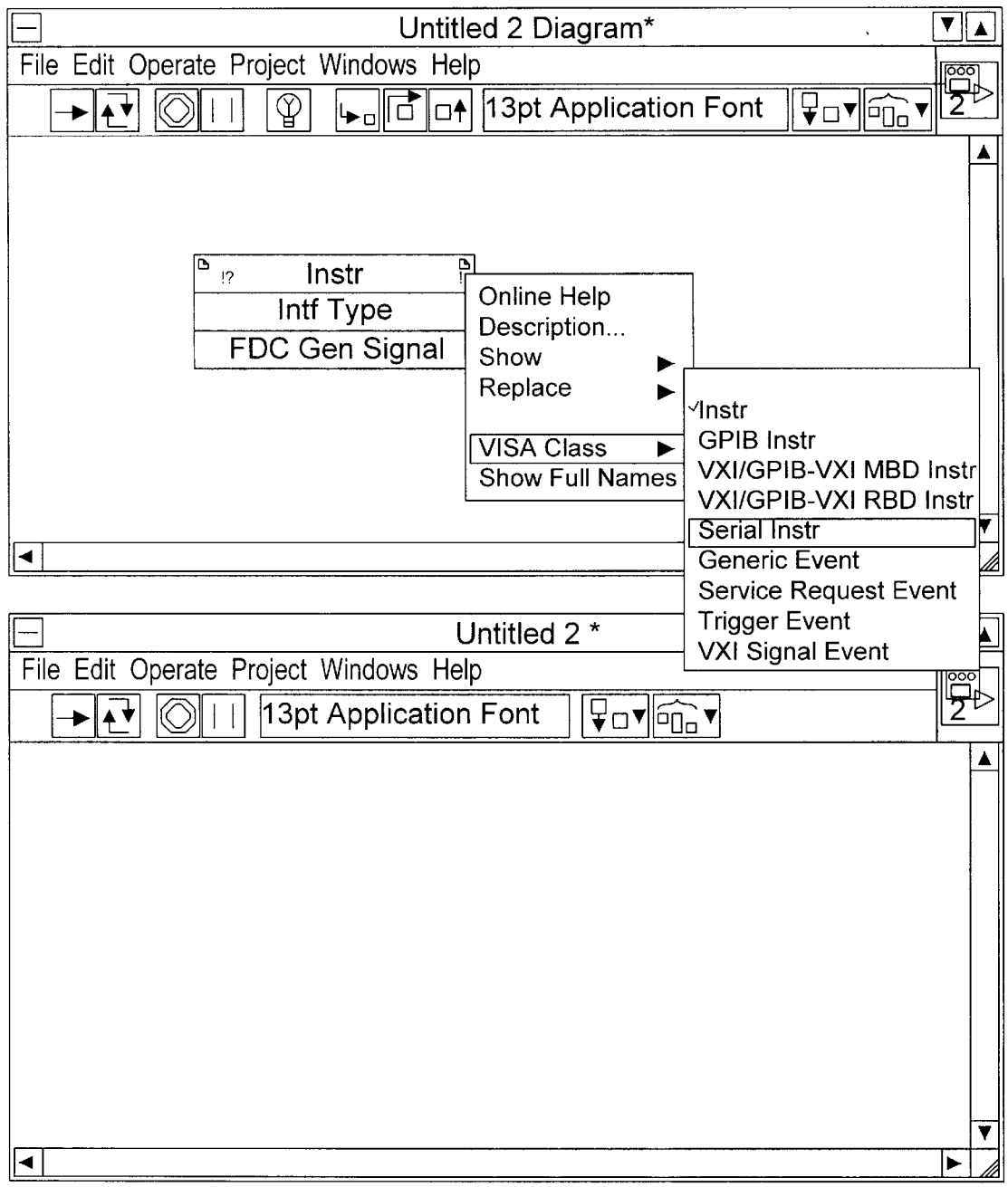

Preferably, the class of a VISA attribute node may be changed, via the VISA Class pull-right menu, shown in FIG. 37, as long as it has not been wired to a VISA session control terminal. Once a VISA attribute node has been wired to a VISA session control terminal, the VISA attribute node takes on the class of the VISA session control to which it is wired.

Once the user changes the class of the VISA attribute node, as shown in FIG. 38, the type propagation checking code of the VISA attribute node is invoked by the block diagram editor 64, to verify that the attributes in the VISA attribute node are valid for the second VISA class in step 204. A more detailed description of the VISA attribute node type propagation checking performed in step 204 will be given below.

In step 206 a determination is made as to whether or not each of the attributes is valid for the second class of the VISA attribute node. If the attribute is valid for the second class, the block diagram editor 64 displays a valid attribute, as shown in FIG. 38 regarding the Intf Type attribute, in step 208. Since the Intf Type attribute is a supported attribute for the VISA class of Serial Instr, the attribute is displayed as valid, i.e., remains in blue. Preferably, displaying the attribute as a valid attribute is displaying the attribute in a color indicative of validity, in particular, any color which is not reserved for indicating that the attribute is not valid for the class of the VISA attribute node. In one embodiment, invalid attributes are displayed in black, and valid attributes are displayed in colors other than black, such as blue, green or pink. Preferably, the valid colors indicate the data type of the attribute, such as boolean, integer, string, etc.

If an attribute is not valid for the second class, the block diagram editor 64 displays an invalid attribute, as shown in FIG. 38 regarding the FDC Gen Signal En, in step 210. In the example of FIG. 38, the FDC Gen Signal En attribute is not a supported attribute for the Serial Instr class. Thus the attribute is invalid.

Thus, the present invention advantageously performs type propagation checking to determine program correctness when changing the class of VISA attribute nodes. This advantageously prevents run-time errors which would occur when the user attempted to set or get an attribute which is invalid for the type of instrument with which a session had been opened.

Figure 39:
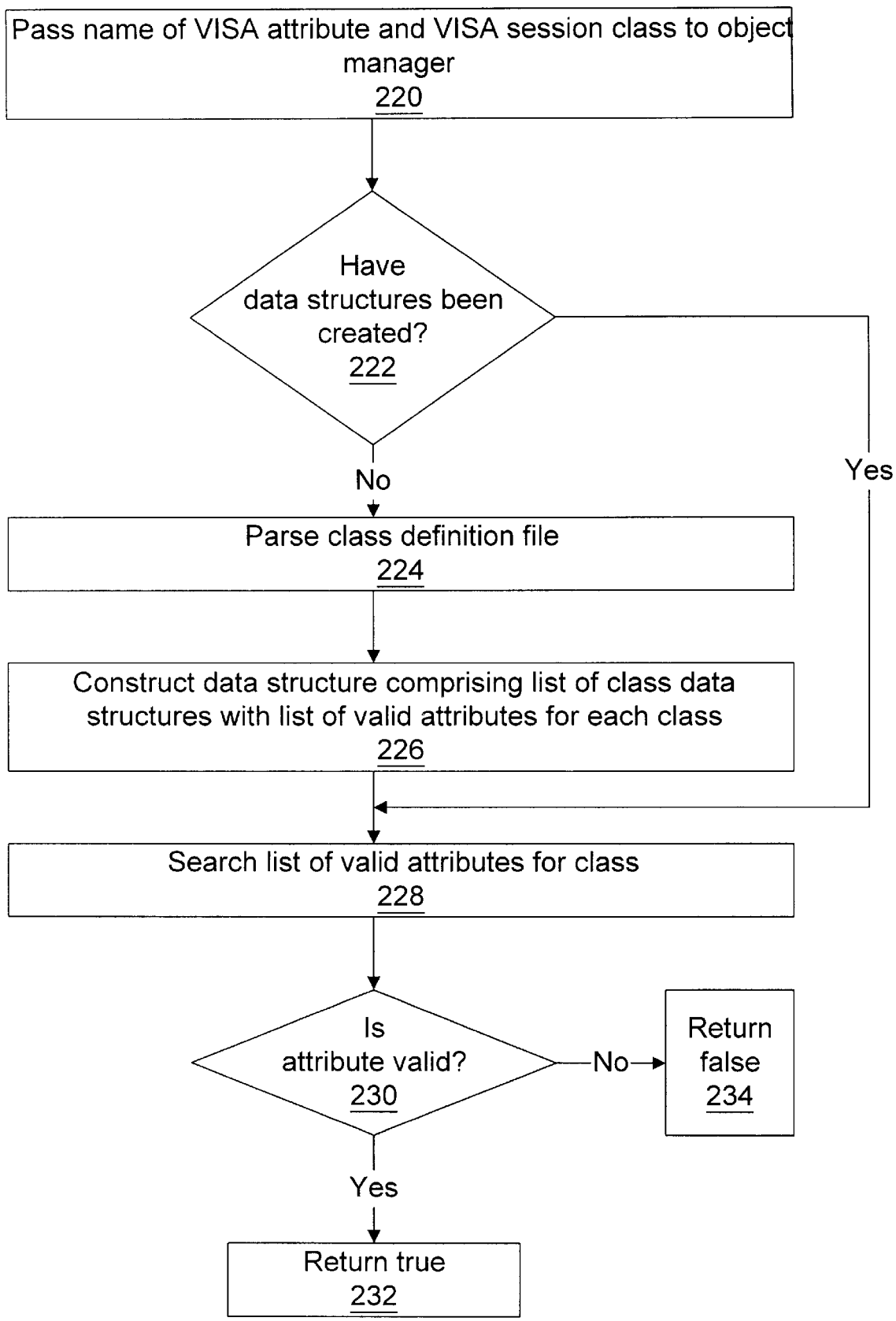
FIG. 39 is a flowchart illustrating steps taken to perform the type propagation checking of step 204 of FIG. 30.

Referring now to FIG. 39, a flowchart illustrating steps taken to perform the type propagation checking of step 204 of FIG. 30 is shown. When a change is made on the block diagram, such as by the user in step 202 of FIG. 30, the block diagram editor invokes the type propagation checking method of the VISA attribute node. The VISA attribute node type propagation method calls the OMIsAttrOfClass() routine, provided by the object manager 68 (of FIG. 3), with the name of the attribute and the class of the VISA attribute node in step 204. The OMIsAttrOfClass() routine returns a boolean value indicating whether or not the specified attribute is a valid attribute of the specified VISA class. The method performs this type propagation checking for each attribute in the node.

The object manager 68 determines if the necessary class data structures have been created in step 222 and if not parses the class definition file 70 (of FIG. 3) in step 224, as described in steps 132 and 134, respectively, of FIG. 21. The object manager 68 parses the class definition file 70 and constructs a list of valid attributes for each class data structure in step 224, similar to constructing a list of valid functions for each class in step 136 of FIG. 21.

The object manager 68 then searches the list of valid attributes for the specified class in step 228. The object manager 68 determines in step 230 whether or not the specified attribute is valid based upon whether or not the specified attribute name is present in the list of attributes. If the attribute is valid, the routine returns a true value in step 232. If the attribute is not valid, the routine returns a false value in step 234.

Figure 40A:
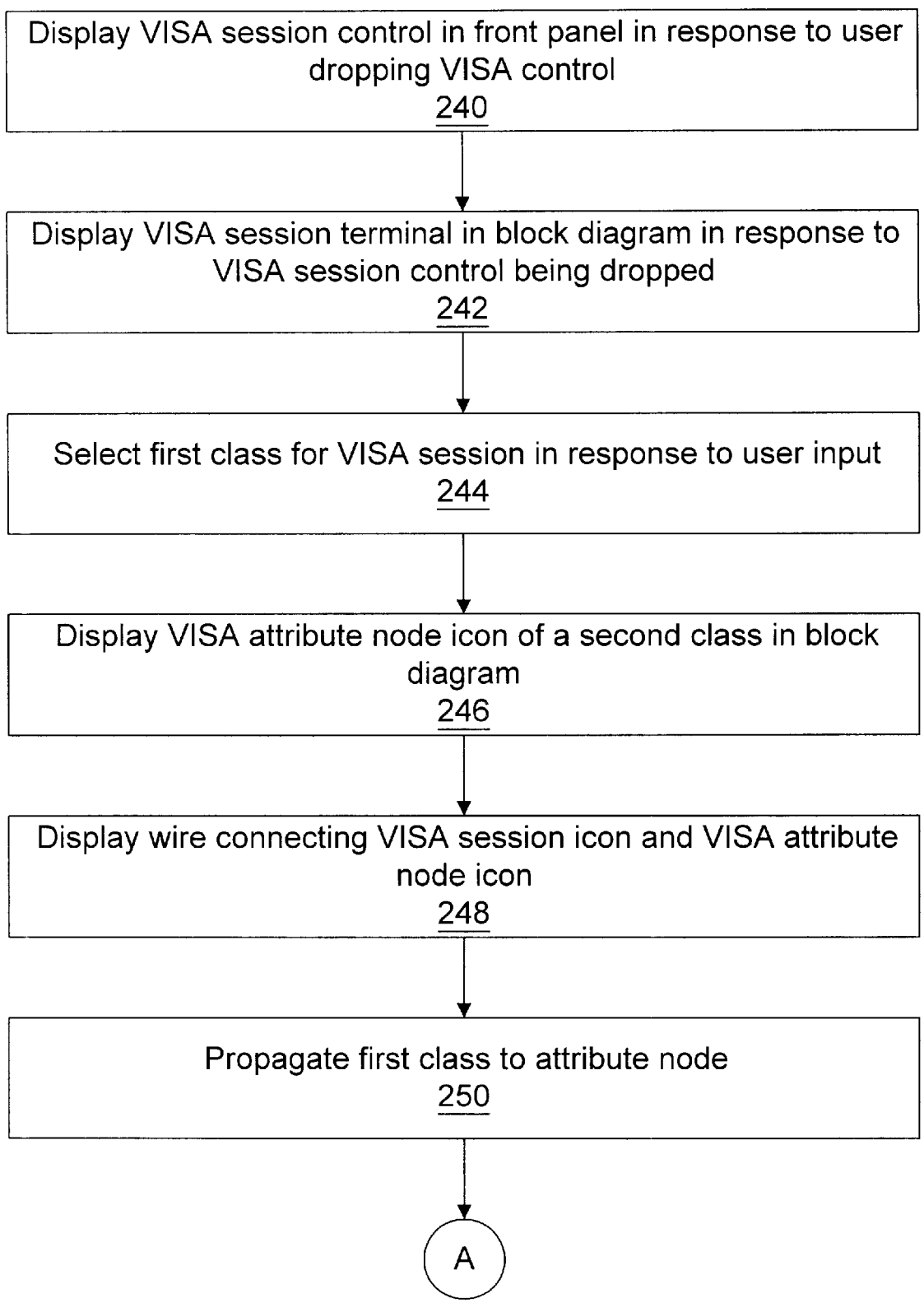
FIGS. 40a and 40b are a flowchart illustrating steps taken to perform type propagation checking on a VISA attribute node.
Figure 40B:
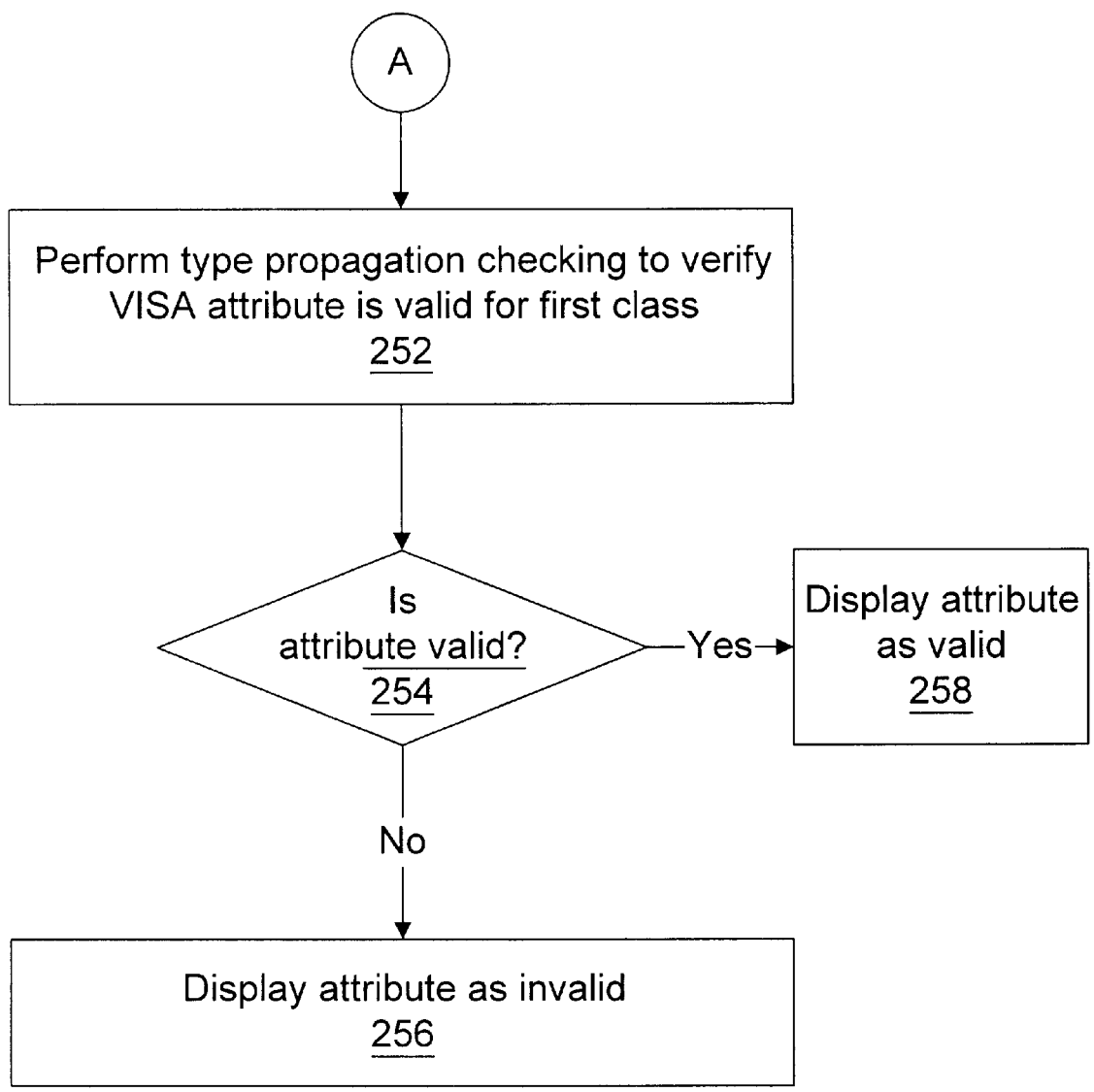

Referring now to FIGS. 40a and 40b (referred to collectively as FIG. 40), a flowchart illustrating steps taken to perform type propagation checking on a VISA attribute node is shown. A VISA session control is dropped and a first class chosen for the control in steps 240, 242, and 244 as in steps 150, 152, and 154 of FIG. 22.

The programmer then drops a VISA attribute node and the attribute node is displayed in step 246 as in step 200 of FIG. 30. The VISA attribute node has a second VISA class, which may or may not be the same as the first class of the VISA session control.

The programmer then wires together the VISA session control terminal and the VISA session input terminal of the VISA attribute node and the programming environment displays a wire connecting the control terminal and input terminal as shown in FIG. 41. In the example of FIG. 41, the first class of the VISA session control is Serial Instr, whereas the second class of the VISA attribute node is Instr. The Intf Type and FDC Gen Signal En attributes are displayed in valid colors, blue and green, respectively, since they are valid attributes for the class Instr.

Once the programmer clicks on the VISA session input terminal of the VISA attribute node to connect the wires, the programming environment performs class propagation of the first class of the VISA session control to the VISA attribute node, as shown in FIG. 42, in step 250. That is, the VISA attribute node is made to have the class of the VISA session control. FIG. 42 illustrates how the VISA attribute node was changed from class Instr to class Serial Instr when the VISA session control terminal was wired to the VISA session input terminal of the VISA attribute node.

Thus the present invention advantageously performs class propagation of a VISA session to a VISA attribute node to prevent run-time errors which would occur when the user attempted to set or get an attribute which is invalid for the type of instrument with which a session had been opened.

After the class of the VISA session has been propagated to the VISA attribute node, the programming environment performs type propagation checking in step 252, determines if each of the attributes of the attribute node is valid for the class of the attribute node in step 254, and displays the attributes as either valid in step 256, or invalid in step 258. Steps 252, 254, 256, and 258 are performed similarly to steps 204, 206, 208, and 210, respectively, of FIG. 30.

In FIG. 42, the Intf Type attribute remains shown as a valid attribute since it is a valid attribute for the class Serial Instr. However, the FDC Gen Signal En attribute has been changed to be shown as an invalid attribute since it is not a valid attribute for the Serial Instr class.

Thus, the present invention advantageously performs type propagation checking to determine program correctness when wiring a VISA session control to a VISA attribute node. This advantageously prevents run-time errors which would occur when the user attempted to set or get an attribute which is invalid for the type of instrument with which a session had been opened.

Figure 43A:
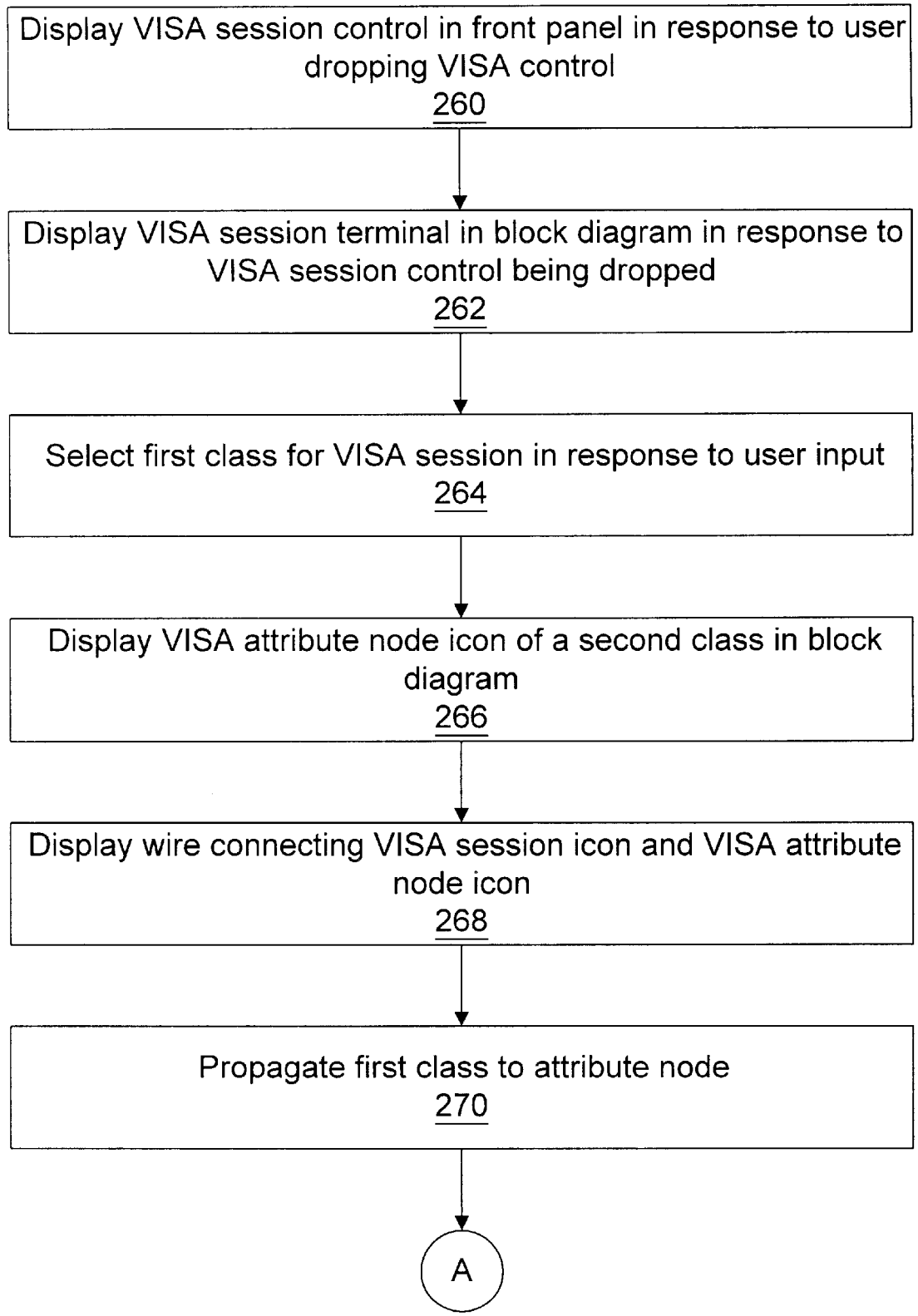
FIGS. 43a and 43b are a flowchart illustrating steps taken to perform type propagation checking on a VISA attribute node.
Figure 43B:
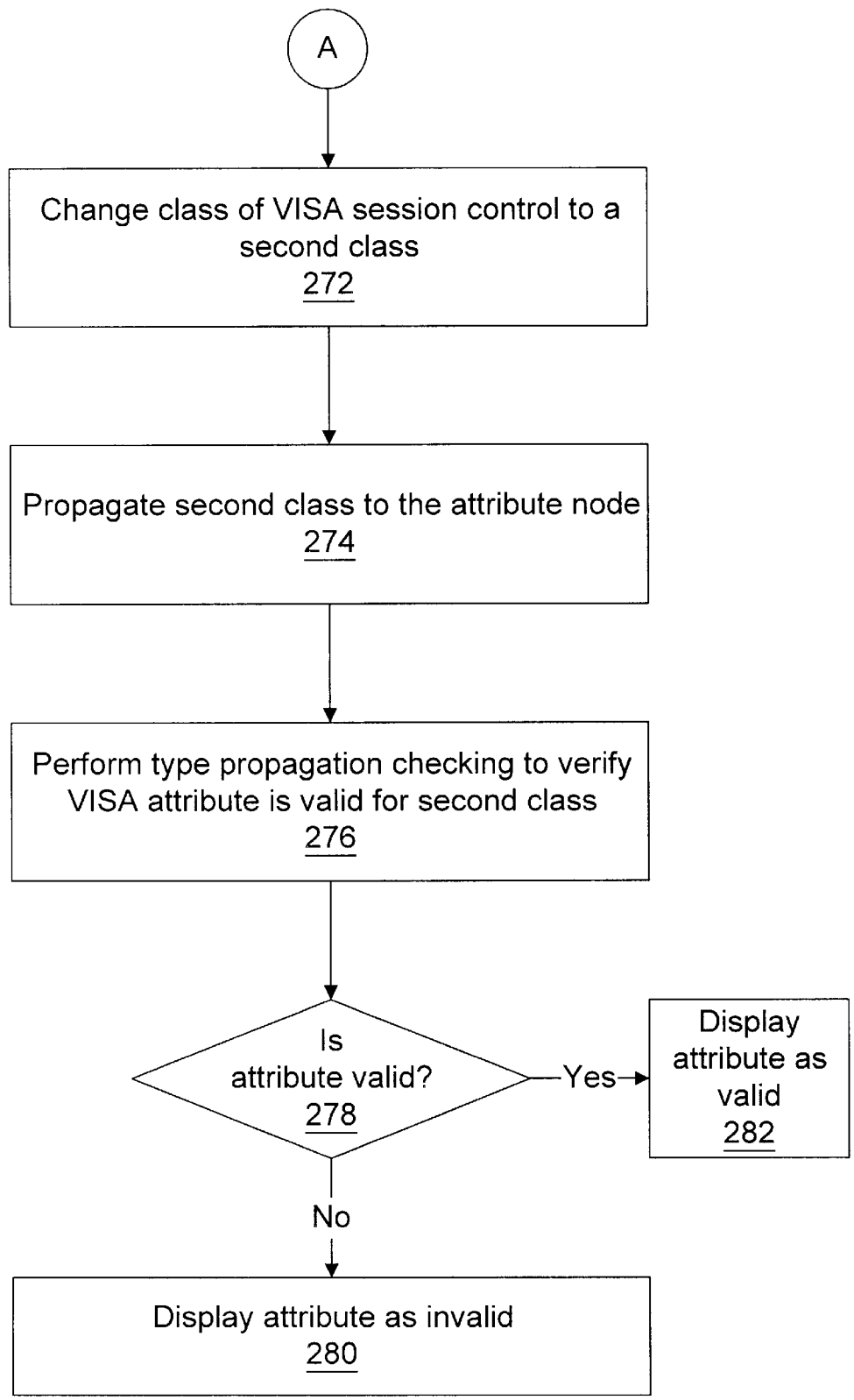

Referring now to FIG. 43, a flowchart illustrating steps taken to perform type propagation checking on a VISA attribute node is shown. A VISA session control is dropped, a first class chosen for the control, a VISA attribute node is dropped, the control and attribute node are wired together, and the class is propagated to the attribute node in steps 260, 262, 264, 266, 268 and 270 as in steps 240, 242, 244, 246, 248 and 250, respectively, FIG. 40.

The programmer then changes the class of the VISA session control to a second class different from the first class of the VISA session control, as shown in FIGS. 44 and 45, in step 272. When the class of the VISA session control is changed, the programming environment performs class propagation of the second class of the VISA session control to the VISA attribute node, as shown in FIG. 45, in step 274 as in step 270. FIG. 45 shows the class of the VISA attribute node having changed by the class propagation mechanism from class Instr to class Serial Instr.

The programming environment then performs type propagation checking of the attribute node, determines if each of the attributes in the attribute node are valid, and displays each attribute as either valid or invalid in steps 276, 278, 280, and 282, respectively, as in steps 252, 254, 256, and 258 of FIG. 40. In FIG. 45, the Intf Type attribute remains shown as a valid attribute since it is a valid attribute for the class Serial Instr. However, the FDC Gen Signal En attribute has been changed to be shown as an invalid attribute since it is not a valid attribute for the Serial Instr class.

Thus, the present invention advantageously performs type propagation checking to determine program correctness when changing the class of a VISA session control wired to a VISA attribute node. This advantageously prevents run-time errors which would occur when the user attempted to set or get an attribute which is invalid for the type of instrument with which a session had been opened.

Alternate Embodiment

The present invention contemplates an alternate embodiment in which the functionality of the block diagram and front panel are combined. In the alternate embodiment, the controls, indicators, and nodes are wired together in a single window to create a virtual instrument. A single VISA session icon represents the combination of the VISA session control and the VISA session control terminal.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for creating a program for controlling at least one instrument coupled to a computer system, wherein the computer system includes memory, a data processor, a user input device, and a video screen, wherein the instrument couples to the computer system through one or more of a plurality of possible input/output (I/O) interface types, the method comprising:

storing in the memory a plurality of resources, wherein said resources are operable to control capabilities of the instrument which are independent of one or more of said plurality of possible I/O interface types for coupling said instrument to said computer system;

displaying on the screen a palette comprising node icons, wherein the node icons correspond to respective ones of the plurality of resources;

displaying on the screen a graphical program, the graphical program including a plurality of node icons from said palette comprising node icons, wherein said displaying said graphical program is in response to user input, wherein said graphical program is operable to control the instrument independent of two or more of said plurality of possible input/output (I/O) interface types for coupling said instrument to said computer system.

2. The method of claim 1, wherein said graphical program is operable to control the instrument independent of two or more of said plurality of possible input/output (I/O) interface types for coupling said instrument to said computer system without any modifications to said graphical program.

3. The method of claim 1, wherein said node icons comprised in said palette can be used to create a graphical program operable to control the instrument independent of said plurality of possible input/output (I/O) interface types for coupling said instrument to said computer system.

4. The method of claim 1, wherein said plurality of possible input/output (I/O) interface types for coupling said instrument to said computer system include one or more from the group comprising: VXI message based, VXI register based, GPIB, serial, Ethernet, and wireless.

5. The method of claim 1, wherein said two or more of said plurality of possible input/output (I/O) interface types for coupling said instrument to said computer system comprises a subset of all of the possible input/output (I/O) interface types for coupling said instrument to said computer system.

6. The method as recited in claim 1, wherein said plurality of node icons comprise a first plurality of nodes which are independent of I/O interface type and a second plurality of nodes which are specific to one or more, but not all, of said I/O interface types.

7. The method as recited in claim 1, wherein each of said plurality of node icons references one of said plurality of resources.

8. The method of claim 1, wherein said displaying on the screen said graphical program comprises displaying one or more of said node icons from said palette comprising node icons in a graphical program window in response to user input;

wherein said displaying on the screen said graphical program further comprises connecting said node icons displayed in said graphical program window in response to user input.

9. The method as recited in claim 8, wherein said graphical program is a graphical data flow program, the method further comprising:

wherein said displaying on the screen said graphical program further comprises displaying on the screen in the graphical program one or more wires connecting said plurality of node icons, wherein said one or more wires represent data flow between said corresponding plurality of node icons.

10. The method as recited in claim 1, wherein said node icons comprise function node icons and attribute node icons, wherein said function node icons operate to perform functions of said plurality of resources and said attribute node icons operate to set and get attributes of said plurality of resources.

11. The method as recited in claim 1, wherein said displaying on the screen said graphical program includes displaying on the screen a panel including one or more controls and indicators for providing input values to and receiving output values from, respectively, said plurality of nodes, wherein said displaying said panel is in response to user input.

12. The method as recited in claim 11, wherein said one or more controls comprise one or more session controls.

13. The method as recited in claim 1, wherein said displaying on the screen said graphical program includes:

displaying on the screen a session control terminal icon representing a session with said at least one instrument;

selecting a class for said session in response to user input.

14. The method as recited in claim 1, wherein said displaying on the screen said graphical program includes:

displaying on the screen a session control terminal icon representing a session with said at least one instrument;

displaying on the screen an open node icon which represents performance of a open operation.

15. The method as recited in claim 1, further comprising:

constructing execution instructions in the computer system for controlling said instrument, wherein said constructing execution instructions is performed in response to said graphical program, wherein said execution instructions reference one or more of said resources; and executing said execution instructions on said computer system to control said instrument, wherein said executing includes executing said one or more of said resources.

16. The method as recited in claim 1, wherein said plurality of node icons comprised in said graphical program includes a first one or more node icons specific to a first subset of I/O interface types;

wherein said graphical program, without replacing any of said node icons, is operable to control the at least one instrument coupled to said computer system according to a first interface type, wherein said first interface type is one of said first subset of I/O interface types;

wherein said graphical program, without replacing any of said node icons, is operable to control the at least one instrument coupled to said computer system according to a second interface type, wherein said second interface type is one of said first subset of I/O interface types;

wherein said first and second interface types are different.

17. The method as recited in claim 1, wherein said plurality of node icons comprised in said graphical program includes a first one or more node icons specific to a first subset of I/O interface types, wherein said graphical program is operable to control the at least one instrument coupled to said computer system according to a first interface type, wherein said first interface type is one of said first subset of I/O interface types;

the method further comprising:

modifying the graphical program to replace said first one or more node icons specific to said first subset of I/O interface types with a second one or more node icons specific to a second subset of I/O interface types, wherein said first subset of I/O interface types is different than said second subset of I/O interface types;

wherein said graphical program, after said modifying, is operable to control the at least one instrument coupled to said computer system according to a second interface type, wherein said second interface type is one of said second subset of I/O interface types, and wherein said second interface type is not included in said first subset of I/O interface types.

18. The method as recited in claim 1, wherein said at least one instrument comprises at least one virtual instrument.

19. An instrumentation control system, comprising:

a computer system including memory, a data processor, a user input device, and a video screen;

at least one instrument coupled to said computer system, wherein the instrument couples to the computer system through one or more of a plurality of possible input/output (I/O) interface types;

wherein the memory in the computer system stores code and data for creating a graphical program for controlling the instrument coupled to said computer system, wherein the memory in the computer system further stores a plurality of resources for controlling the instrument coupled to said computer system;

wherein the data processor is operable to execute code and data from the memory in the computer system to display on the screen a graphical program, the graphical program including a plurality of node icons corresponding to respective ones of the plurality of resources, wherein the data processor displays said graphical program in response to user input received from said user input device, wherein said graphical program is operable to control the instrument independent of two or more of said plurality of possible input/output (I/O) interface types for coupling said instrument to said computer system.

20. The instrumentation control system of claim 19, wherein said graphical program is operable to control the instrument independent of two or more of said plurality of possible input/output (I/O) interface types for coupling said instrument to said computer system without any modifications to said graphical program.

21. The instrumentation control system of claim 19, wherein the data processor is operable to execute code and data from the memory in the computer system to display on the screen a palette comprising node icons, wherein the node icons correspond to respective ones of the plurality of resources;

wherein the graphical program includes a plurality of node icons from said palette comprising node icons;

wherein said node icons comprised in said palette can be used to create a graphical program operable to control the instrument independent of said plurality of possible input/output (I/O) interface types for coupling said instrument to said computer system.

22. The instrumentation control system of claim 19, wherein said plurality of possible input/output (I/O) interface types for coupling said instrument to said computer system include one or more from the group comprising: VXI message based, VXI register based, GPIB, serial, Ethernet, and wireless.

23. The instrumentation control system of claim 19, wherein said two or more of said plurality of possible input/output (I/O) interface types for coupling said instrument to said computer system comprises a subset of all of the possible input/output (I/O) interface types for coupling said instrument to said computer system.

24. The instrumentation control system of claim 19, wherein said plurality of node icons comprise a first plurality of nodes which are independent of I/O interface type and a second plurality of nodes which are specific to one or more, but not all, of said I/O interface types.

25. The instrumentation control system of claim 19, wherein each of said plurality of node icons references one of said plurality of resources stored in the memory of the computer system.

26. The instrumentation control system of claim 19, wherein the data processor is operable to execute code and data from the memory in the computer system to display said node icons in a graphical program window in response to user input;

wherein the data processor is further operable to execute code and data from the memory in the computer system to connect said node icons displayed in said graphical program window in response to user input.

27. The instrumentation control system as recited in claim 26, wherein said graphical program is a graphical data flow program;

wherein the data processor is operable to execute code and data from the memory in the computer system to display one or more wires in the graphical data flow program connecting said plurality of node icons, wherein said one or more wires represent data flow between said corresponding plurality of node icons.

28. The instrumentation control system as recited in claim 19, wherein said node icons comprise function node icons and attribute node icons, wherein said function node icons reference code and data which are operable to perform functions of said plurality of resources and said attribute node icons reference code and data which are operable to set and get attributes of said plurality of resources.

29. The instrumentation control system as recited in claim 19, wherein the data processor is operable to execute code and data from the memory in the computer system to display on the screen a panel including one or more controls and indicators for providing input values to and receiving output values from, respectively, said plurality of nodes, wherein the data processor displays said panel in response to user input from said user input device.

30. The instrumentation control system as recited in claim 29, wherein said one or more controls comprise one or more session controls.

31. The instrumentation control system as recited in claim 19, wherein the data processor is operable to execute code and data from the memory in the computer system to display on the screen a session control terminal icon in the graphical program representing a session with said at least one instrument;

wherein the data processor is operable to execute code and data from the memory in the computer system to select a class for said session in response to user input from said user input device.

32. The instrumentation control system as recited in claim 19, wherein the data processor is operable to execute code and data from the memory in the computer system to display on the screen a session control terminal icon in the graphical program representing a session with said at least one instrument;

wherein the data processor is operable to execute code and data from the memory in the computer system to display on the screen a open node icon in the graphical program which represents performance of a open operation.

33. The instrumentation control system as recited in claim 19, wherein the data processor is operable to construct execution instructions in the computer system for controlling said instrument, wherein the data processor constructs said execution instructions in response to said graphical program, wherein said execution instructions reference one or more of said resources; and wherein the data processor is operable to execute said execution instructions to control said instrument, wherein said execution includes executing said one or more of said resources.

34. The instrumentation control system as recited in claim 19, wherein said plurality of node icons comprised in said graphical program includes a first one or more node icons specific to a first subset of I/O interface types;

wherein said graphical program, without replacing any of said node icons, is operable to control the at least one instrument coupled to said computer system according to a first interface type, wherein said first interface type is one of said first subset of I/O interface types;

wherein said graphical program, without replacing any of said node icons, is operable to control the at least one instrument coupled to said computer system according to a second interface type, wherein said second interface type is one of said first subset of I/O interface types;

wherein said first and second interface types are different.

35. The instrumentation control system as recited in claim 19, wherein said plurality of node icons comprised in said graphical program includes a first one or more node icons specific to a first subset of I/O interface types, wherein said graphical program is operable to control the at least one instrument coupled to said computer system according to a first interface type, wherein said first interface type is one of said first subset of I/O interface types;

wherein the data processor is operable to modify the graphical program to replace said first one or more node icons specific to said first subset of I/O interface types with a second one or more node icons specific to a second subset of I/O interface types, wherein said first subset of I/O interface types is different than said second subset of I/O interface types;

wherein said graphical program, after said modifying, is operable to control the at least one instrument coupled to said computer system according to a second interface type, wherein said second interface type is one of said second subset of I/O interface types, and wherein said second interface type is not included in said first subset of I/O interface types.

36. The instrumentation control system as recited in claim 19, wherein said at least one instrument comprises at least one virtual instrument.

37. A computer-readable storage media for operating in a computer system, the computer system including a display screen, an input device, memory, and a data processor, wherein at least one instrument is coupled to the computer system, wherein the instrument couples to the computer system through one or more of a plurality of possible input/output (I/O) interface types, wherein the media stores a plurality of resources, wherein said resources are operable to control capabilities of the instrument which are independent of one or more of said plurality of possible I/O interface types for coupling said instrument to said computer system;

wherein the storage media includes program instructions for creating a program for controlling the at least one instrument coupled to the computer system, wherein the program instructions implement:

displaying on the screen a palette comprising node icons, wherein the node icons correspond to respective ones of the plurality of resources;

displaying on the screen a graphical program in response to user input, the graphical program including a plurality of node icons from said palette comprising node icons, wherein said graphical program is operable to control the instrument independent of two or more of said plurality of possible input/output (I/O) interface types for coupling said instrument to said computer system.

38. The media of claim 37, wherein said graphical program is operable to control the instrument independent of two or more of said plurality of possible input/output (I/O) interface types for coupling said instrument to said computer system without any modifications to said graphical program.

39. The media of claim 37, wherein said node icons comprised in said palette can be used to create a graphical program operable to control the instrument independent of said plurality of possible input/output (I/O) interface types for coupling said instrument to said computer system.

40. The media of claim 37, wherein said plurality of possible input/output (I/O) interface types for coupling said instrument to said computer system include one or more from the group comprising: VXI message based, VXI register based, GPIB, serial, Ethernet, and wireless.

41. The media of claim 37, wherein said two or more of said plurality of possible input/output (I/O) interface types for coupling said instrument to said computer system comprises a subset of all of the possible input/output (I/O) interface types for coupling said instrument to said computer system.

42. The media as recited in claim 37, wherein said plurality of node icons comprise a first plurality of nodes which are independent of I/O interface type and a second plurality of nodes which are specific to one or more, but not all, of said I/O interface types.

43. The media as recited in claim 37, wherein each of said plurality of node icons references one of said plurality of resources.

44. The media of claim 37, wherein said displaying on the screen said graphical program comprises displaying one or more of said node icons from said palette comprising node icons in a graphical program window in response to user input;

wherein said displaying on the screen said graphical program further comprises connecting said node icons displayed in said graphical program window in response to user input.

45. The media as recited in claim 44, wherein said graphical program is a graphical data flow program, wherein said displaying on the screen said graphical program further comprises displaying on the screen in the graphical program one or more wires connecting said plurality of node icons, wherein said one or more wires represent data flow between said corresponding plurality of node icons.

46. The media as recited in claim 37, wherein said node icons comprise function node icons and attribute node icons, wherein said function node icons operate to perform functions of said plurality of resources and said attribute node icons operate to set and get attributes of said plurality of resources.

47. The media as recited in claim 37, wherein said displaying on the screen said graphical program includes displaying on the screen a panel including one or more controls and indicators for providing input values to and receiving output values from, respectively, said plurality of nodes, wherein said displaying said panel is in response to user input.

48. The media as recited in claim 47, wherein said one or more controls comprise one or more session controls.

49. The media as recited in claim 37, wherein said displaying on the screen said graphical program includes:
 displaying on the screen a session control terminal icon representing a session with said at least one instrument;
 selecting a class for said session in response to user input.

50. The media as recited in claim 37, wherein said displaying on the screen said graphical program includes:
 displaying on the screen a session control terminal icon representing a session with said at least one instrument;
 displaying on the screen an open node icon which represents performance of a open operation.

51. The media as recited in claim 37, wherein the program instructions further implement:
 constructing execution instructions in the computer system for controlling said instrument, wherein said constructing execution instructions is performed in response to said graphical program, wherein said execution instructions reference one or more of said resources; and
 executing said execution instructions on said computer system to control said instrument, wherein said executing includes executing said one or more of said resources.

52. The media as recited in claim 37,
 wherein said plurality of node icons comprised in said graphical program includes a first one or more node icons specific to a first subset of I/O interface types;
 wherein said graphical program, without replacing any of said node icons, is operable to control the at least one instrument coupled to said computer system according to a first interface type, wherein said first interface type is one of said first subset of I/O interface types;
 wherein said graphical program, without replacing any of said node icons, is operable to control the at least one instrument coupled to said computer system according to a second interface type, wherein said second interface type is one of said first subset of I/O interface types;
 wherein said first and second interface types are different.

53. The media as recited in claim 37,
 wherein said plurality of node icons comprised in said graphical program includes a first one or more node icons specific to a first subset of I/O interface types, wherein said graphical program is operable to control the at least one instrument coupled to said computer system according to a first interface type, wherein said first interface type is one of said first subset of I/O interface types;
 wherein the program instructions further implement:
  modifying the graphical program, in response to user input, to replace said first one or more node icons specific to said first subset of I/O interface types with a second one or more node icons specific to a second subset of I/O interface types, wherein said first subset of I/O interface types is different than said second subset of I/O interface types;
 wherein said graphical program, after said modifying, is operable to control the at least one instrument coupled to said computer system according to a second interface type, wherein said second interface type is one of said second subset of I/O interface types, and wherein said second interface type is not included in said first subset of I/O interface types.

54. The media as recited in claim 37, wherein said at least one instrument comprises at least one virtual instrument.

* * * * *